United States Patent [19]

Ray et al.

[11] Patent Number: 4,944,882
[45] Date of Patent: Jul. 31, 1990

[54] HYBRID MEMBRANE SEPARATION SYSTEMS

[75] Inventors: Roderick J. Ray; David D. Newbold, both of Bend, Oreg.

[73] Assignee: Bend Research, Inc., Bend, Oreg.

[21] Appl. No.: 341,646

[22] Filed: Apr. 21, 1989

[51] Int. Cl.$^5$ ............................................. B01D 13/00
[52] U.S. Cl. .................... 210/640; 210/641; 210/644; 210/652
[58] Field of Search ........ 210/641, 640, 634, 644–647, 210/649–655

[56] References Cited
U.S. PATENT DOCUMENTS
4,770,784 9/1988 Davis et al. ........................ 210/641

Primary Examiner—Frnk Sever
Attorney, Agent, or Firm—Chernoff, Vilhauer, McClung & Stenzel

[57] ABSTRACT

Hybrid membrane-based separation systems are disclosed that are useful in separating solvents and solutes. The hybrid systems combine any of the solvent removal processes reverse osmosis, nanofiltration, membrane distillation and pervaporation with any one of more of the solute removal processes utilizing pervaporation membranes, supported-liquid membranes, coupled transport membranes, and membrane contactors, the solvent and solute removal processes forming part of a recycle stream that utilizes membrane separation retentates as feeds and as recycle feed stream make-up.

38 Claims, 52 Drawing Sheets

HYBRID MEMBRANE SEPARATION SYSTEMS

The government has rights in this invention under EPA Contract No. 68-02-4479.

BACKGROUND OF THE INVENTION

There is an ongoing need in the art of membrane-based separations of solutes and solvents for cleaner, more efficient separations that use less membrane surface area. Separation processes utilizing the membrane processes of reverse osmosis, nanofiltration, membrane distillation, pervaporation, supported-liquid membranes, coupled transport, and membrane contactors are all known. It has been suggested to combine reverse osmosis with a phase change process such as solvent exchange, distillation or evaporation for energy-efficient waste-water treatment. Ray et al., 28 *J. Memb. Sci.* 87 (1986). It has also been suggested to combine reverse osmosis with pervaporation in series to selectively separate water in two stages from a mixture of solvents. See Extended Abstracts, page C23, *International Membrane Technology Conference*, Sydney, Australia, November 15-17, 1988. However, there has been no recognition in the art of the efficiencies which may be realized in solute/solvent separations by combining certain membrane separations in such a manner that each of the component separation processes is part of a recycle stream wherein the retentate (or raffinate) of one or more solute separation processes comprises the feed of a solvent separation process and the retentate of the solvent separation process forms part of the feed for the solute separation process(es), or vice-versa.

SUMMARY OF THE INVENTION

The present invention comprises a method for the removal of solvent and solute from a process stream containing a solvent and at least one solute. The process comprises a solvent removal process for selectively removing solvent from the process stream, said solvent removal process forming a solvent-rich portion and a solvent-poor portion and being selected from the processes of reverse osmosis, nanofiltration, membrane distillation, and pervaporation, the solvent removal process being combined with at least one selective solute-removal process for selectively removing solute from the process stream, said selective solute-removal process forming a solute-rich portion and a solute-poor portion and being selected from the processes utilizing pervaporation, supported-liquid membranes, coupled transport membranes, and membrane contactors. The solvent and solute removal processes are combined so as to be part of a recycle stream where either of the following relationships exist: (1) the solute-poor portion of the selective solute-removal process comprises the feed for the solvent-removal process and the solvent-poor portion of the solvent-removal process is combined with the process stream to form the feed to the selective solute-removal process; or (2) the solvent-poor portion of the solvent removal process comprises the feed for the selective solute-removal process and the solute-poor portion of the selective solute-removal process is combined with the process stream to form the feed to the solvent-removal process.

DETAILED DESCRIPTION OF THE INVENTION

Figure 1A:
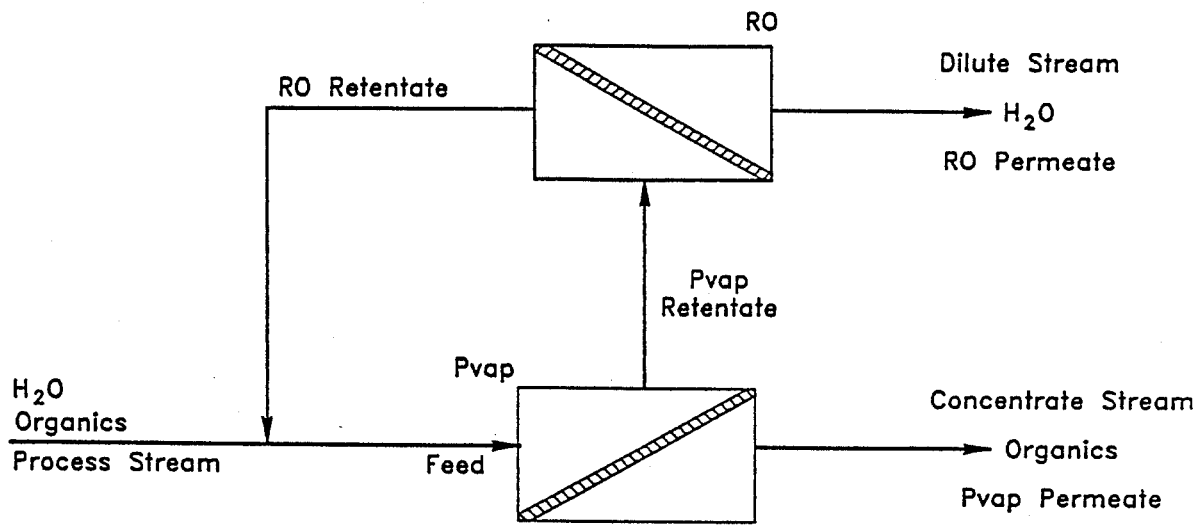
FIGS. 1-34 are all schematic drawings illustrating various exemplary embodiments of the present invention; auxiliary equipment, such as pumps, valves, heat exchangers and condensors, is not shown.

According to the present invention, there are provided a number of efficient hybrid membrane separation processes that yield surprisingly synergistic results by the combination of conventional membrane separations in a unique way.

The common characteristic of each of the hybrid separation processes comprising the invention herein is that each of the component membrane separation processes comprises part of a recycle stream where one of the two following relationships exist: either (1) the retentate (or raffinate) of one or more of the solute removal processes comprises the feed for the solvent removal process and the retentate of the solvent separation process forms part of the feed for the solute separation process(es); or (2) the retentate of the solvent removal comprises the feed for the solute removal process(es) and the retentate of the solute removal process(es) forms part of the feed to the solvent removal process.

The membrane separation process of reverse osmosis ("RO") is well known and generally comprises the removal of suspended and dissolved material from aqueous suspensions or solutions thereof by preferentially passing water through the membrane under pressure, while rejecting, or not permitting permeation of, the non-aqueous components, generally in the range of 100 to 1000 psi.

The process of nanofiltration, sometimes referred to as "low pressure" or "loose" RO, is in reality a species of reverse osmosis that generally uses more open membranes and operates in a lower range of pressures, generally less than 250 psi. The rejection is low for salts with monovalent anion and nonionized organics with molecular weight below 150, and high for salts with di- and multi-valent anions and organics with molecular weight above 300.

Membrane distillation ("MD") is an evaporative process that utilizes a dry hydrophobic microporous membrane to separate a distillate stream from an aqueous feed stream. An applied temperature or activity difference gives rise to a vapor pressure difference, resulting in the passage of gaseous species across the membrane. The membrane is selective towards the gas phase, providing 100% rejection of the liquid phase. Within the gas phase, the membrane is virtually nonselective to individual gaseous species. The flux and separation achieved in MD are governed by the vapor/liquid equilibria at the evaporating and condensing surfaces. In a typical application, MD produces distilled water from dissolved solutes such as salts and macromolecules. The individual fluxes of solvents and solutes will depend on their individual vapor pressures on either side of the membrane. Typically, MD of aqueous/organic solutions is limited to low concentrations of organic solutes, generally less than 5 wt%.

Pervaporation ("Pvap") is a membrane separation process that can separate components of liquid mixtures comprising a solvent and at least one solute. It is particularly effective at separating a feed stream containing a relatively low concentration of a contaminant into (1) a purified stream containing the bulk of the solvent, and (2) a low-volume concentrate stream containing some of the solvent and virtually all of the liquid solute. Pvap avoids the limitation of osmotic pressure imposed on reverse osmosis processes by maintaining the permeate below its saturated vapor pressure. The permeate pressure can be reduced in several ways: by vacuum pumping, by gas sweeping, and by condensation and removal as liquid. Heat of vaporization must be suppplied to the permeating fraction. In practical pervaporation, the feed is a liquid mixture that is directed across the upstream side of the membrane at ambient pressure, while the vapor-phase permeate is withdrawn by maintaining low pressure on the downstream side of the membrane. The flux of a solute across a Pvap membrane is proportional to the concentration of the solute in the stream.

Supported-liquid membranes ("SLM") comprise a feed liquid solvent which is contained within the pores of a polymeric solid membrane, thus making up a "liquid membrane" that is "supported" within the membrane matrix. Taking the case of a single solute, the neutral solute, typically protonated acids or uncharged bases, present in the feed dissolves in the solvent present in the membrane pores. The ratio of the concentration of the solute in the liquid membrane at its interface with the feed stream, and the solute concentration in the feed stream, is given by the distribution coefficient for the solute between the feed stream and the solvent contained in the membrane. The solute partitions into the solvent within the membrane, then diffuses down its concentration gradient to the opposite side of the membrane where it partitions into the product or strip solution. In some instances the driving force can be increased by adjusting the pH of the strip solution (basic strip solution for acid solutes and acidic strip solution for basic solutes). Due to the pH of the product solution, the solute is converted to its ionic form, so the concentration of the neutral solute in the strip solution is maintained at near-zero and a driving force for diffusion from feed to the strip solution is maintained. Because of its charge, the ionic species of the solute is essentially insoluble in the liquid solvent within the membrane and thus cannot diffuse back across the membrane in a direction opposite to the feed. Thus, the feed side concentration of the solute can be reduced to a very low level while a very high level on the product side can be achieved. Although SLMs should be as thin as possible to minimize diffusion resistance, the membrane must also be strong enough to withstand a pressure difference on the order of less than 30 psi between feed and stripping streams, and it must also be thick enough to hold sufficient solvent, with an appreciable area for solute diffusion. The SLM stripping stream may be either a one-pass low concentration strip solution or a recycled stream with a bleed-off at high concentration and fresh make-up at substantially zero concentration.

Coupled transport ("CT") is a membrane separation process generally useful for the extraction of metal ions from aqueous solutions in contact with the feed side of the membrane, and liberation of the ions into an aqueous product or strip solution on the permeate side of the membrane. The pores of the membrane are filled with an organic liquid extractant containing a complexing agent that is specific to the metal ion of interest, and electrical neutrality is preserved by the movement of other ions through the membrane in addition to the metal ions to be recovered. Coupled transport may occur by either a countertransport mechanism, or a co-transport mechanism.

The counter-transport mechanism of CT may be illustrated by the equation $$A + BC \rightleftharpoons AB + C$$

wherein A represents the ions of interest in the feed solution, B represents the complexing agent, and C represents "co-ions" having like charge to A ions that are transferred to the feed solution to maintain electrical neutrality. The complexing agent B in the membrane separating the feed and product solutions forms a complex AB at the feed side of the membrane which then diffuses to the product side of the membrane where the reaction is reversed by the high concentration of C ion. Ion A is liberated to the product solution and a complex BC is formed of the complexing agent B and ion C which then diffuses back to the feed solution. The complexing agent B thus acts as a "shuttle," picking up ions on one side of the membrane, carrying them across to the other side, and preserving requisite electrical neutrality by carrying a co-ion in the opposite direction. The energy for the shuttle process is provided principally by the concentration gradient of co-ion C. The process takes place even if the concentration gradient for the transport of ion A is small (or even negative), provided there exists a sufficiently large gradient of the co-ion C.

The co-transport mechanism of CT is illustrated by the equation $$A + D + E \rightleftharpoons ADE$$

wherein A represents the ions of interest in the feed solution, D represents "counter-ions" also present in the feed solution and having a charge opposite to the charge of A ions, and E represents an A-specific complexing agent in the membrane. Complexing agent E in the membrane forms a complex ADE with the ions in the feed solution and this diffuses to the product side of the membrane. At the product side, the complex dissociates because of the reduced concentration of ion D in the product solution, with the liberation of both A and D to the product solution. Complexing agent E then diffuses back to the feed side of the membrane. Provided a sufficiently large concentration difference of D exists across the membrane, ion A will flow into the product solution even if the concentration of A there is greater than in the feed solution. The process is referred to as "co-transport" because the ion of interest and the counter-ion flow together across the membrane. An especially preferred form of membrane for conducting the CT aspect of the present invention is hollow fiber membranes, as set forth in greater detail in U.S. Pat. No. 4,437,994, the disclosure of which is incorporated herein by reference. The product or strip stream may comprise a low solute concentration single-pass or higher solute concentration recycle stream with a product bleed and fresh make-up stream.

Membrane contactors ("MC") comprise still another membrane separation process for extracting a solute which utilizes a microporous membrane, preferably of hollow fiber configuration, to establish a support for interfacial contact between two immiscible liquids, usually aqueous on the one hand, and organic on the other. One of the liquids comprises the feed liquid, while the other liquid comprises the extractant, and the solute of interest is soluble in both liquids. The basic MC process comprises wetting the microporous membrane with the liquid in which the solute is more soluble, immobilizing an interface between the two immiscible liquids at a surface of the wetted microporous membrane, and extracting the solute with the extractant liquid. The extractant liquid may contain a complexing agent which performs in the same manner as in the CT membrane. If the solute is present in an aqueous feed and the desired product is pure solute in an aqueous stream, the solute cannot be extracted directly from one aqueous stream to another. If it is desired to re-use the extractant liquid or if the solute must be present in a different solvent (e.g., aqueous versus organic extractant liquid), to be useful, the extractant liquid containing the solute must be fed to another MC where the solute is again extracted, this time into the preferred product solvent. This second extraction can be either concentration-driven or enhanced by changes in pH such as are described above in connection with the descriptions of SLM and CT. Greater detail concerning the MC separation process is disclosed in European Patent No. 0 246 065, the disclosure of which is incorporated herein by reference.

Turning to the drawings, wherein like abbreviations have the same meanings, FIG. 1a is a schematic diagram illustrating an exemplary hybrid separation system of the present invention wherein reverse osmosis (RO) is combined with pervaporation (Pvap) to separate water as a solvent from a solute comprising organics, for example, phenol or trichloroethylene. There, the feed comprising a mixture of water and organics is first fed to a suitable pervaporation membrane which allows selective permeation of the organic solute of concern. The organics-depleted or solute-poor retentate portion is then fed directly to the feed side of an RO membrane, which removes the solvent water by rejecting organics and permitting permeation of water through the RO membrane. The RO retentate, concentrated in organics, is combined with the process stream to form the feed for another separation cycle, and so on thereafter.

Figure 1B:
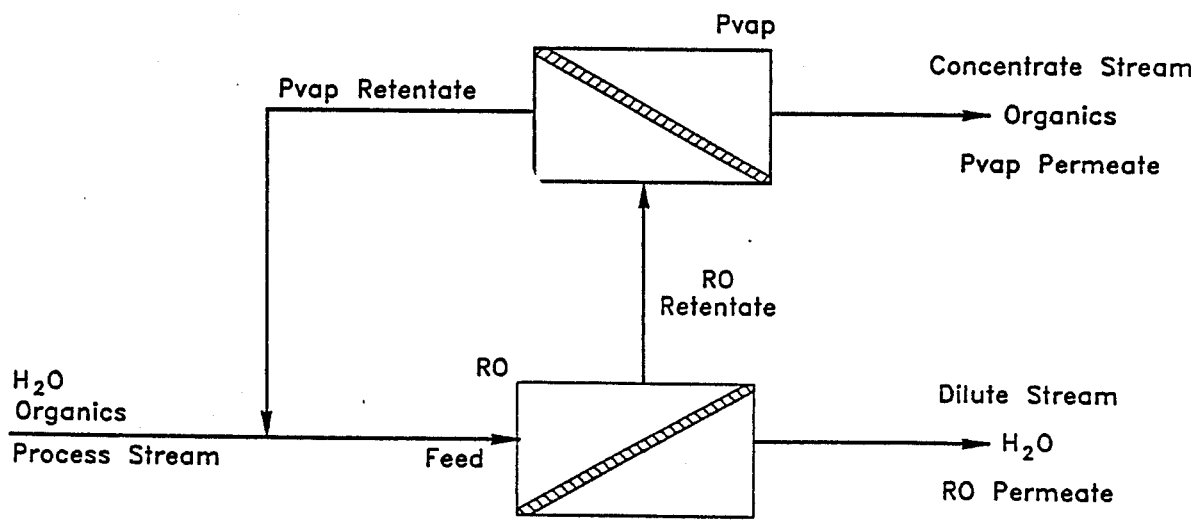

FIG. 1b illustrates the same hybrid separation system as FIG. 1a with the exception that the feed is first fed to the RO membrane and the RO retentate, or solvent-poor portion of the solvent removal process comprises the feed for the Pvap or solute-removal process and the solute-poor Pvap retentate is combined with the process stream to form the feed for another cycle.

It will be apparent that the overall effect of operation of such hybrid separation systems as are shown in FIGS. 1a and 1b is to separate the solvent and the solute from the process feed stream. What is not apparent however, as will be disclosed in greater detail below, is that the combination of the two processes in the manner indicated yields greater and more efficient separation than that obtainable from the two processes taken either singly or together but not combined in accordance with the present invention. Beyond the improvement in separation, the hybrid system of FIGS. 1a and 1b offers a number of other advantages, including the Pvap membrane having a higher flux with the higher concentration of organics in the bolstered feed thereto, a reduced likelihood of RO membrane fouling with the lower concentration of organics in the RO feed, the requirement for less RO membrane surface area due to the availability of a lower RO recovery required, lower concentration of the organic solute in the RO permeate due to its reduced concentration in the feed, and increased adjustability of the entire separation process by varying the composition and surface area of both the RO and the Pvap membranes, as well as operating conditions, to meet the purity and concentration requirements of the separation with a minimum of membrane surface area, which minimizes cost.

Figure 2A:
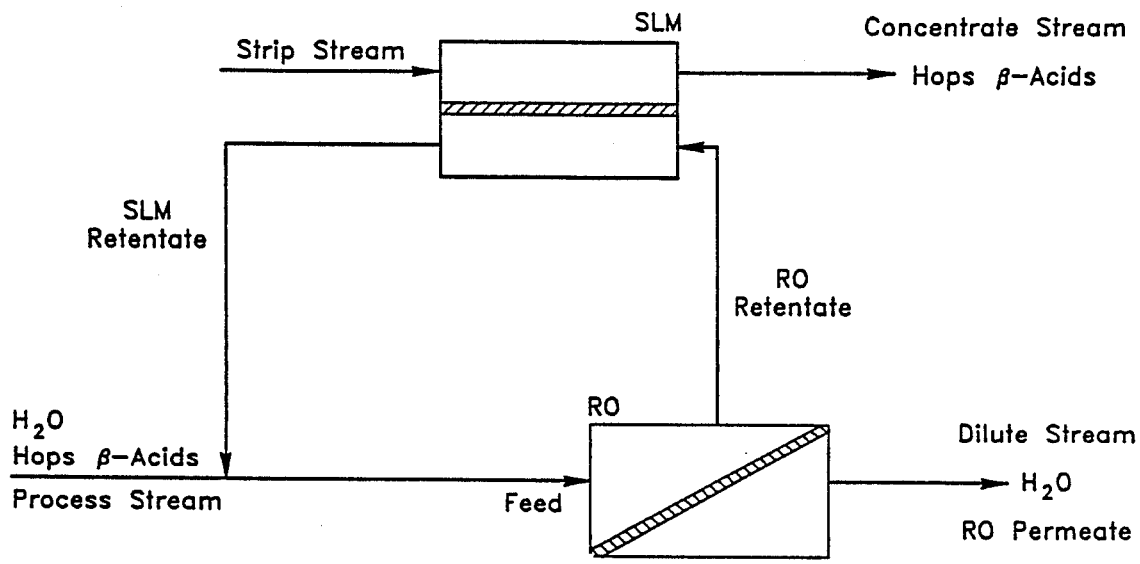

FIG. 2a is a schematic diagram illustrating an exemplary hybrid separation system of the present invention wherein RO is combined with a supported-liquid membrane (SLM) to separate water as a solvent from a solute comprising another organic component, for example, beta acids from hops extract. There, the feed comprising a mixture of water and hops acids is first fed to an RO membrane which allows permeation of water but rejects the organic solute of concern. The RO retentate, comprising the solvent-poor portion of the solvent-removal RO process, makes up the feed for the SLM process, which selectively removes the organic solute by being provided with an extracting agent selective to the solute on the feed side of the SLM, and with a stripping solution on the permeate side of the SLM that liberates the solute from the extracting agent. The solute-depleted SLM retentate is then combined with the RO feed where more water is removed and the solute concentrated in another cycle, and so on thereafter.

Figure 2B:
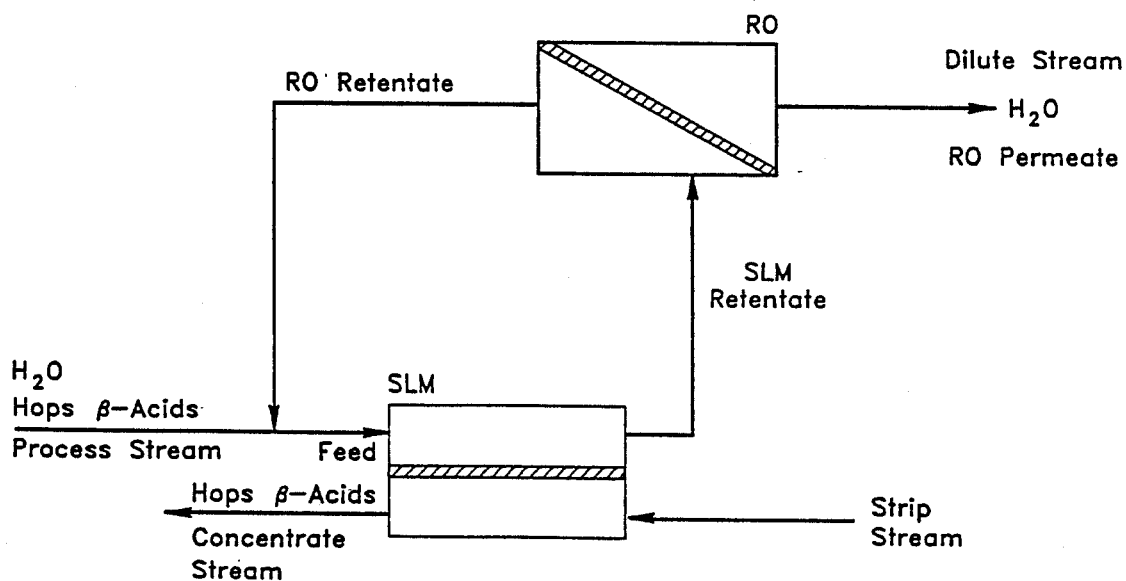

FIG. 2b illustrates the same hybrid separation system as FIG. 2a with the exception that the feed is first fed to the SLM for removal of the solute and the SLM retentate, or solute-poor portion of the SLM solvent-removal process, makes up the feed for the RO solvent removal process, and the solvent-poor RO retentate is combined with the process stream to form the feed for another separation cycle.

The hybrid system of FIGS. 2a and 2b also exhibits synergistic separation capability, and offers a number of other advantages as well, including the achievement of higher flux for the SLM with the higher concentration of organics in the bolstered feed to the SLM, fewer impurities in the RO permeate on account of lower concentration of those impurities in the RO feed, the requirement for less RO membrane surface area due to the low RO recovery required to operate the system, lower concentration of the organic solute in the RO permeate due to its reduced concentration in the feed, and increased adjustability of the overall process by varying the operating conditions and the composition and surface area of both the RO and SLM membranes, to meet the necessary purity and concentration requirements, with a minimum membrane surface area.

Figure 3A:
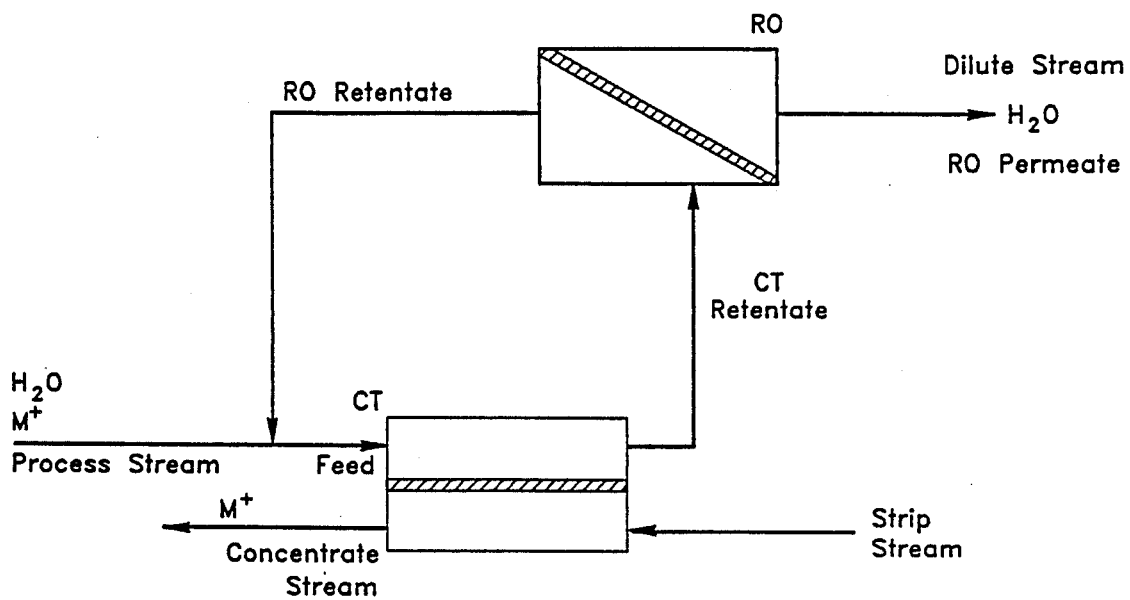

FIG. 3a is a schematic diagram illustrating an exemplary hybrid separation system of the present invention wherein RO is combined with coupled transport (CT) to separate a metal ion ($M^+$) solute from water. The aqueous metal ion solution is fed to a suitable CT membrane which is provided with a carrier that complexes the metal ion on the feed side of the membrane, and which is further provided with a strip or product solution on the permeate side of the membrane to free the metal ion from the carrier. The co-ion that preserves electrical neutrality is $H^+$. The CT retentate, depleted in metal ion, comprises the feed for the RO membrane, which removes the solvent water. The RO retentate, depleted in solvent and concentrated in metal ion, is combined with the process stream to form the feed for another separation cycle.

Figure 3B:
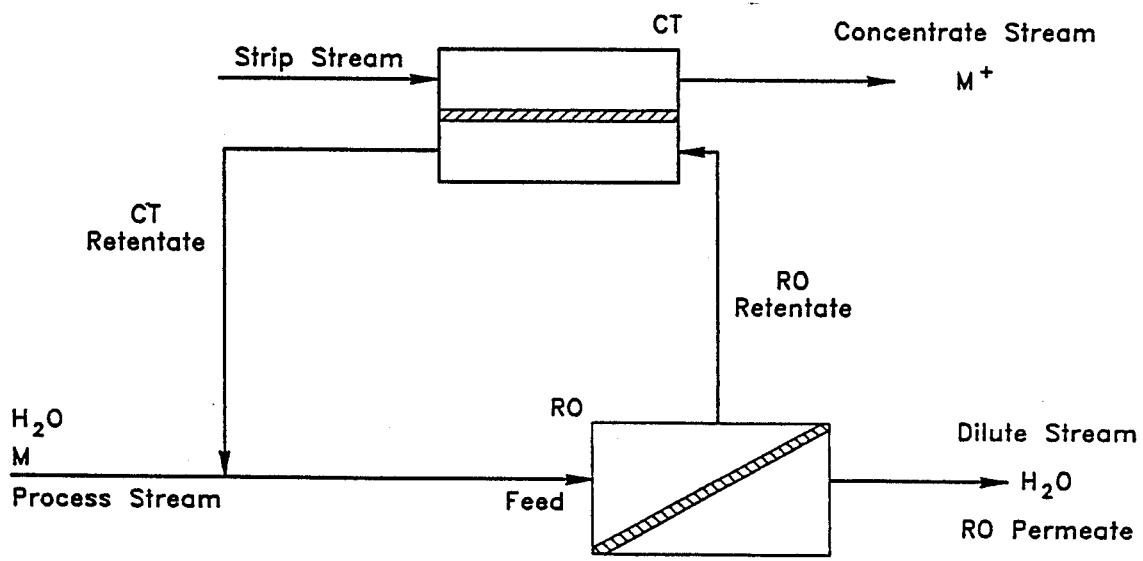

FIG. 3b illustrates the corollary of the hybrid separation system of FIG. 3a in that the feed is first fed to the RO membrane and the RO retentate, or solvent-poor (solute-rich) portion of the solvent removal process comprises the feed for the CT solute removal process, while the solute-poor CT retentate is combined with the process stream to form the feed for another separation cycle.

In addition to surprisingly synergistic separation capability, the hybrid system of FIGS. 3a and 3b offers the additional advantages of obtaining higher CT flux with the resultant higher concentration of metal ions in the CT feed, a lower metal ion concentration in the RO permeate due to the lower concentration of metal ions in the RO feed, the requirement for less RO membrane surface area due to the low RO recovery, and similar increased adjustability and efficiency of the overall system due to the ability to vary the composition and minimize the surface area of both the RO and CT membranes.

Figure 4A:
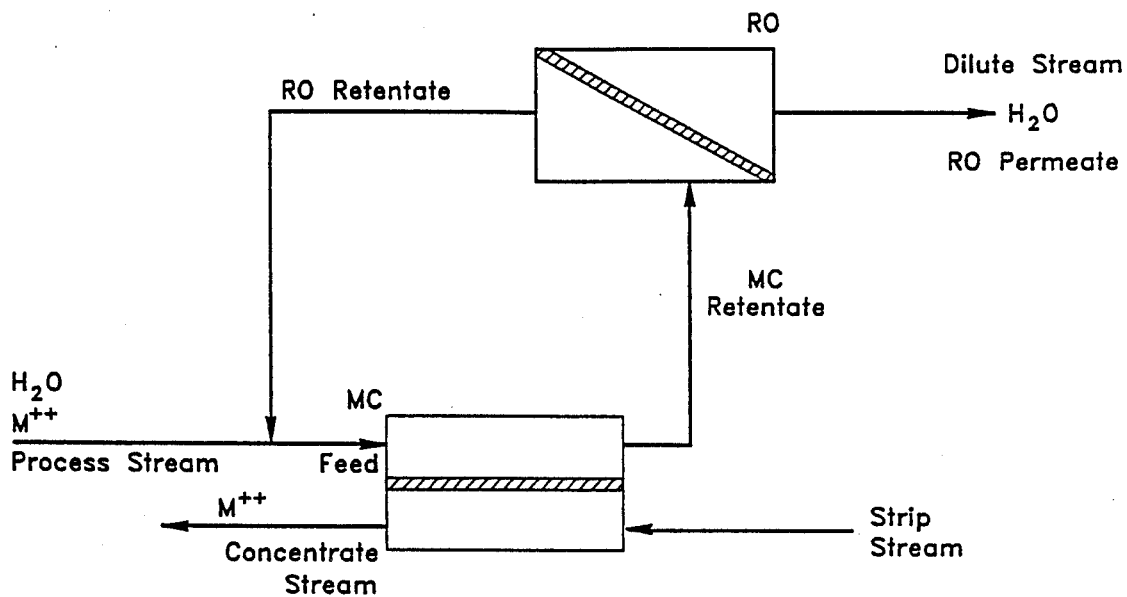

FIG. 4a is a schematic diagram illustrating an exemplary hybrid separation system of the present invention wherein RO is combined with a membrane contactor (MC) process to separate the solvent water from a metal ion ($M^{++}$) solute. The aqueous metal ion solution is fed to a suitable MC-type membrane provided with an appropriate water-immiscible organic liquid extractant, or it may contain a complexing agent to perform in the same way as a CT membrane to extract the metal ion from the permeate side of the membrane, allowing it to be bled off from a recycling liquid extractant, or otherwise treated or removed from the system. The metal ion-depleted MC retentate makes up the feed to the RO membrane, where water is removed and the metal ion-rich RO retentate is combined with the process stream to make up the feed for another cycle of metal ion extraction, et cetera.

Figure 4B:
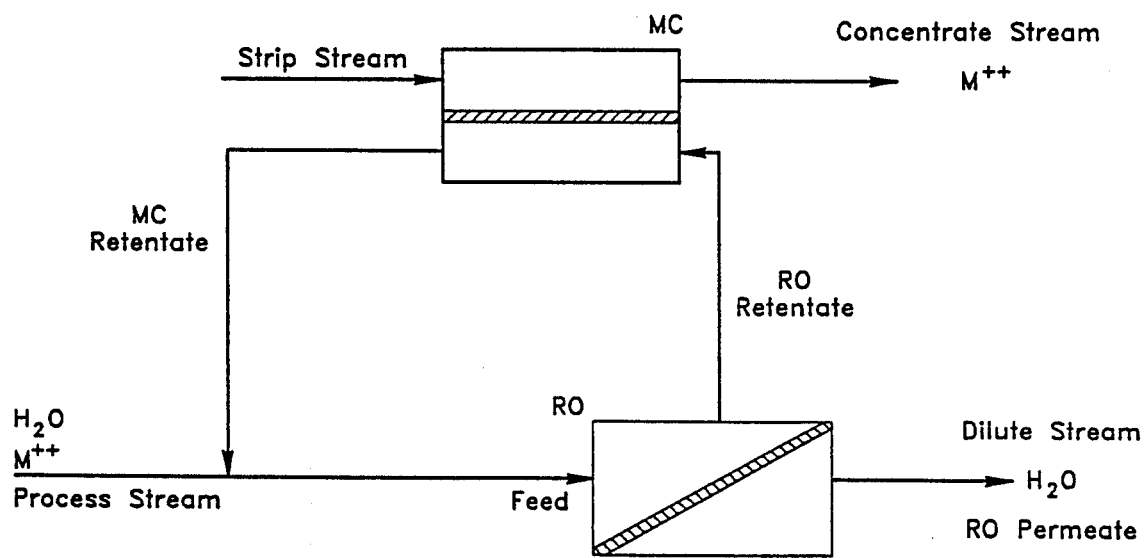

FIG. 4b illustrates the converse of the hybrid system of FIG. 4a, where the aqueous metal ion feed solution is initially fed to the RO membrane, the solvent-depleted (metal ion-rich) RO retentate comprises the feed to the MC-type membrane, and the MC retentate is combined with the process stream to make up the feed for recycling.

In addition to the synergistic separation capability of the RO/MC hybrid system of FIGS. 4a and 4b, the system offers similar advantages to the other hybrid systems illustrated above. Because of the higher feed concentration for the MC process, that process has a higher flux, the RO membrane is subjected to fewer impurities because of the lower metal ion concentration in the RO feed, less RO membrane surface area is required, and there is more adjustability in the hybrid process because of the inclusion of a second, different type of membrane.

FIGS. 5a–f are schematics illustrating various embodiments of an exemplary hybrid separation system of the present invention wherein RO is combined with more than one solute removal process, namely, an SLM process and a Pvap process, to separate the solvent water and a solute comprising two organic components, for example, ethanol and citric acid.

Figure 5A:
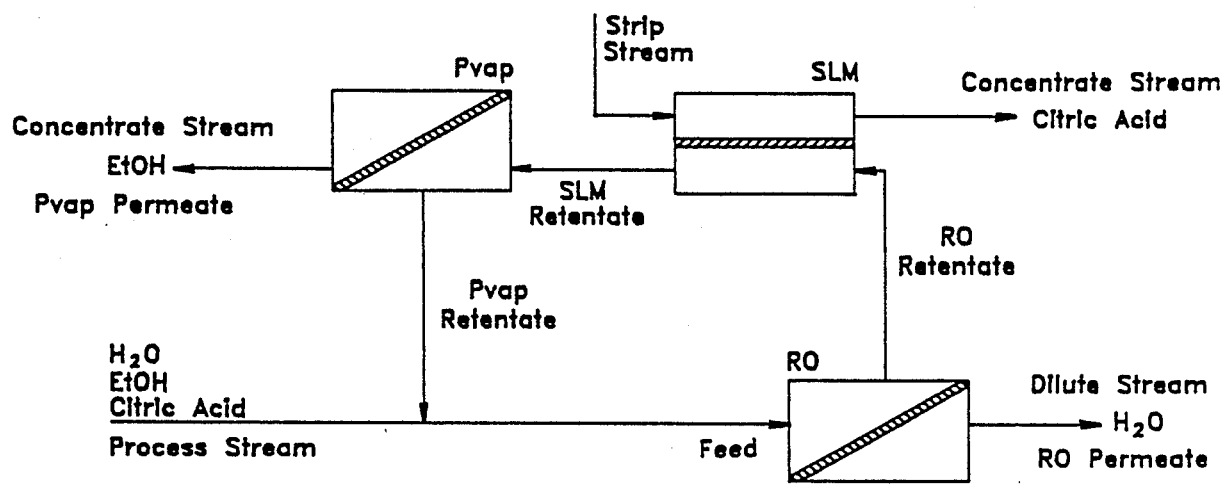

FIG. 5a shows the feed, for example, a fermentation broth, the principal constituents of which are water, ethanol and citric acid, being first fed to a suitable RO membrane which rejects most of the citric acid and some of the ethanol, at the same time allowing permeation of water. The solvent-poor RO retentate is then fed directly to the feed side of a supported-liquid membrane which is provided with a water-immiscible liquid extractant specific to one of the solutes, say citric acid, and is further provided with an aqueous strip solution to liberate the extracted solute and allow it to be bled off in solution. The SLM retentate, still solvent-poor with respect to water, comprises the feed to a pervaporation membrane which is selective for the removal of ethanol. The retentate from this membrane is then combined with the process stream to form the feed for another separation cycle.

Figure 5B:
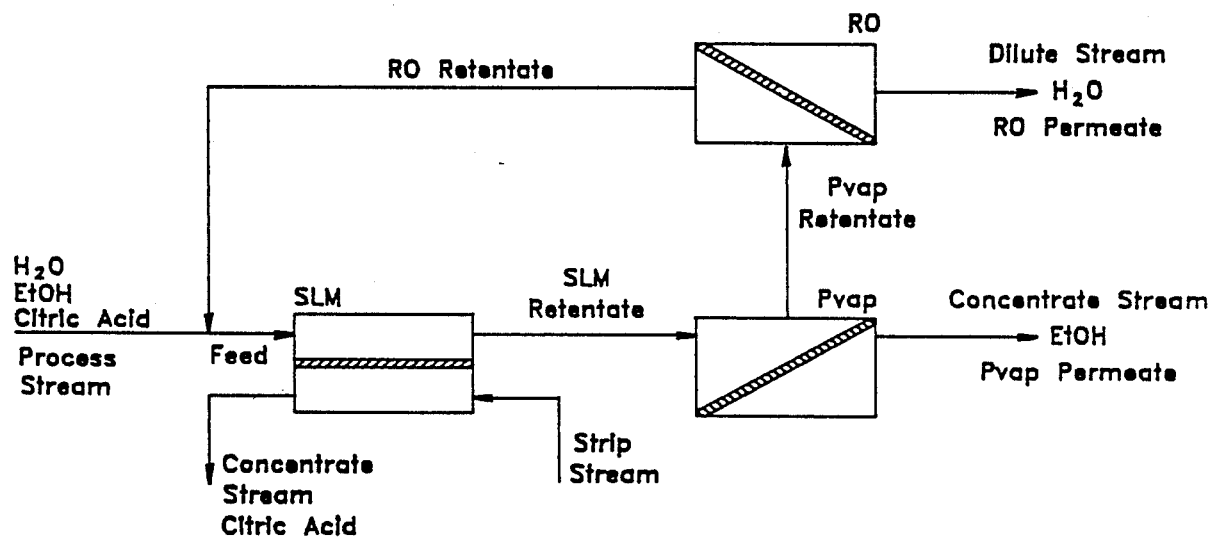

FIG. 5b illustrates another of the six possible permutations of the hybrid system of FIG. 5a, where the fermentation broth is initially fed to the SLM membrane; the SLM retentate, solute-poor as to citric acid, comprises the feed to the Pvap membrane; the Pvap retentate, solute-poor with respect to both citric acid and ethanol, comprises the feed to the RO membrane; and the solvent-depleted RO retentate is combined with the process stream to make up the feed for recycling.

Figure 5C:
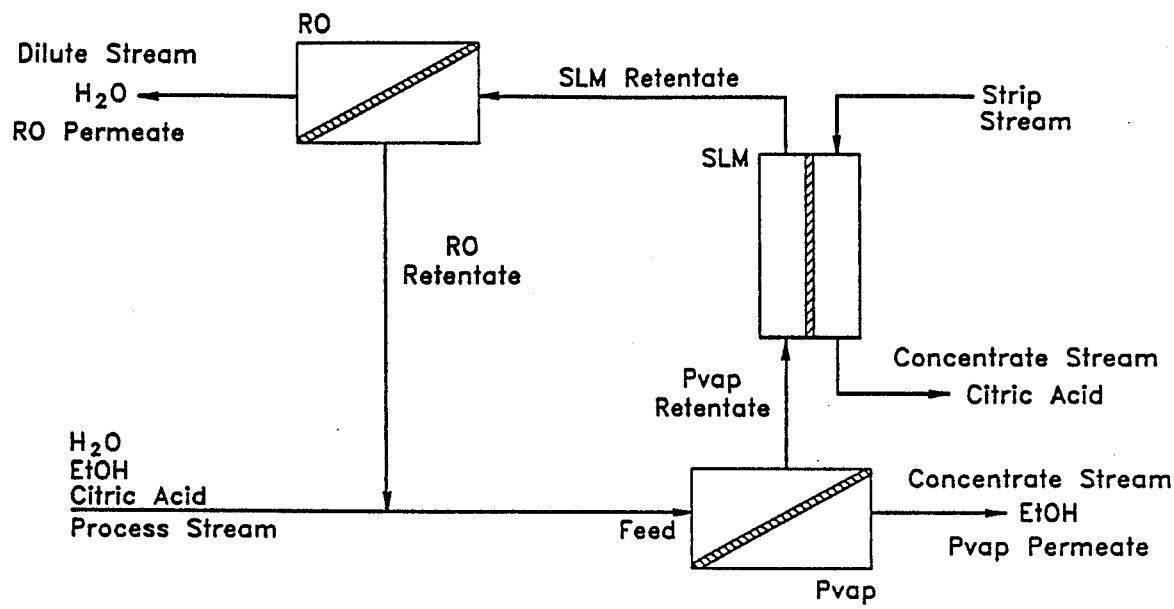

FIG. 5c illustrates another variation of the hybrid system of FIG. 5a, where the fermentation broth is initially fed to the Pvap membrane; the Pvap retentate, solute-poor as to ethanol, comprises the feed to the SLM membrane; the SLM retentate, solute-poor as to both solutes, comprises the feed to the RO membrane; and the solvent-depleted RO retentate is combined with the process stream to make up the feed for recycling.

Figure 5D:
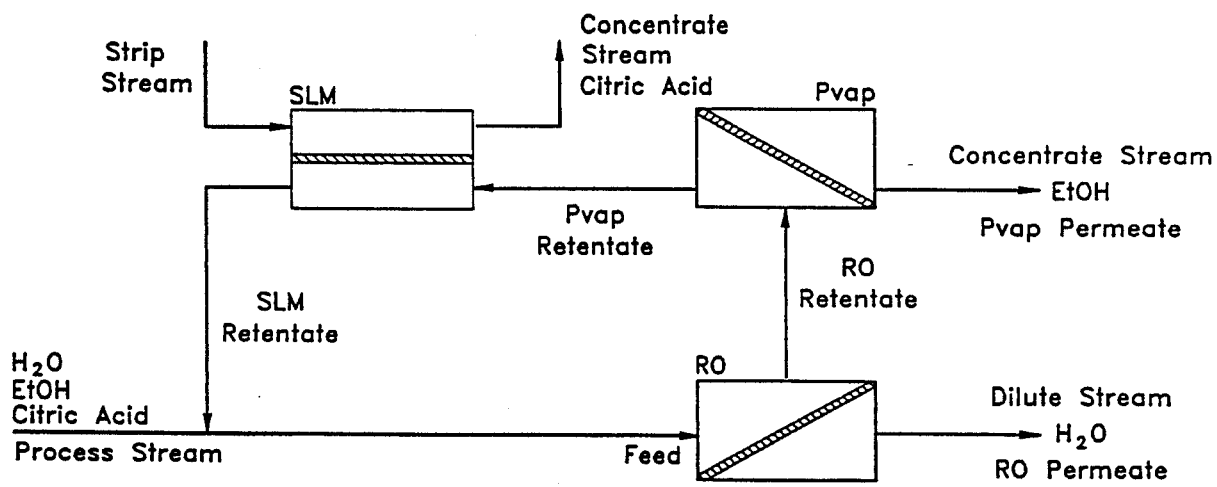

FIG. 5d illustrates another variation of the hybrid system of FIG. 5a, where the fermentation broth is initially fed to the RO membrane; the solvent-depleted RO retentate comprises the feed to the Pvap membrane; the Pvap retentate, still solvent-depleted and solute-poor as to ethanol, comprises the feed to the SLM membrane; and the SLM retentate is combined with the process stream to make up the feed for recycling.

Figure 5E:
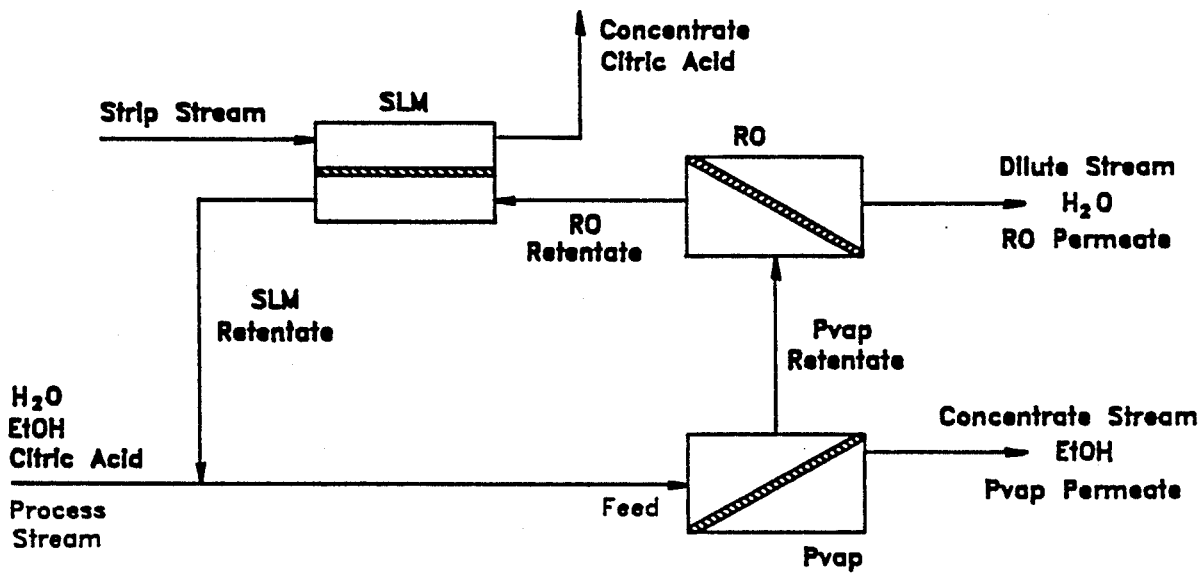

FIG. 5e illustrates still another variation of the hybrid system of FIG. 5a, where the fermentation broth is initially fed to the Pvap membrane; the Pvap retentate, solute-poor as to ethanol, comprises the feed to the RO membrane; the solvent-depleted RO retentate comprises the feed to the SLM membrane; and the SLM retentate, solute-poor as to both solutes, is combined with the process stream to make up the feed for recycling.

Figure 5F:
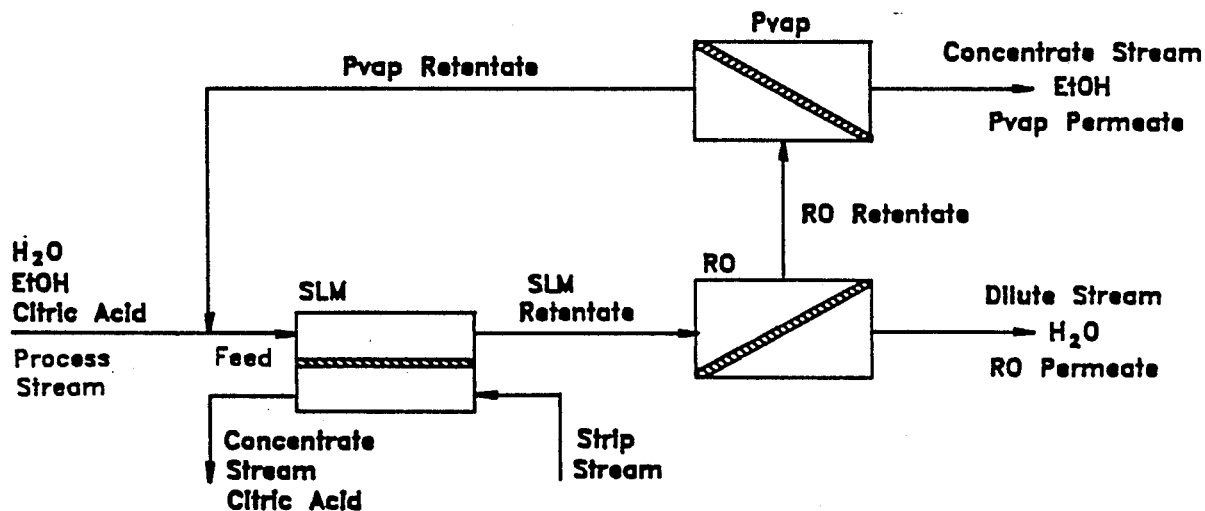

FIG. 5f illustrates yet another variation of the hybrid system of FIG. 5a, where the fermentation broth is initially fed to the SLM membrane; the SLM retentate, solute-poor as to citric acid, comprises the feed to the RO membrane; the solvent-depleted RO retentate comprises the feed to the Pvap membrane; and the Pvap retentate, now solute-poor with respect to both solutes, is combined with the process stream to make up the feed for recycling.

In such a hybrid process as illustrated in FIGS. 5a–f, both the SLM and Pvap membranes have a higher flux with the higher concentration of organics in their respective feeds, the RO membrane has a reduced likelihood of fouling with the lower concentration of organics in the RO feed, and there exists an even greater adjustability than the two-component hybrid processes described above due to the ability to adjust the membrane area and flux for a third membrane.

FIGS. 6a–f are schematics illustrating various configurations of another exemplary hybrid separation process of the present invention wherein RO is combined with CT and SLM to separate water as a solvent from a solute comprising a metal ion ($M^+$) and an organic, for example, phenol.

Figure 6A:
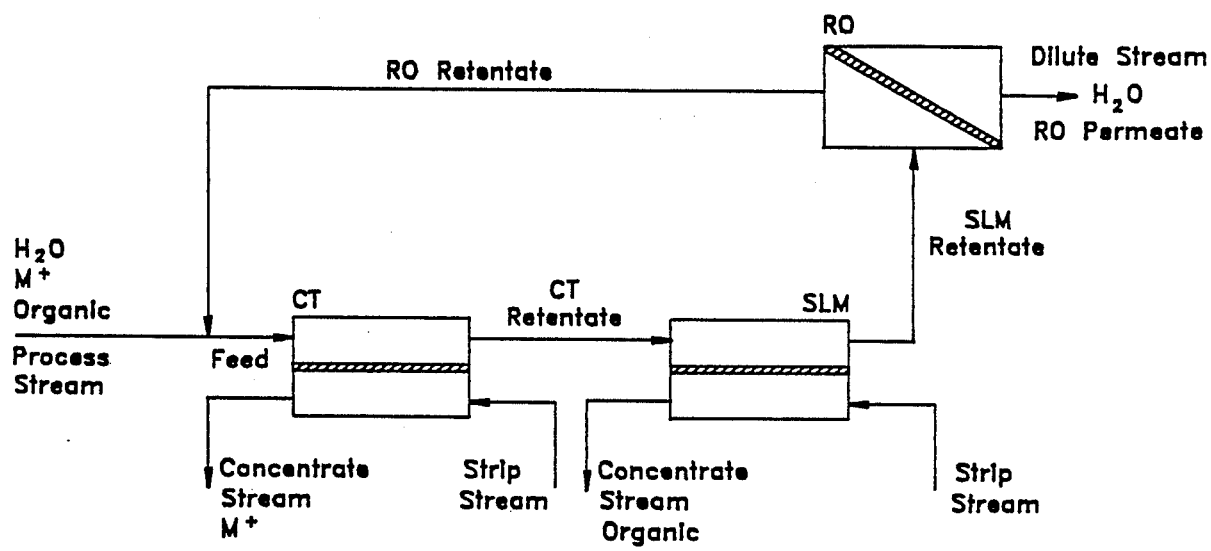

FIG. 6a shows the feed, comprising the solvent and the two solutes, being fed first to a suitable CT membrane that is provided with an extractant capable of complexing the metal ion, and is further provided with a recirculating strip or product solution that frees the metal ion from its complex at the permeate side of the membrane and carries it in solution to be bled off or otherwise disposed of or treated. The co-ion, which preserves electrical neutrality, is $H^+$. The retentate from the CT membrane is fed to the supported-liquid membrane, also provided with a solvent that selectively extracts the organic solute, and with a stripping stream which liberates the organic solute from the permeate side of the membrane. The SLM retentate is then fed to the RO membrane, which allows permeation of water and rejects remaining metal ion and organic solutes in its retentate, which is then recombined with the process stream to form the feed for another cycle of separation.

Figure 6B:
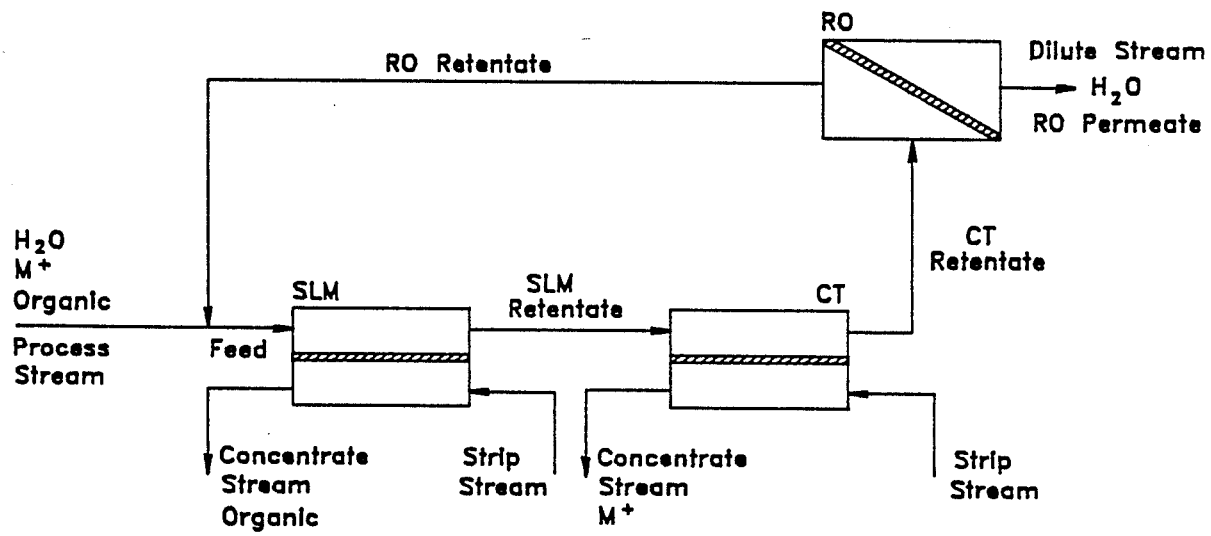

FIG. 6b illustrates another variant of the hybrid system of FIG. 6a, where the feed is first fed to the SLM membrane; the SLM retentate, solute-poor as to the organic solute, comprises the feed to the CT membrane; the CT retentate, solute-poor as to both the metal ion and the organic solute, comprises the feed to the RO membrane; and the solvent-depleted RO retentate is combined with the process stream to make up the feed for recycling.

Figure 6C:
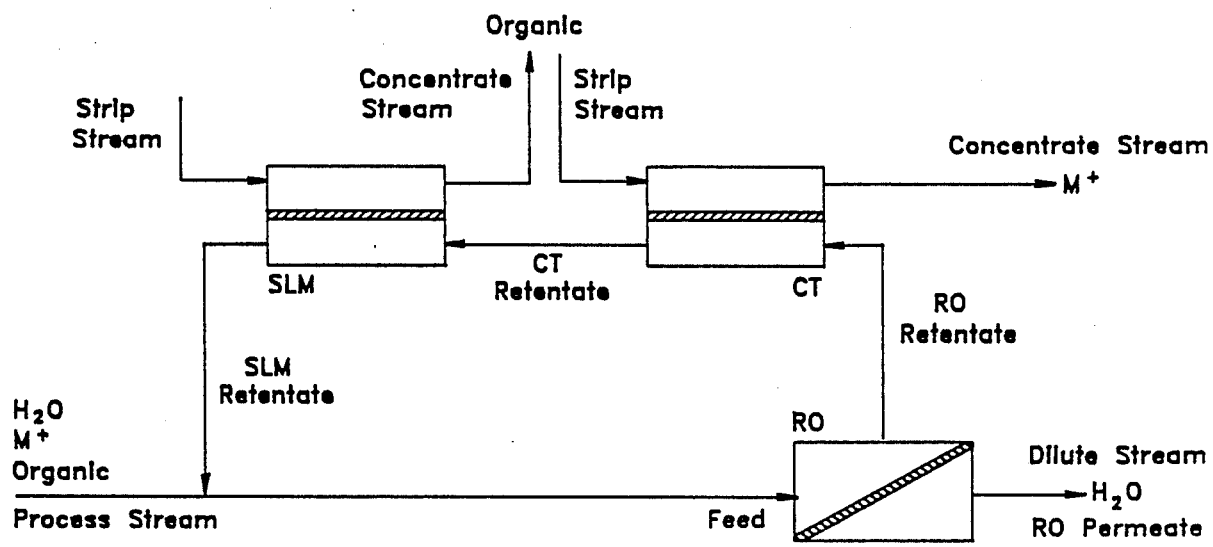

FIG. 6c illustrates another variation of the hybrid system of FIG. 6a, where the feed is first fed to an RO membrane; the solvent-depleted RO retentate comprises the feed to the CT membrane; the CT retentate, now solute-poor as to the metal ion, comprises the feed to the SLM membrane; and the SLM retentate, solute-poor with respect to both the metal ion and organic solutes, is combined with the process stream to form the feed for recycling.

Figure 6D:
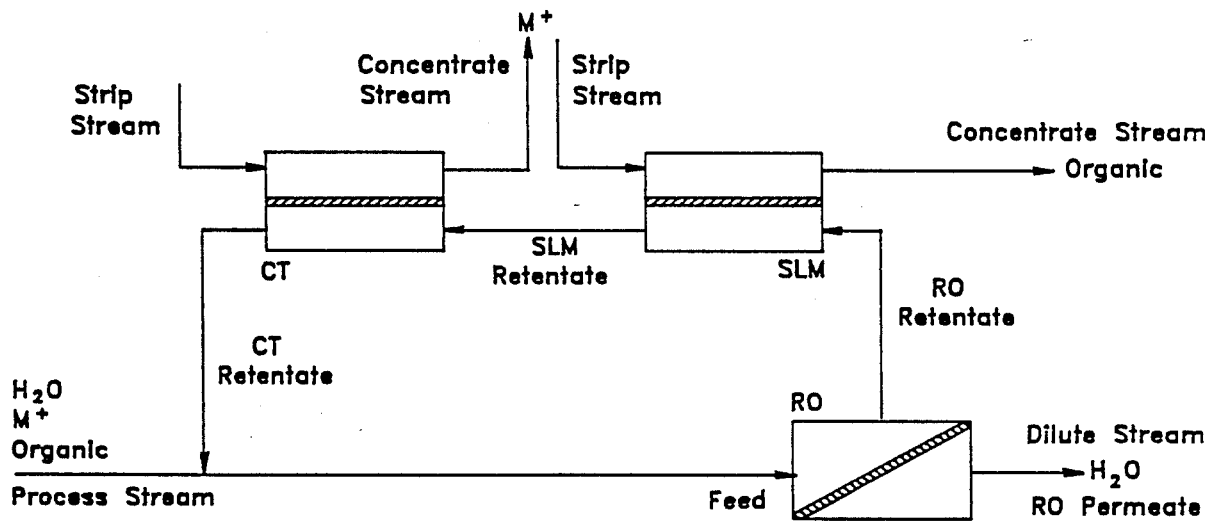

FIG. 6d illustrates another variation of the hybrid system of FIG. 6a, where the feed is again first fed to the RO membrane; the solvent-poor RO retentate comprises the feed to the SLM membrane; the SLM retentate, solute-poor as to the organic solute, comprises the feed to the CT membrane; and the CT retentate, now solute-poor as to both solutes, is combined with the process stream to make up the feed for recycling.

Figure 6E:
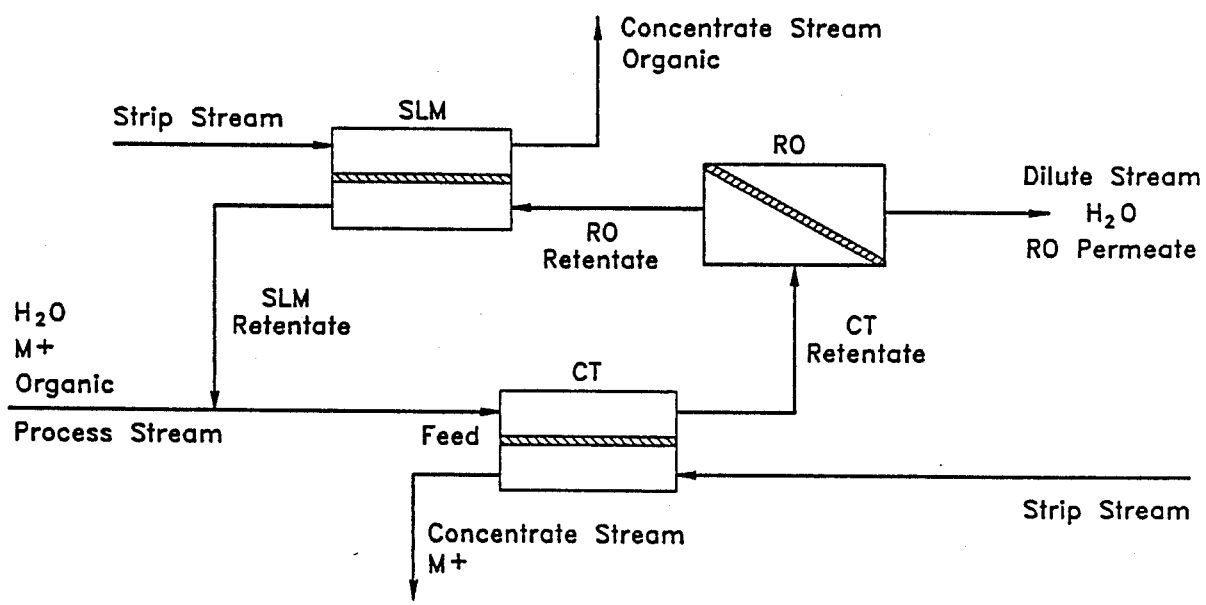

FIG. 6e illustrates still another variation of the hybrid system of FIG. 6a, wherein the feed is first fed to a CT membrane; the CT retentate, depleted in metal ion, forms the feed to the RO membrane; the solvent-depleted RO retentate forms the feed to the SLM membrane; and the SLM retentate, depleted as to both solutes, is combined with the process stream to make up the feed for recycling.

Figure 6F:
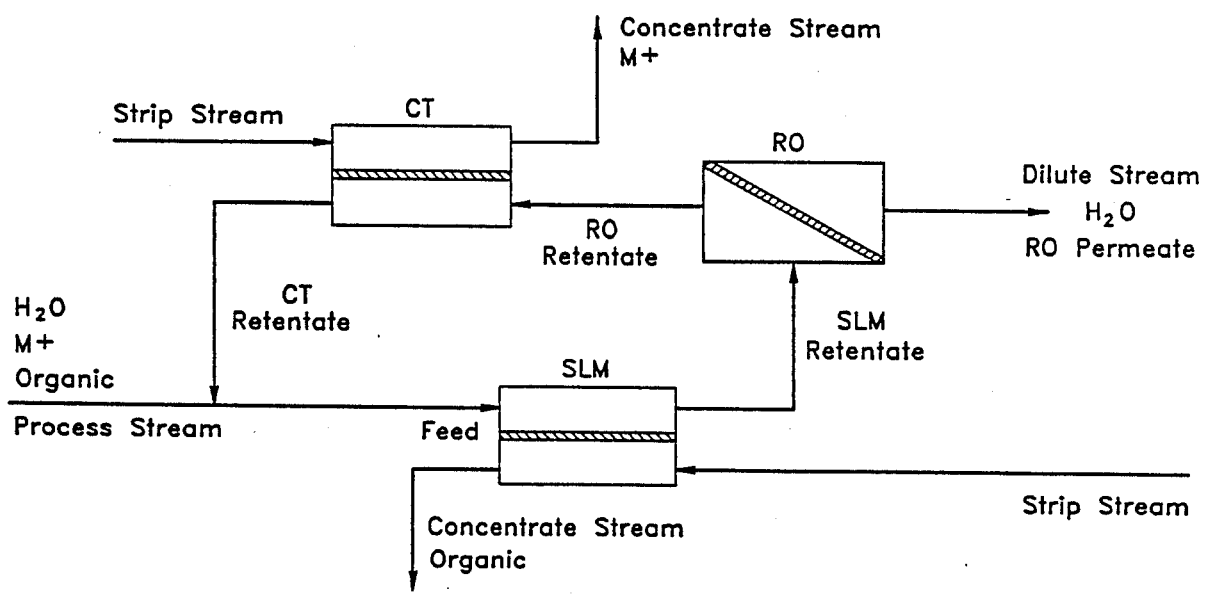

FIG. 6f illustrates yet another variation of the hybrid system of FIG. 6a, wherein the feed is first fed to the SLM membrane; the SLM retentate, solute-poor as to organic solute, forms the feed to the RO membrane; the solvent-depleted RO retentate makes up the feed to the CT membrane; and the CT retentate, solute-poor as to both solutes, is combined with the process stream to form the feed for recycling.

As was the case with the hybrid system of FIGS. 5a-f, the hybrid system of FIGS. 6a-f offers the same advantages for the RO separation and as to adjustability, as well as the same higher fluxes for the non-RO separations due to the higher feed concentrations to the respective membranes.

FIGS. 7a-f are schematics illustrating another exemplary hybrid separation system of the present invention wherein RO is combined with CT and Pvap to separate water as a solvent from a solute comprising a metal ion ($M^+$) and an organic, for example, trichloroethane (TCA).

Figure 7A:
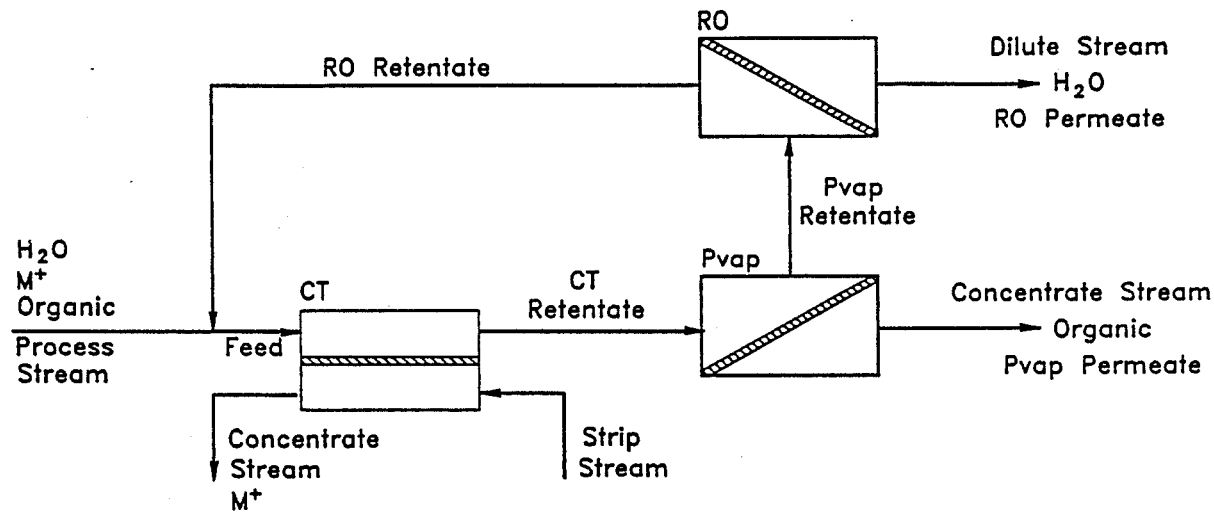
Figure 7B:
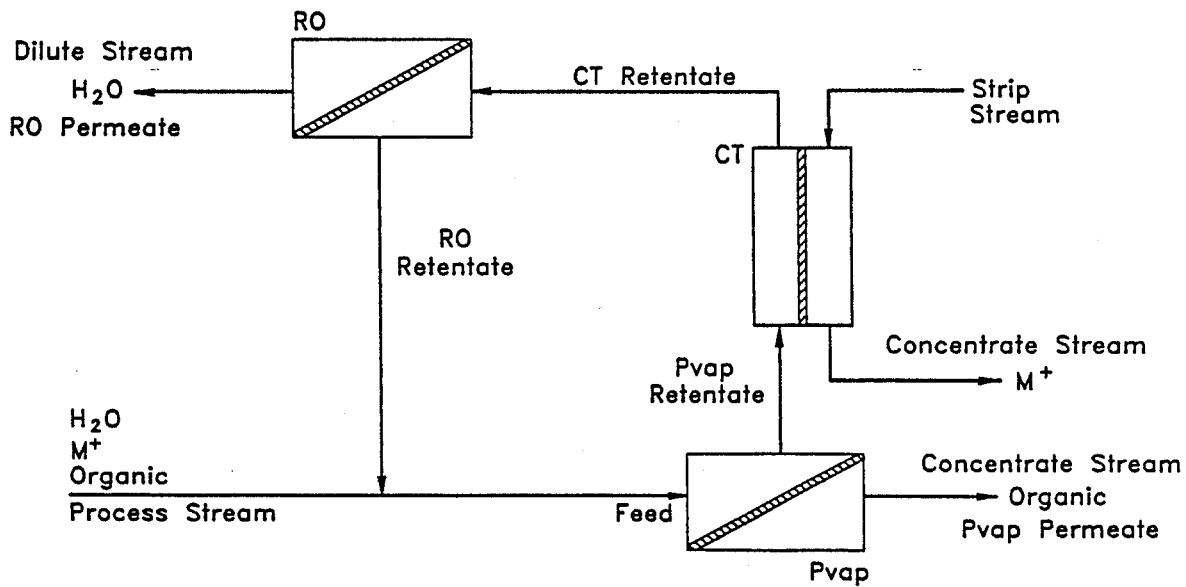
Figure 7C:
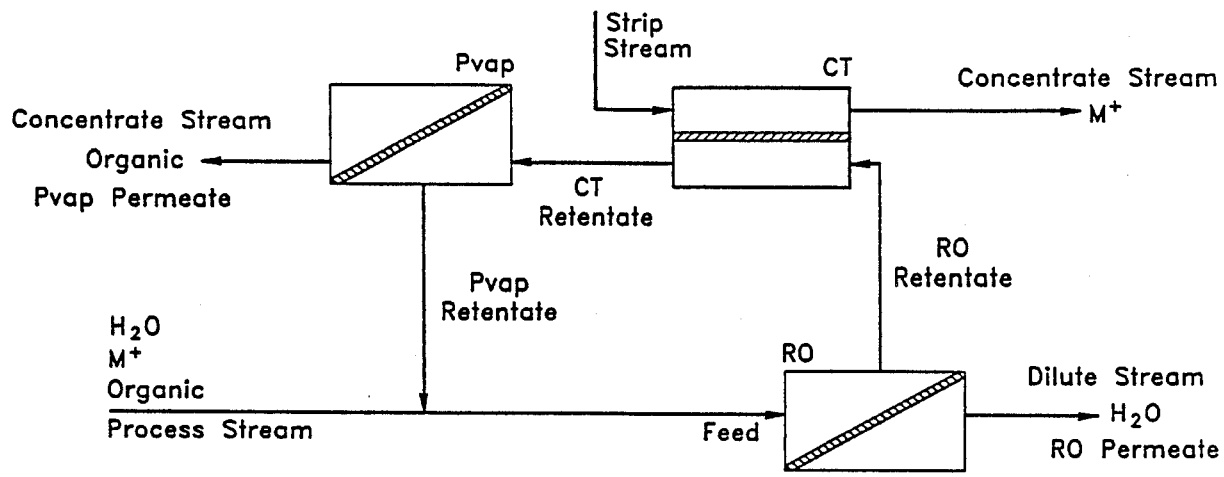
Figure 7D:
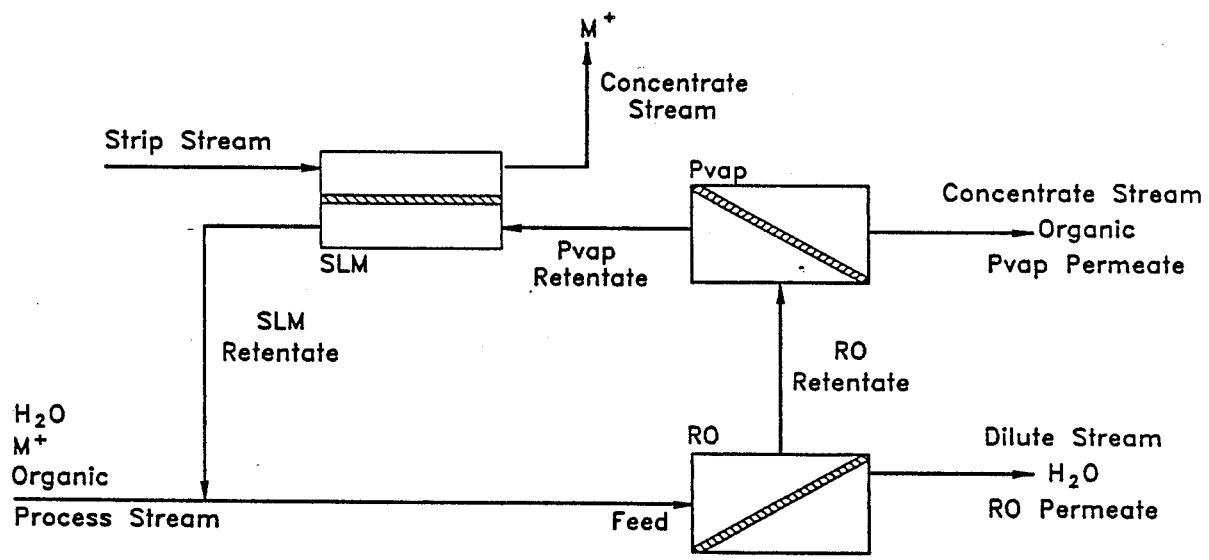
Figure 7E:
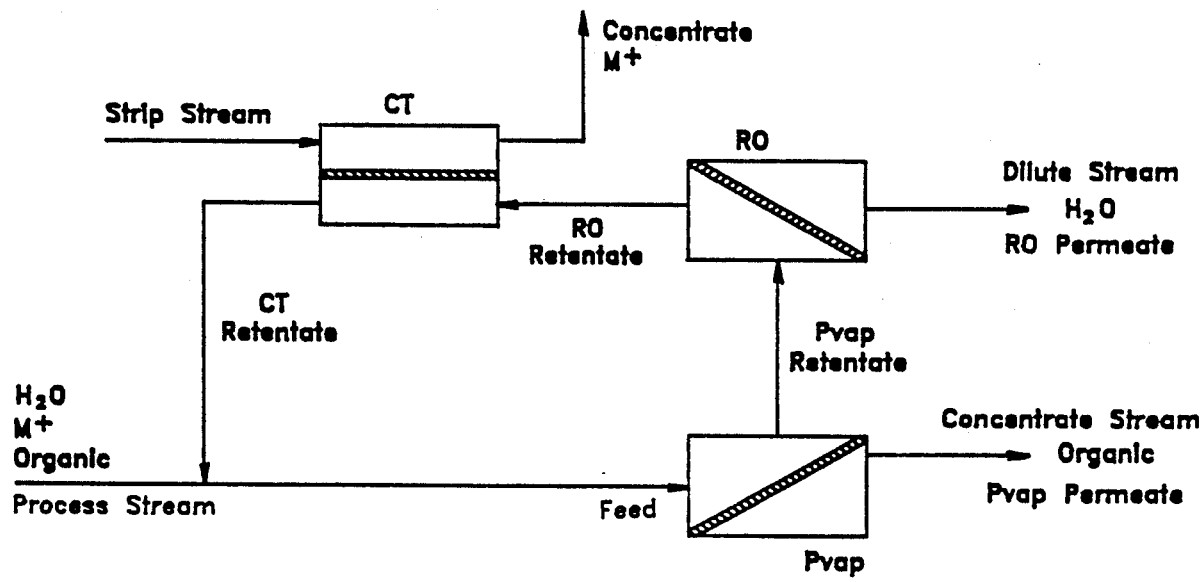
Figure 7F:
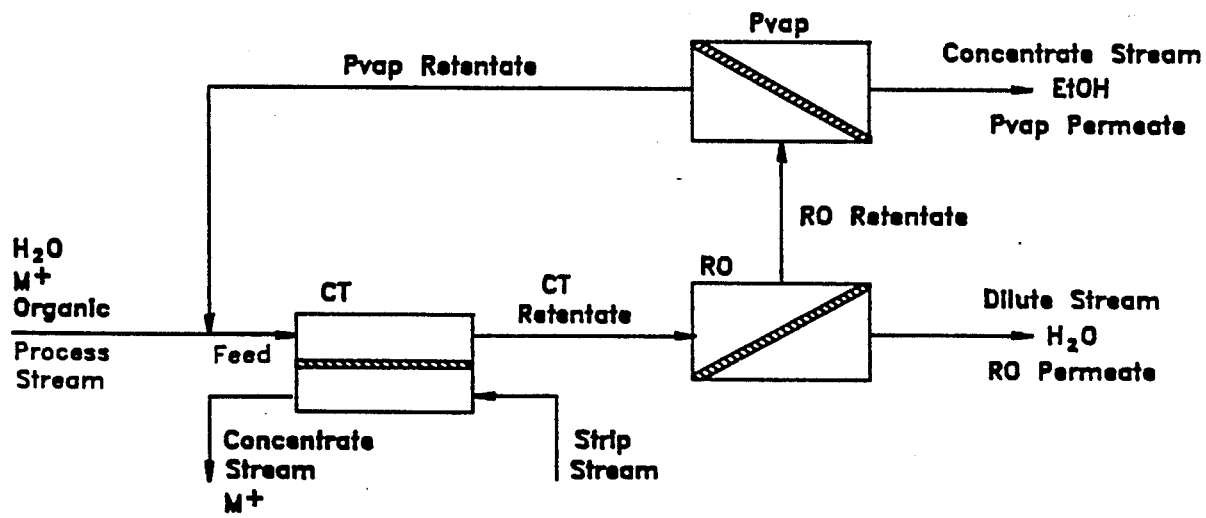

In FIG. 7a, the feed is first fed to the CT membrane, which is provided with an extractant which complexes the metal ion, and also with a strip or product solution to liberate the metal ion from the carrier and remove it from the system by, for example, a bleed-off mechanism. The co-ion is $H^+$. The CT retentate is then fed to a Pvap membrane chosen to be selective for the organic solute, which allows the same to permeate. The Pvap retentate is then fed to the RO membrane, which removes water, thereby concentrating the remaining metal ion and organic solutes in the RO retentate, which is then combined with the process stream to form the feed to the CT membrane for another cycle.

FIGS. 7b-f comprise schematic illustrations of the other possible variants of the hybrid separation system of FIG. 7a, wherein the indicated solute- or solvent-poor retentates comprise the feeds and recycle feed make-up for the various selective membrane separations shown. All of the same advantages are obtainable with the hybrid system of FIGS. 7a-f as for the hybrid systems exemplified in FIGS. 5 and 6.

FIGS. 8a-f are schematics illustrating another exemplary hybrid system of the present invention, wherein RO is combined with MC and Pvap to separate water as a solvent from a solute comprising organics, for example, protein and an alcohol.

Figure 8A:
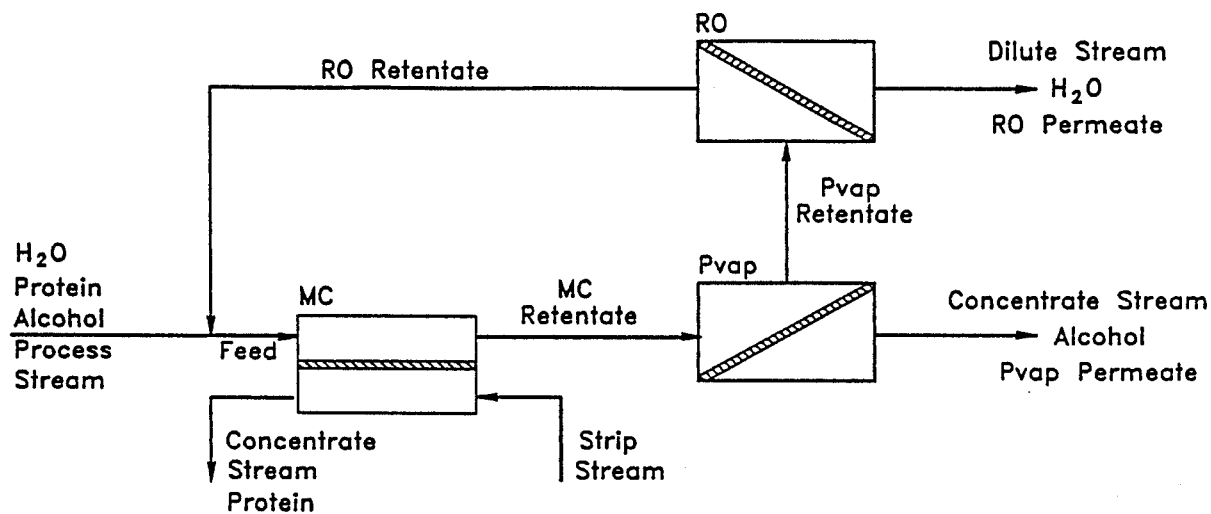
Figure 8B:
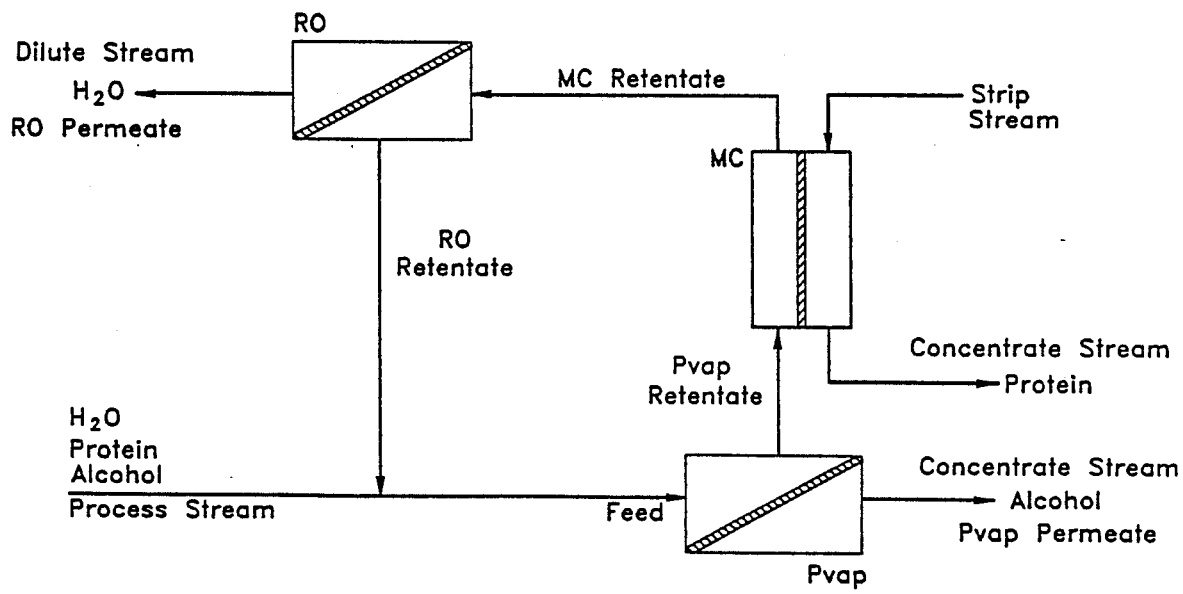
Figure 8C:
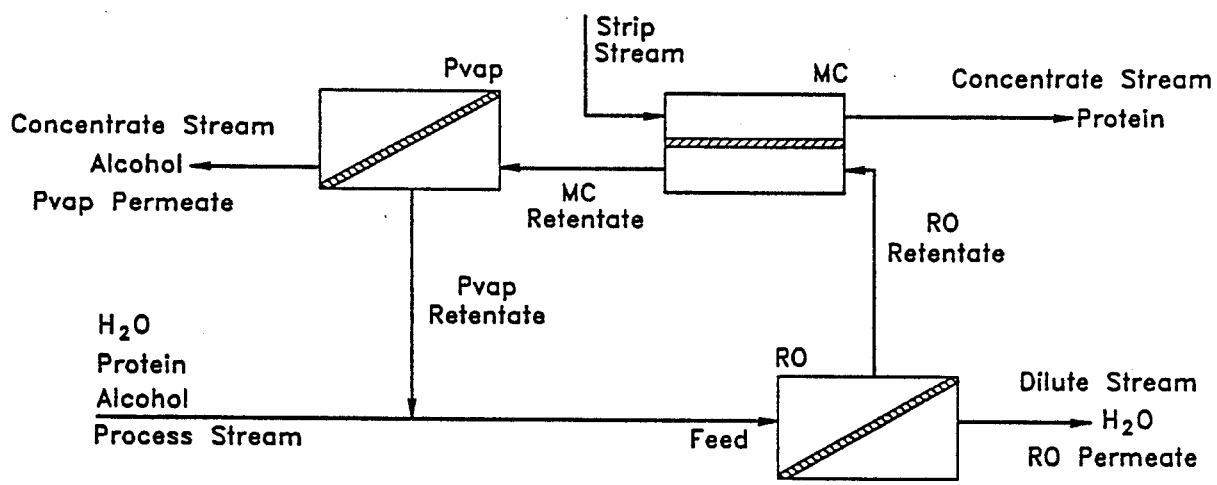
Figure 8D:
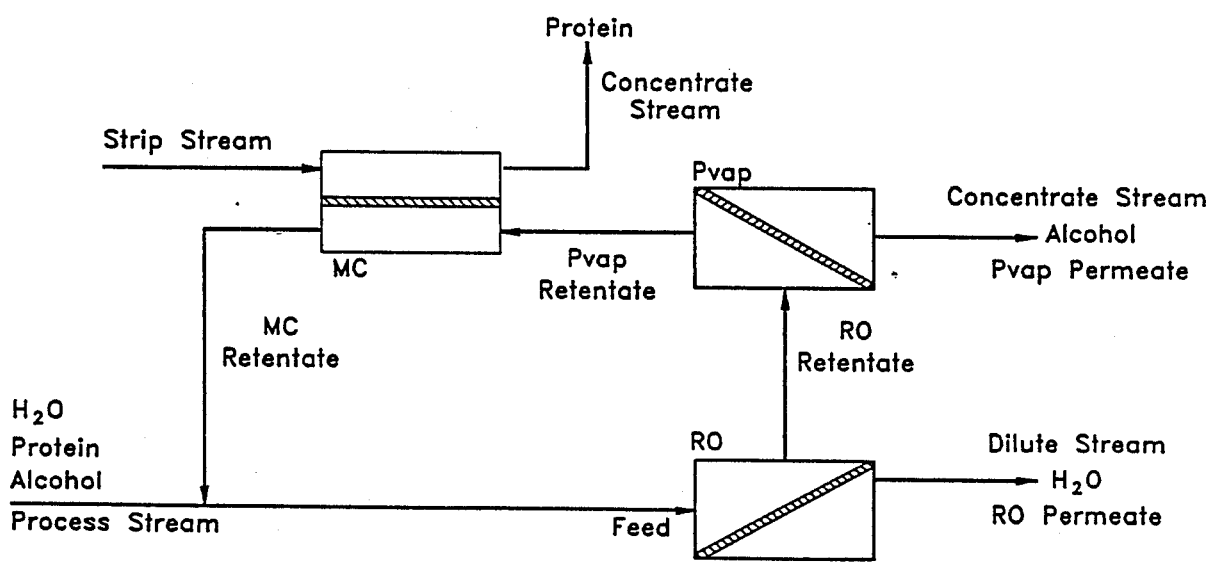
Figure 8E:
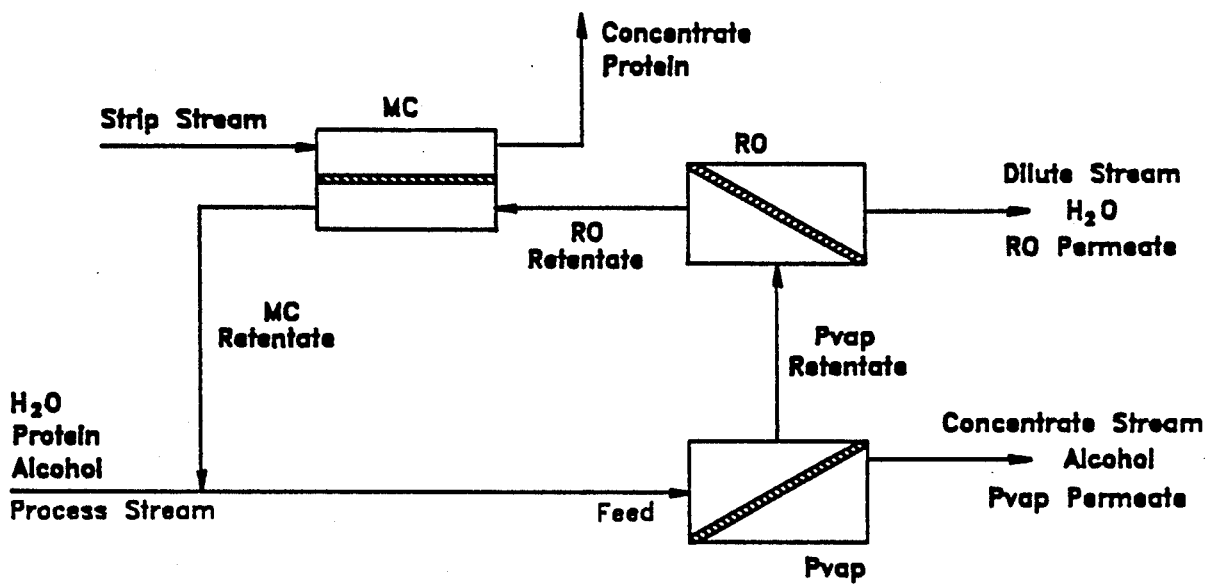
Figure 8F:
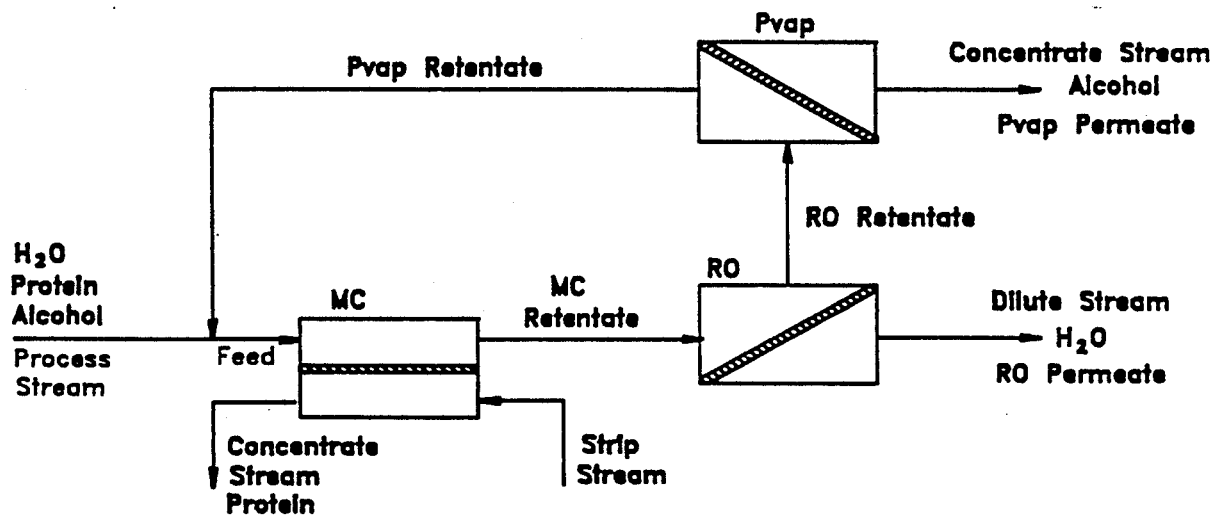

In FIG. 8a, the feed, comprising, for example, a fermentation broth, is first fed to the feed side of a membrane contactor, the permeate side of which is provided with a water-immiscible extractant having a higher affinity for the protein than for the broth, thereby extracting the protein and allowing the same to be bled off or otherwise disposed of or treated. The retentate from the membrane contactor is then fed to a pervaporation membrane that is selective to the alcohol present, allowing the same to selectively permeate therethrough. The Pvap membrane retentate is then fed to an RO membrane where water is removed and protein and alcohol are concentrated in the retentate, which in turn is then combined with the fermentation broth to form the feed for another separation cycle.

FIGS. 8b-f comprise schematic illustrations of the other possible variants of the hybrid separation system of FIG. 8a, wherein the indicated solute-or solvent-poor retentates comprise the feeds and recycle feed makeup for the various selective membrane separations shown. The hybrid system of FIGS. 8a-f offers the same advantages as those of previously discussed hybrid separation systems of the present invention.

FIGS. 9a-f are schematics depicting another exemplary hybrid separation system of the present invention wherein RO is combined with MC and SLM to separate water as a solvent from a solute comprising, for example, two organics.

Figure 9A:
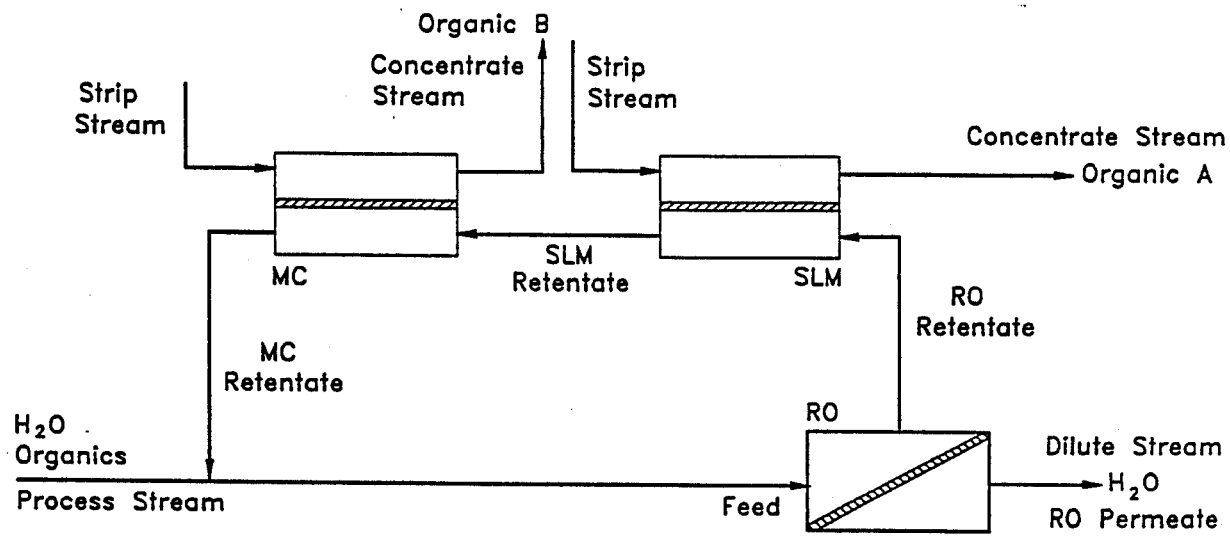
Figure 9B:
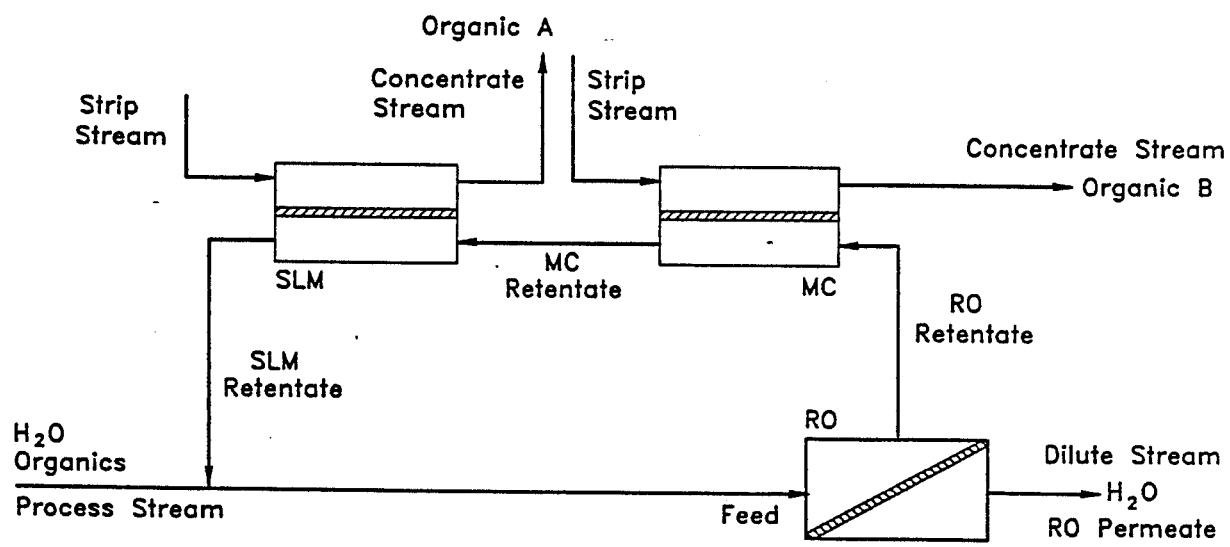
Figure 9C:
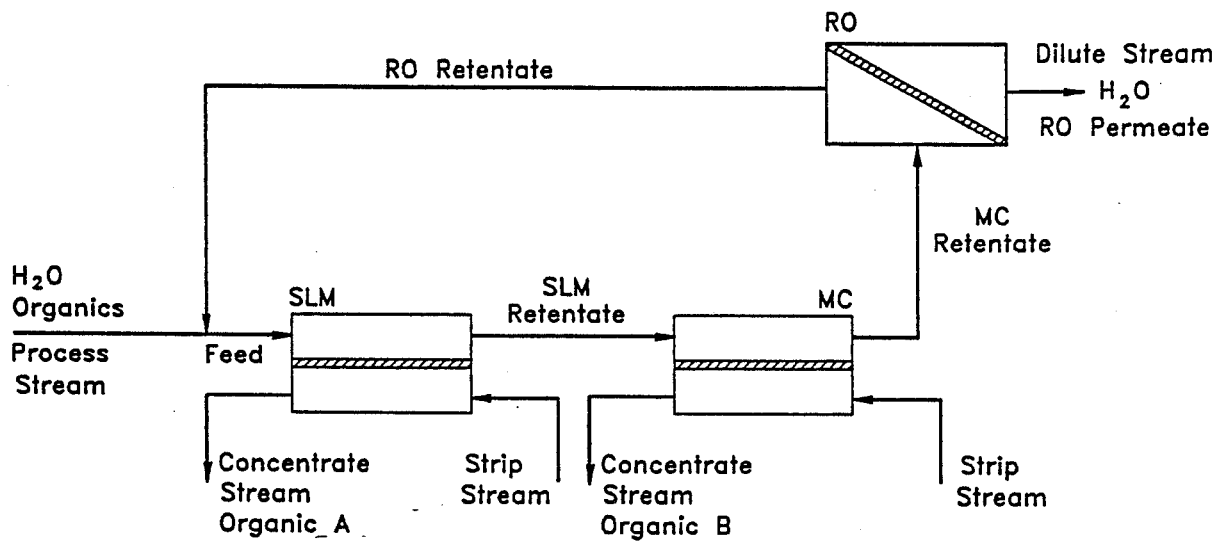
Figure 9D:
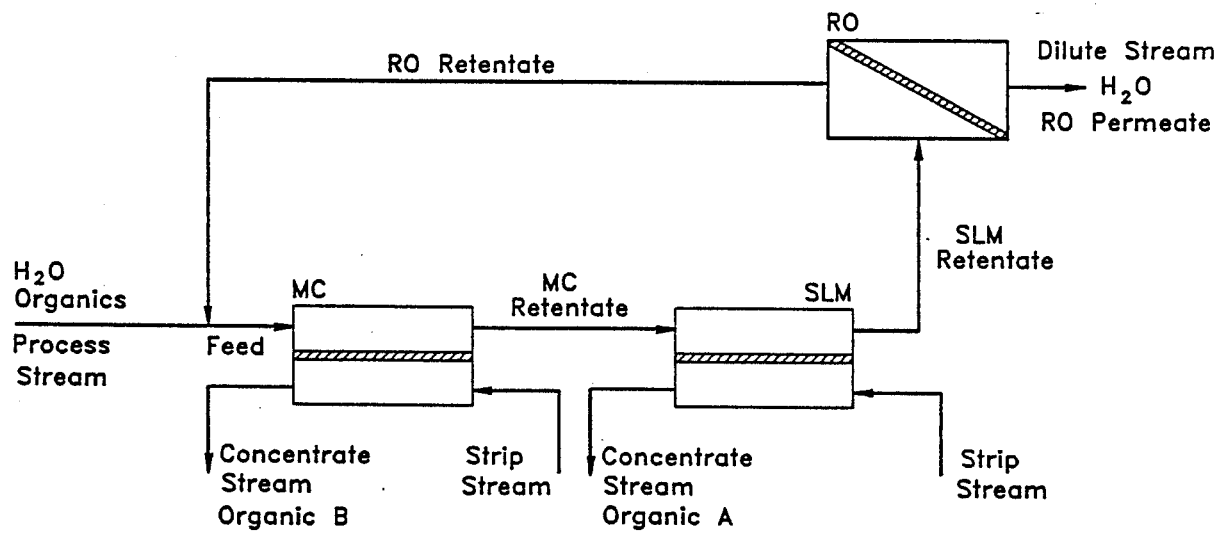
Figure 9E:
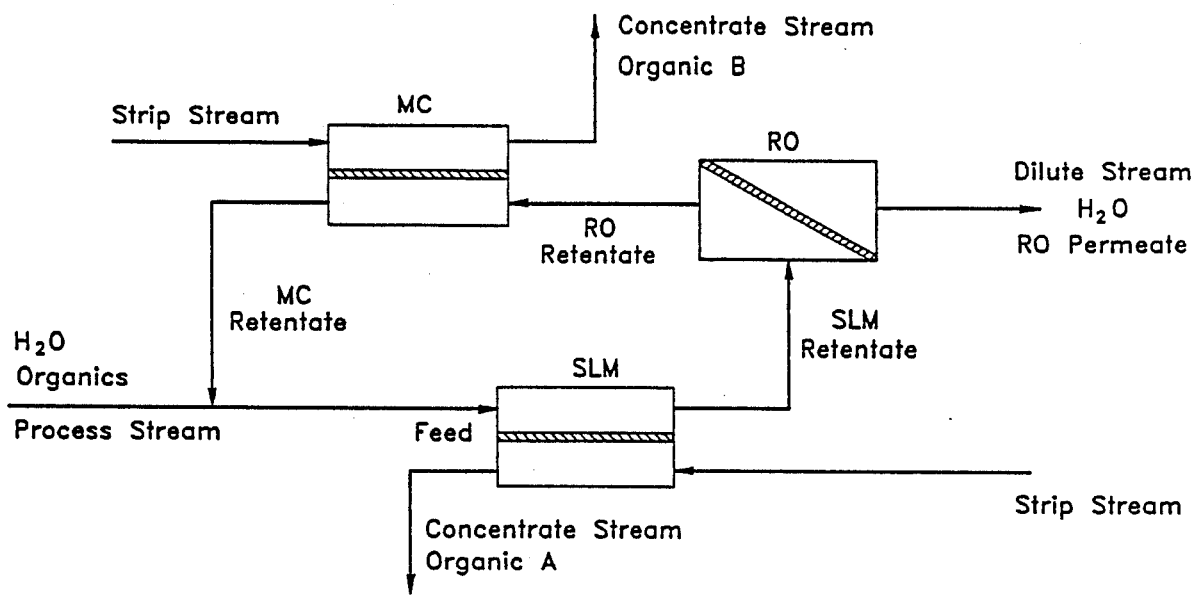
Figure 9F:
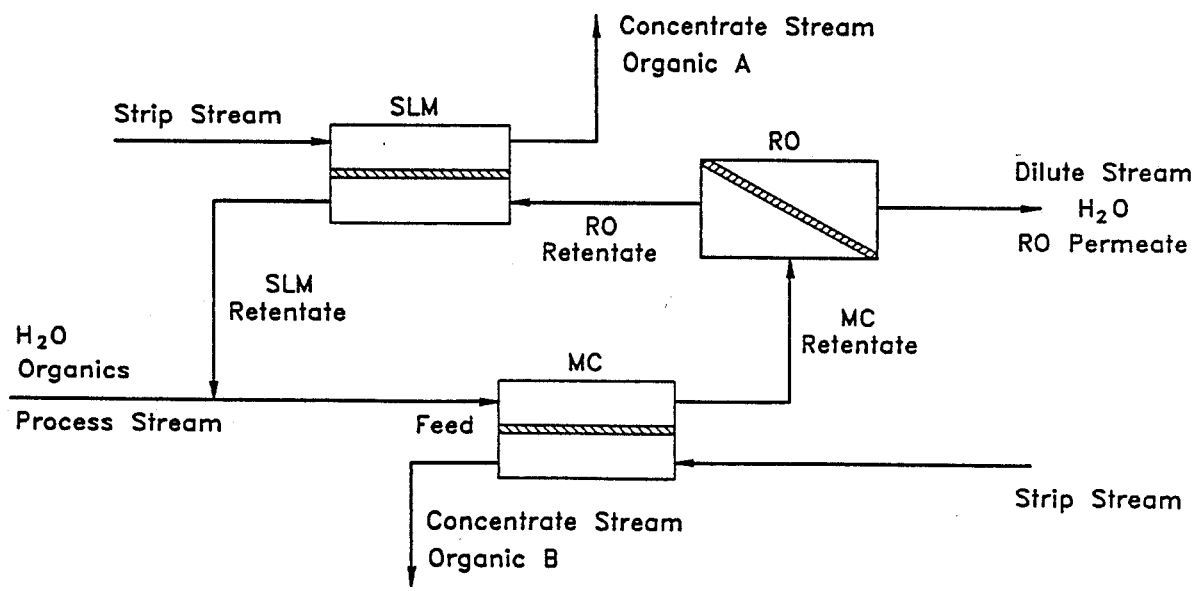

In FIG. 9a, the feed is first fed to the RO membrane, which passes water but rejects a high percentage of the two solutes of interest. The RO retentate, being relatively solute-rich, forms the feed to the SLM membrane, which is selectively permeable to one of the organics. The SLM permeate, rich in one of the organics, forms one concentrate stream, while the SLM retentate, rich in the other organic (organic B) solute, forms the feed to the MC separator. The membrane of the MC separator is provided with water-immiscible organic extractant on its permeate side that is specific to the organic solute, thereby extracting the same into a second concentrate stream. The MC retentate, now depleted as to both of the organic solutes, is combined with the process stream to form the feed to the RO membrane for another cycle.

FIGS. 9b–f comprise schematic illustrations of the other possible variants of the hybrid separation system of FIG. 9a, wherein the indicated solute- or solvent-poor retentates comprise the feeds and recycle feed makeup for the various selective membrane separations shown. As is apparent, the hybrid systems of FIGS. 9a–f offer all of the same advantages that are obtainable with those hybrid systems depicted above.

FIGS. 10a–f depict another exemplary hybrid system of the present invention wherein RO is combined with MC and CT to separate water as a solvent from a solute comprising an organic, for example, phenol, and a metal ion (M+).

Figure 10A:
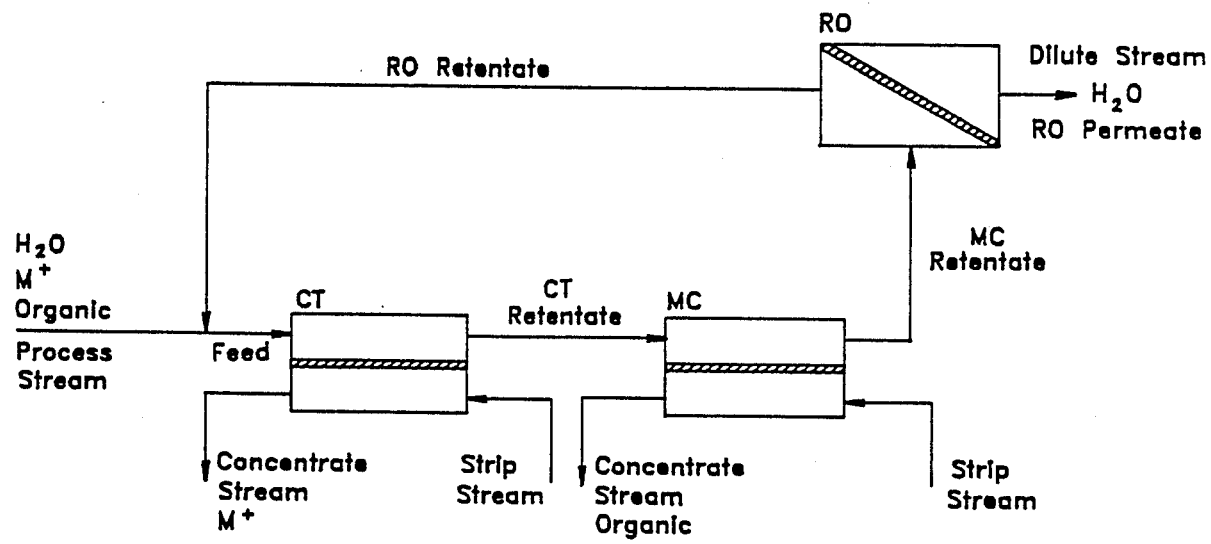
Figure 10B:
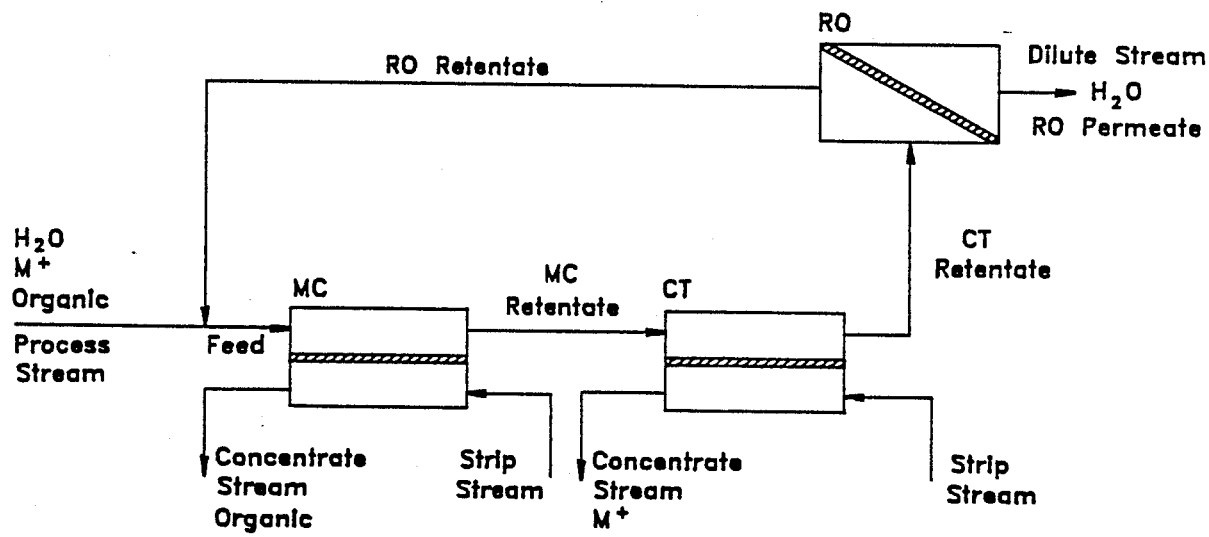
Figure 10C:
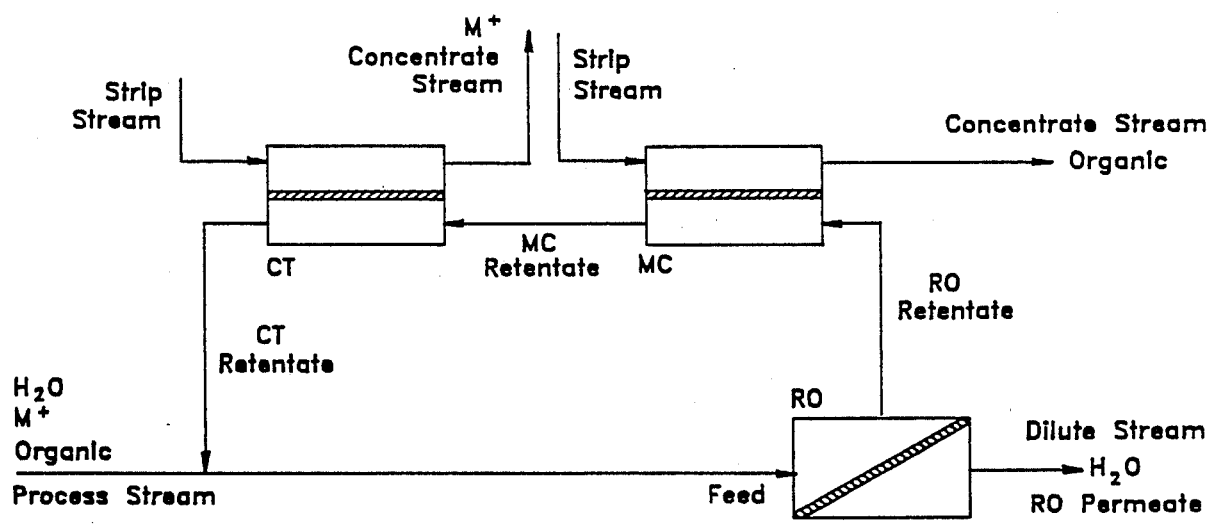
Figure 10D:
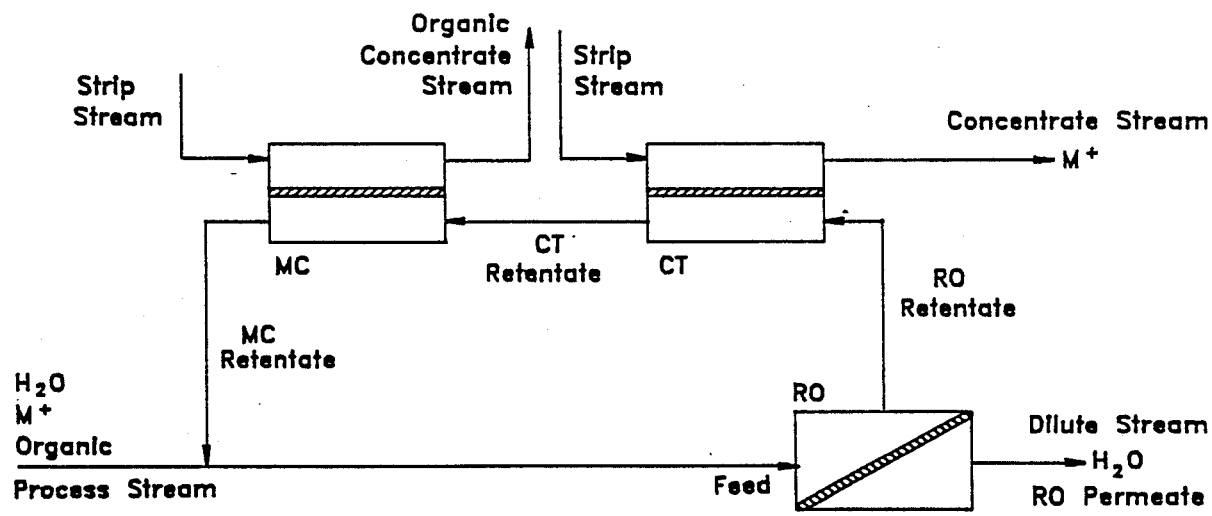
Figure 10E:
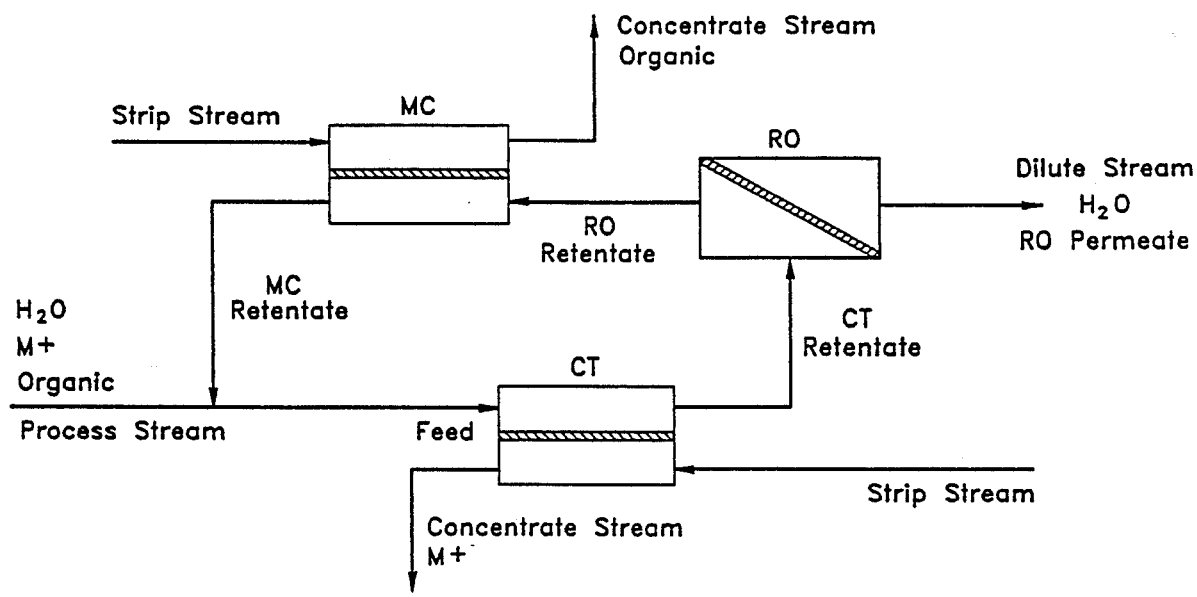
Figure 10F:
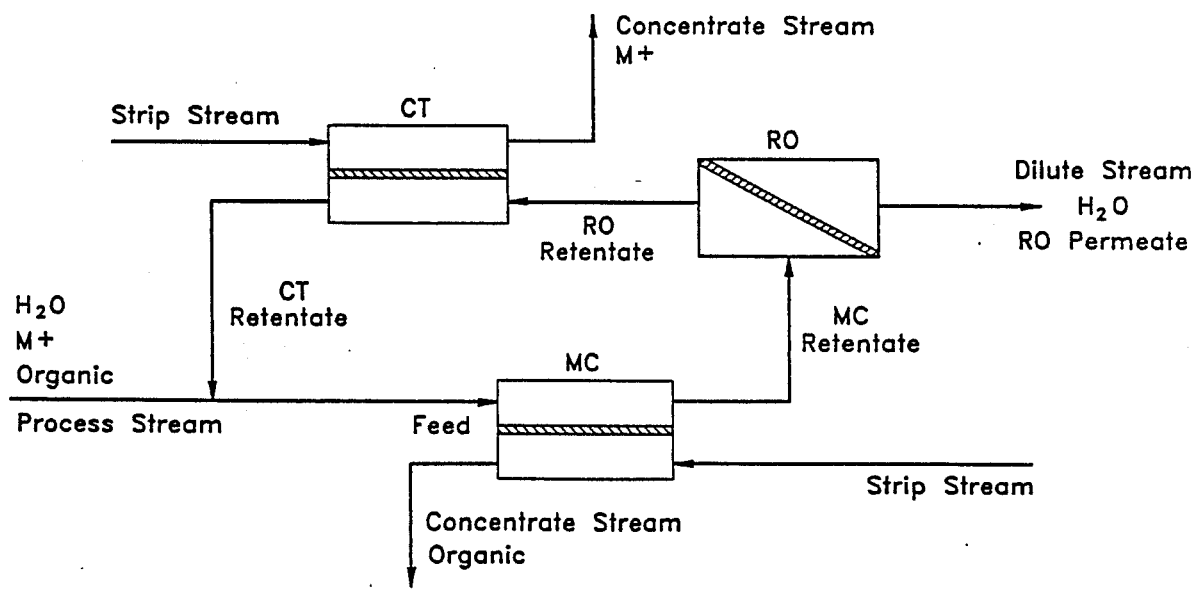

In FIG. 10a, the feed containing the solvent and solutes is first fed to a CT membrane, provided with a complexing agent that is specific to the metal ion, and further provided on the permeate side with a product or strip solution that liberates the metal complex, allowing the metal ion to be dissolved in the strip solution, from which it may be bled off or otherwise treated. The CT retentate, now solute-poor with respect to the metal ion, is fed to the MC-type membrane, provided on the permeate side with an extracting liquid which is specific to the organic solute, thereby separating the organic solute. The MC-type membrane retentate is then fed to an RO membrane, which removes water in conventional fashion, thereby concentrating the remaining solute in the RO retentate, which is then combined with the process stream to form the feed for another separation cycle.

FIGS. 10b–f comprise schematic illustrations of the other possible variants of the hybrid separation system of FIG. 10a, wherein the indicated solute- or solvent-poor retentates comprise the feeds and recycle feed makeup for the various selective membrane separations shown. The hybrid system of FIGS. 10a–f offers substantially the same advantages as do the other hybrid systems discussed above.

FIGS. 11a–f illustrate another exemplary hybrid separation system of the present invention, wherein RO is combined with two SLM-type separators to separate water as a solvent from two different organic solutes, for example, phenol and pyridine.

Figure 11A:
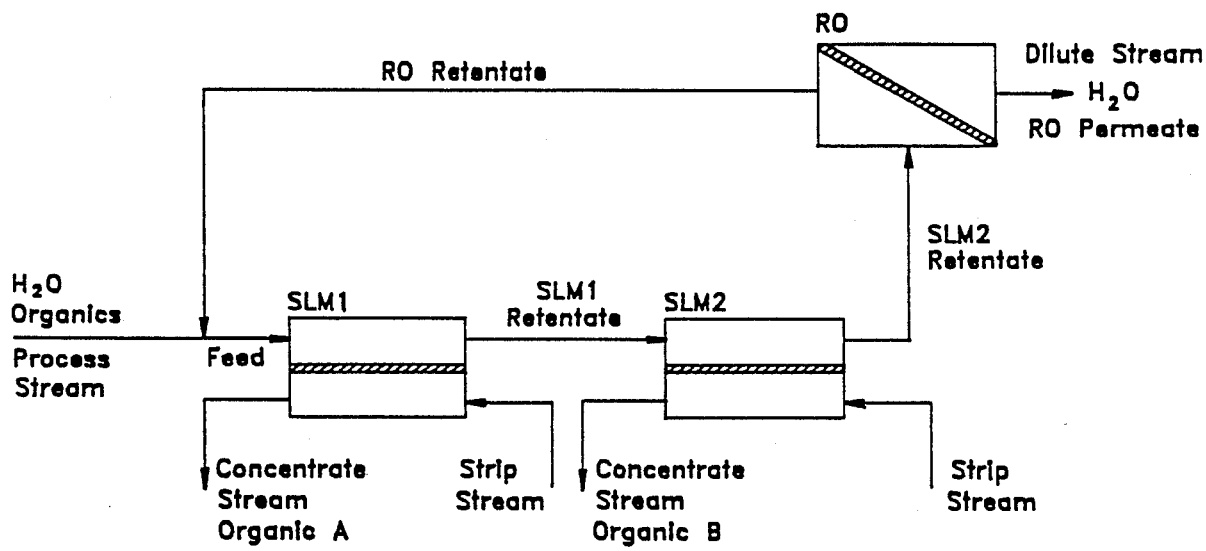
Figure 11B:
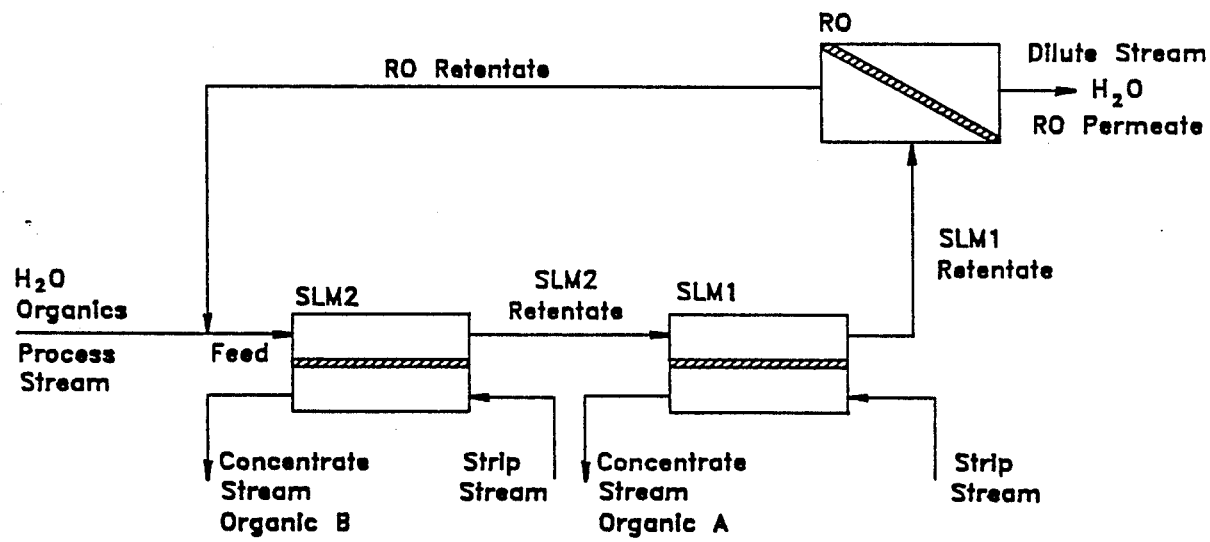
Figure 11C:
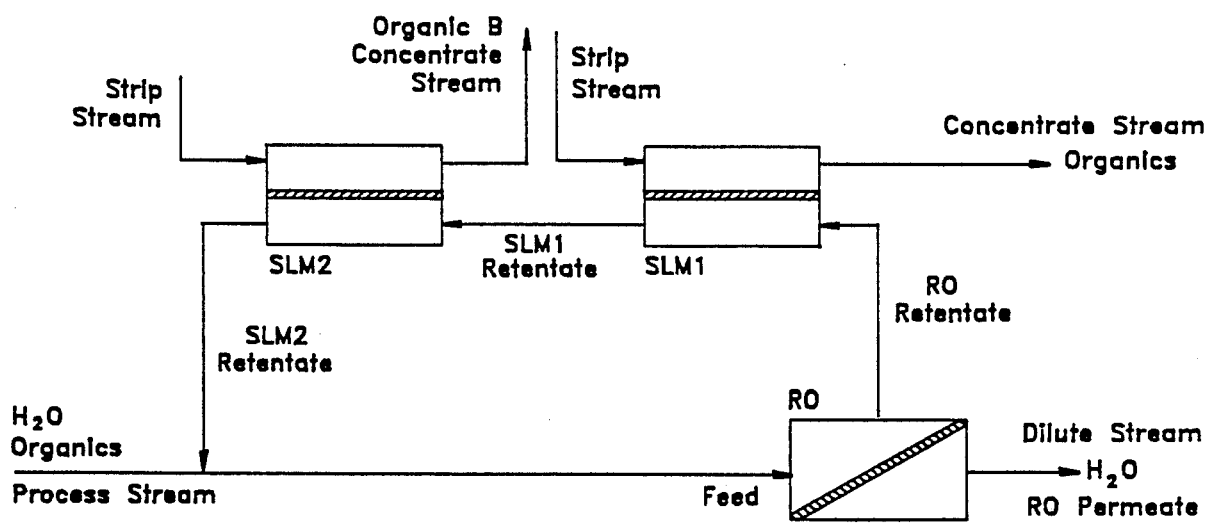
Figure 11D:
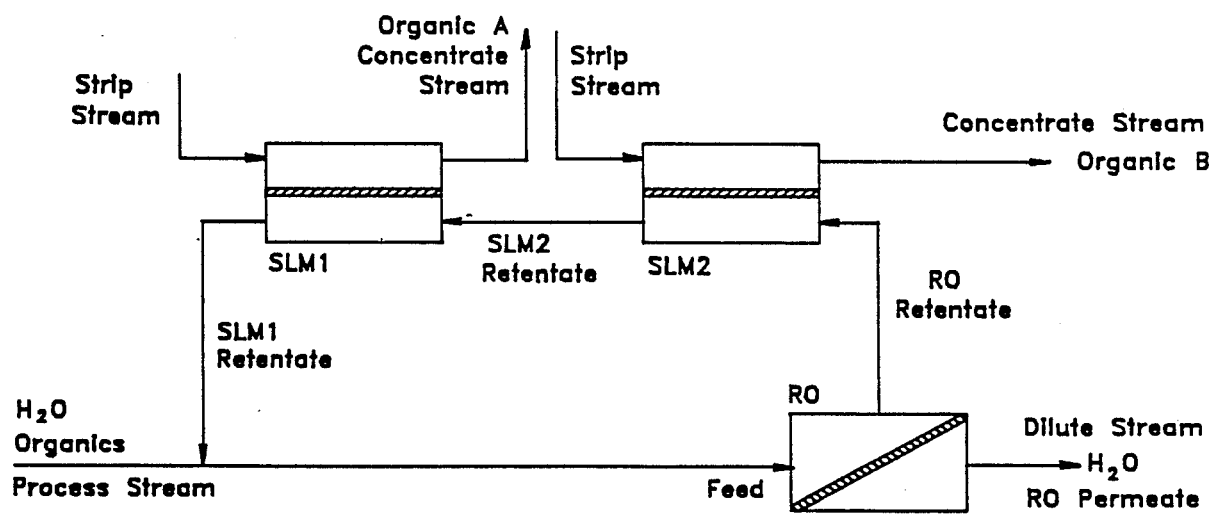
Figure 11E:
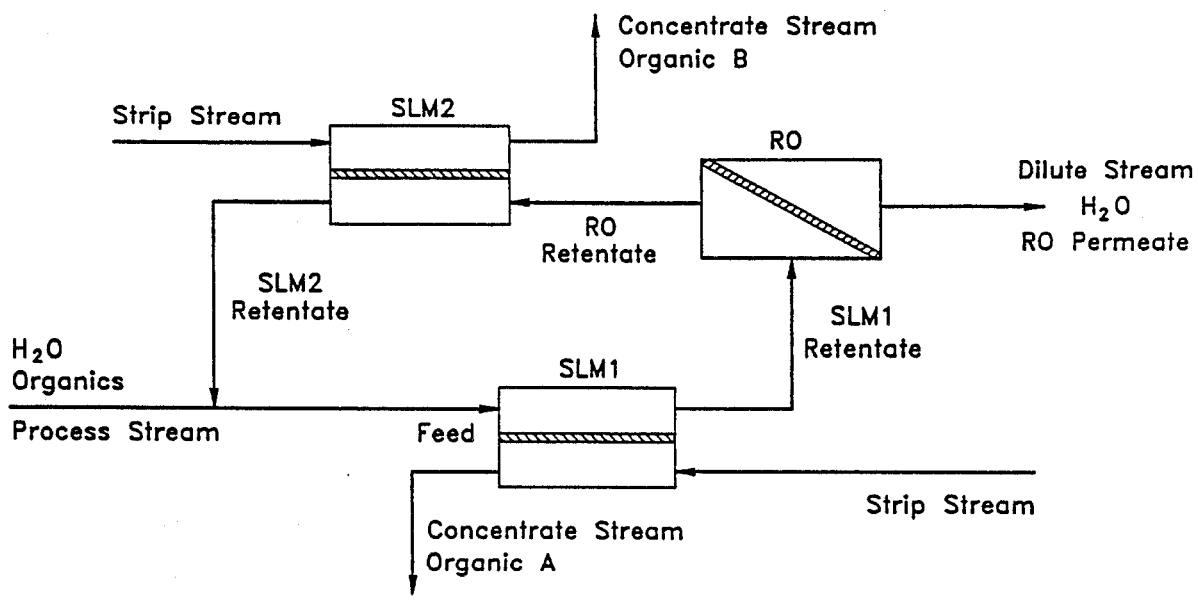
Figure 11F:
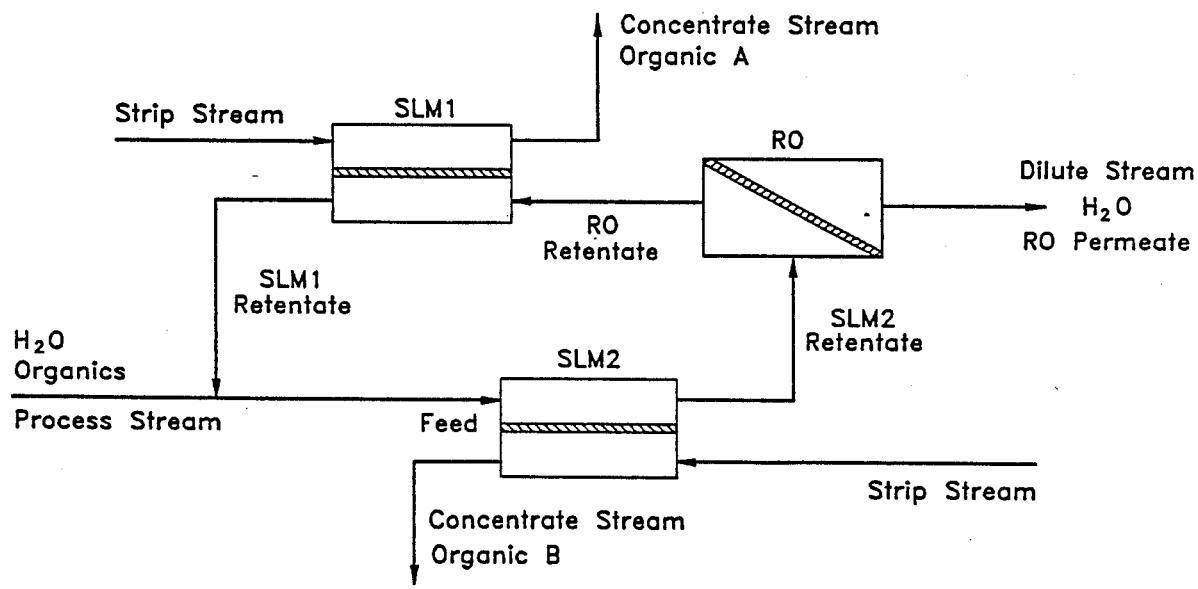

In FIG. 11a, the feed, comprising the two organic solutes in water, is first fed to a first supported liquid membrane containing an organic solvent capable of selectively extracting one organic solute, thereby depleting the feed as to that organic solute. The retentate from the first SLM is then fed to a second SLM containing a second organic solvent that is specific to the other organic solute, thereby depleting the stream as to that organic solute. The retentate from the second SLM, now depleted as to both solutes, is fed to an RO membrane, which removes water and concentrates remaining organic solutes in the RO retentate, which is then combined with the process stream to form the feed for another cycle.

FIGS. 11b–f comprise schematic illustrations of the other possible variants of the hybrid separation system of FIG. 11a, wherein the indicated solute- or solvent-poor retentates comprise the feeds and recycle feed makeup for the various selective membrane separations shown. Again, the hybrid system of FIGS. 11a–f provides the same types of advantages as the others disclosed above.

FIGS. 12a–f illustrate another exemplary hybrid separation system according to the present invention, wherein RO is combined with two CT solute removal separations, to separate water as a solvent from a solute comprising, for example, two metal ions denoted as M+ and M++.

Figure 12A:
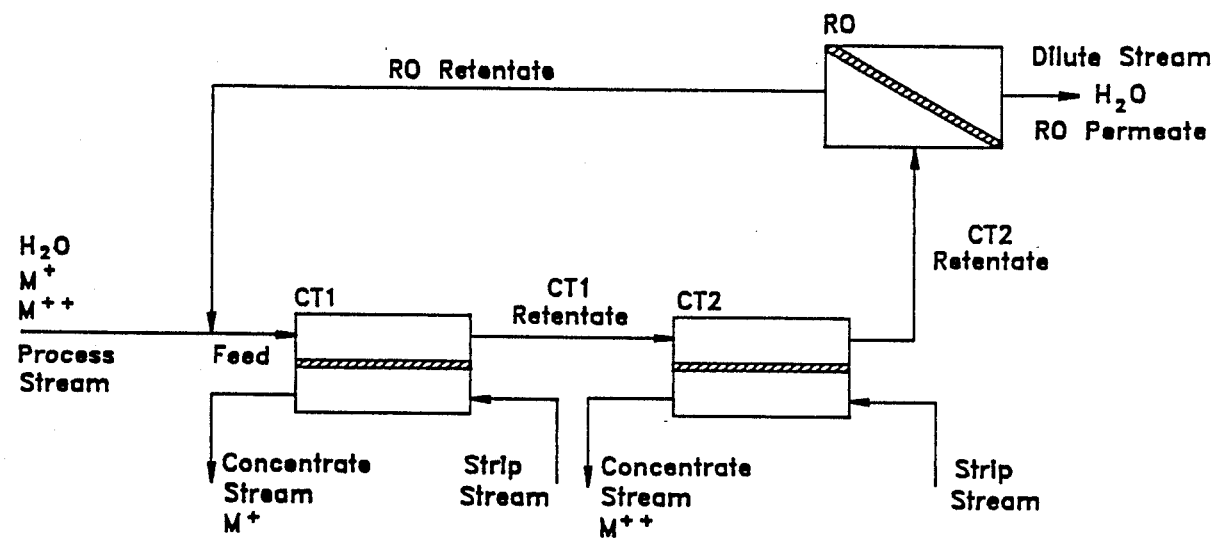
Figure 12B:
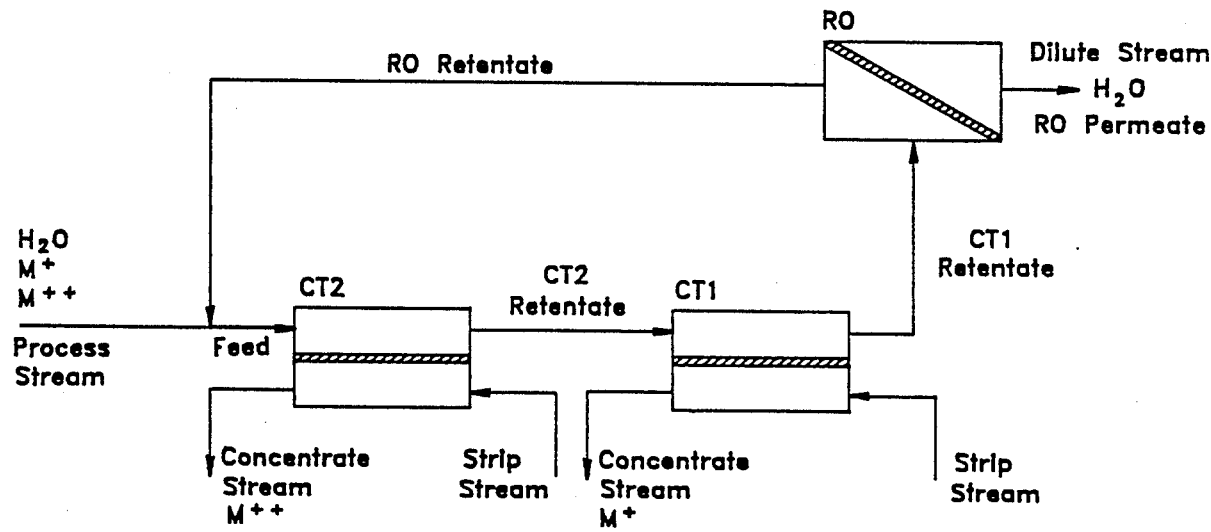
Figure 12C:
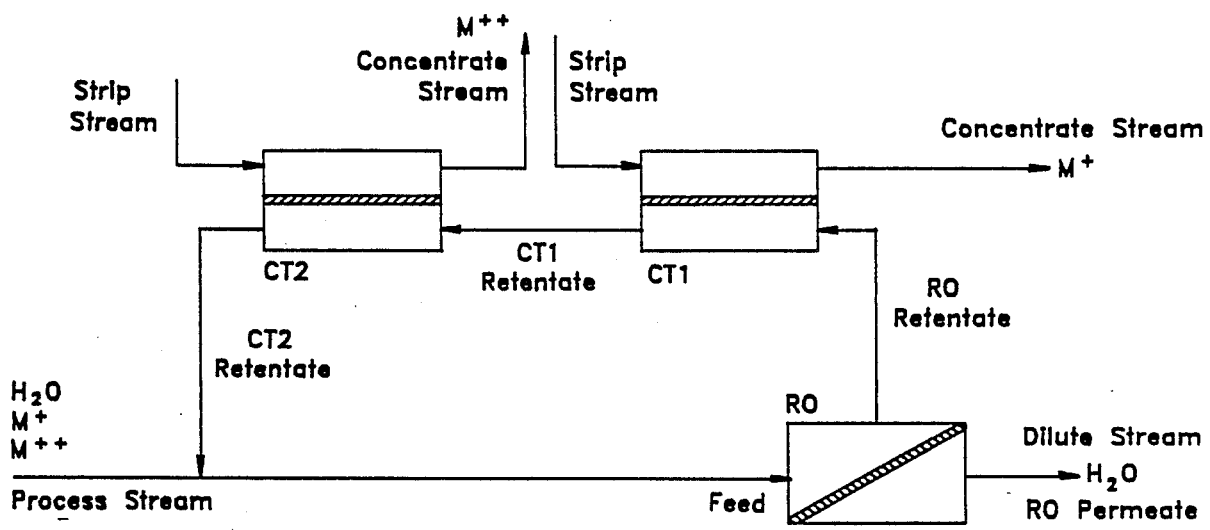
Figure 12D:
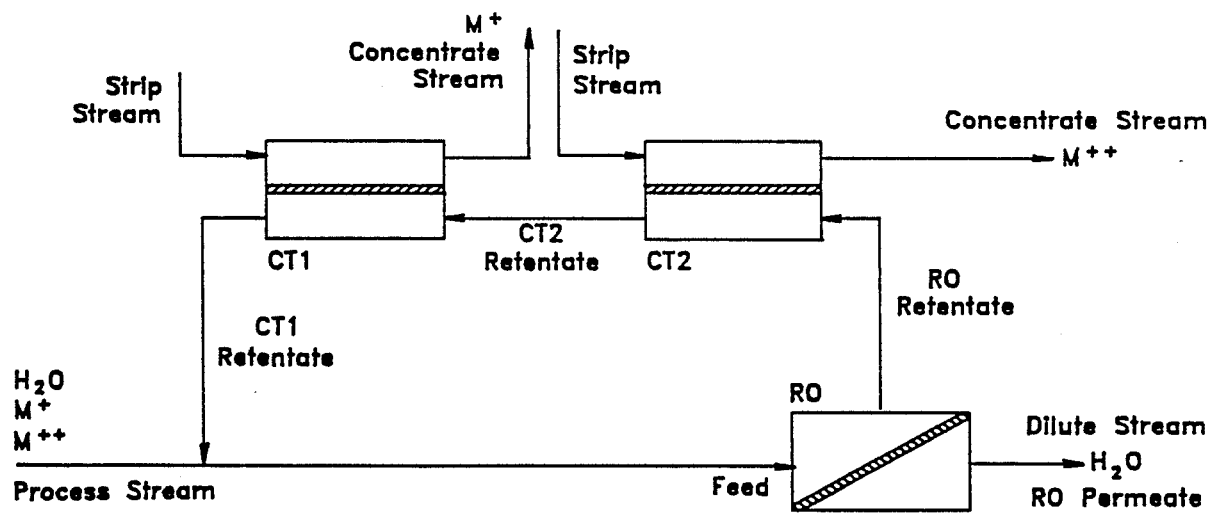
Figure 12E:
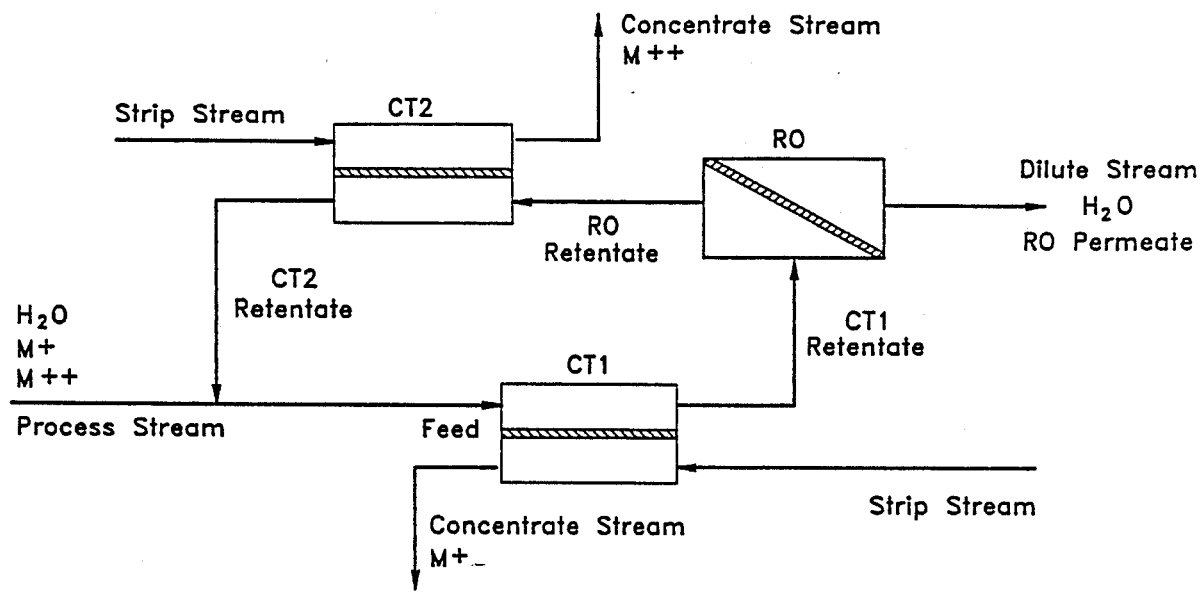
Figure 12F:
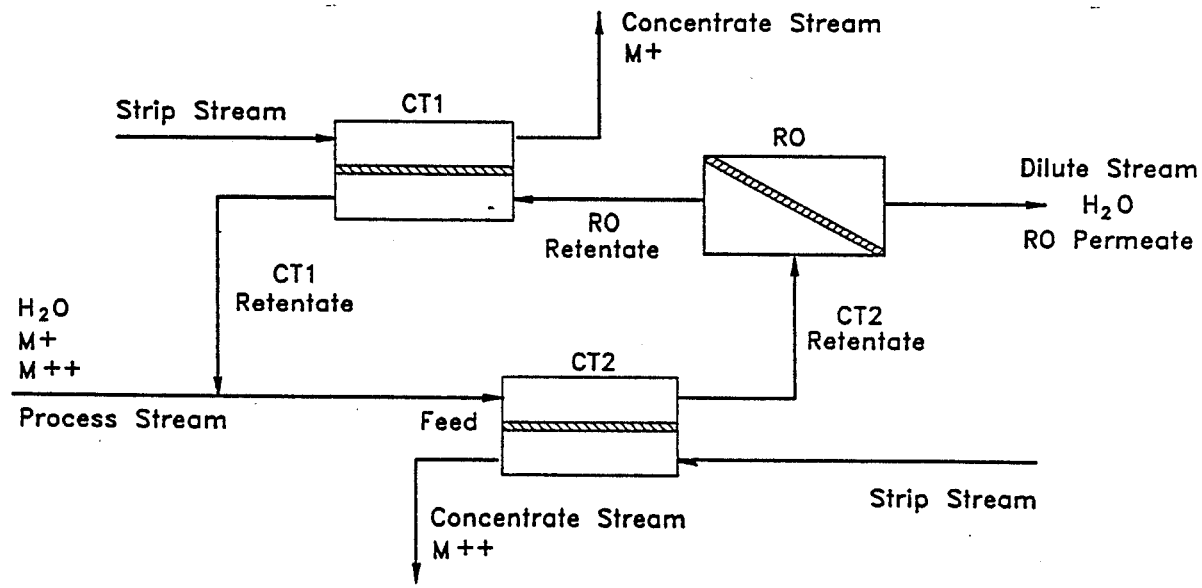

In FIG. 12a, the feed, comprising an aqueous solution of the two metal ions, is fed to a first CT membrane containing a complexing agent selective to one of the metal ions, the permeate side of the membrane being further provided with a strip or product solution capable of liberating the complexed metal ion from the carrier. The counter-ion is H+. The retentate from the first CT membrane, now depleted in one of the metal ions, is fed to the second CT membrane, whereby the other metal ion in solution is depleted by a similar mechanism. The retentate from the second CT membrane, now depleted in both metal ions, and thus solute-poor, is fed to a suitable RO membrane where water is removed and remaining metal ion is concentrated in the RO retentate, which is then combined with the process stream to form the feed for another separation cycle, et cetera.

FIGS. 12b–f comprise schematic illustrations of the other possible variants of the hybrid separation system of FIG. 12a, wherein the indicated solute- or solvent-poor retentates comprise the feeds and recycle feed makeup for the various selective membrane separations shown. The hybrid system of FIGS. 12a–f offers the same types of advantages as the others discussed above.

FIGS. 13a–f illustrate another exemplary hybrid separation system of the present invention, wherein RO is combined with two MC-type solute removal processes, to separate water as a solvent from two organic solutes, for example, phenol and pyridine.

Figure 13A:
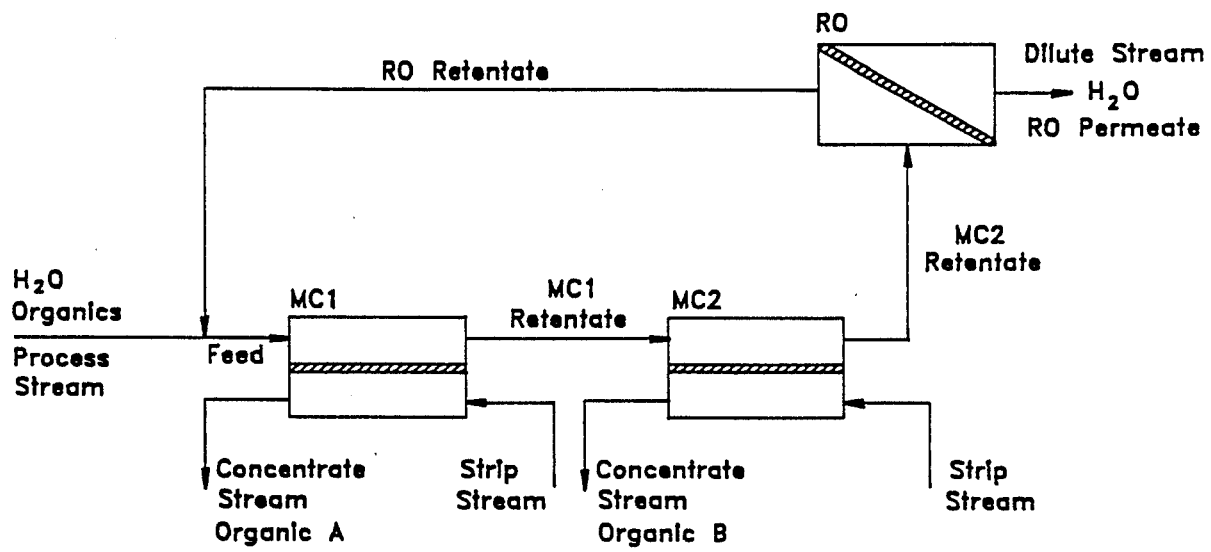
Figure 13B:
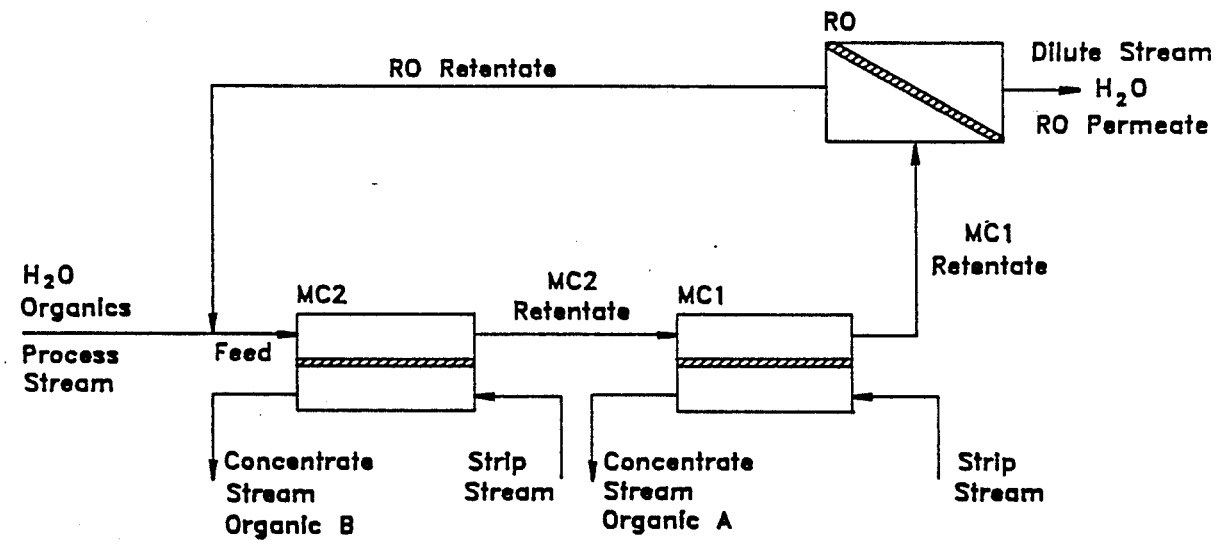
Figure 13C:
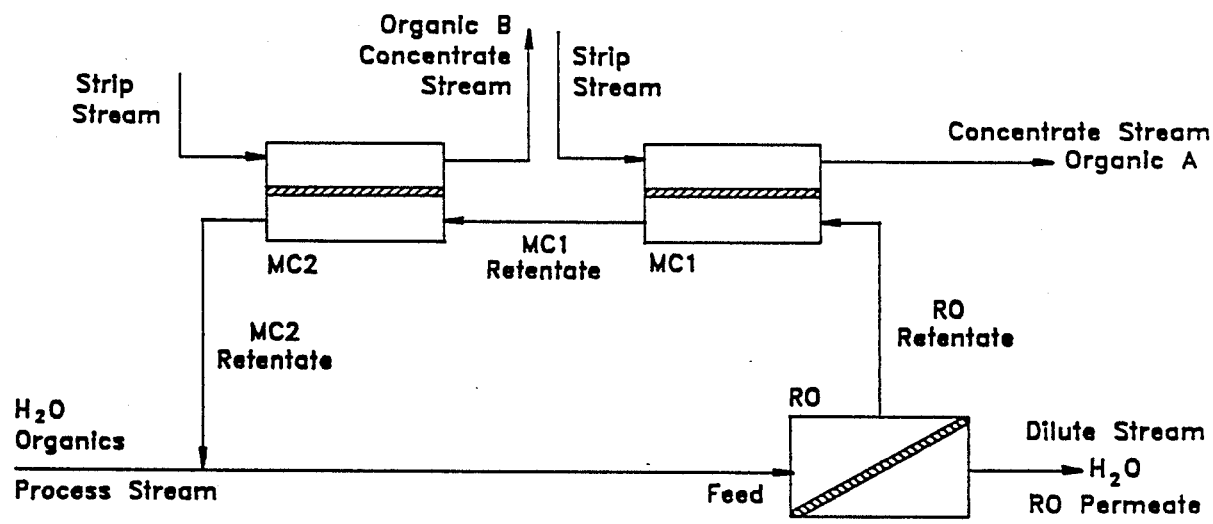
Figure 13D:
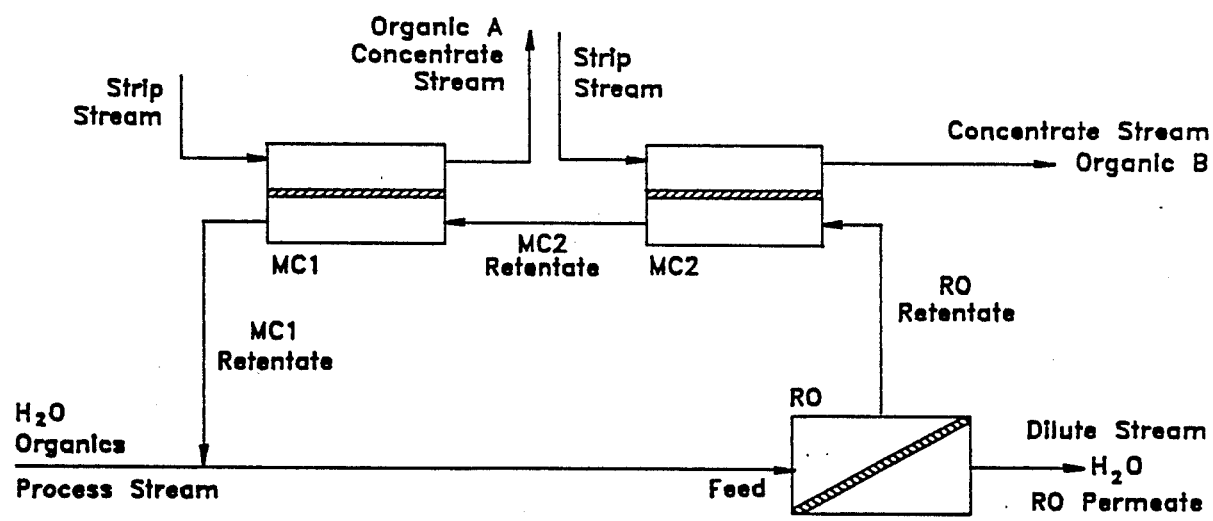
Figure 13E:
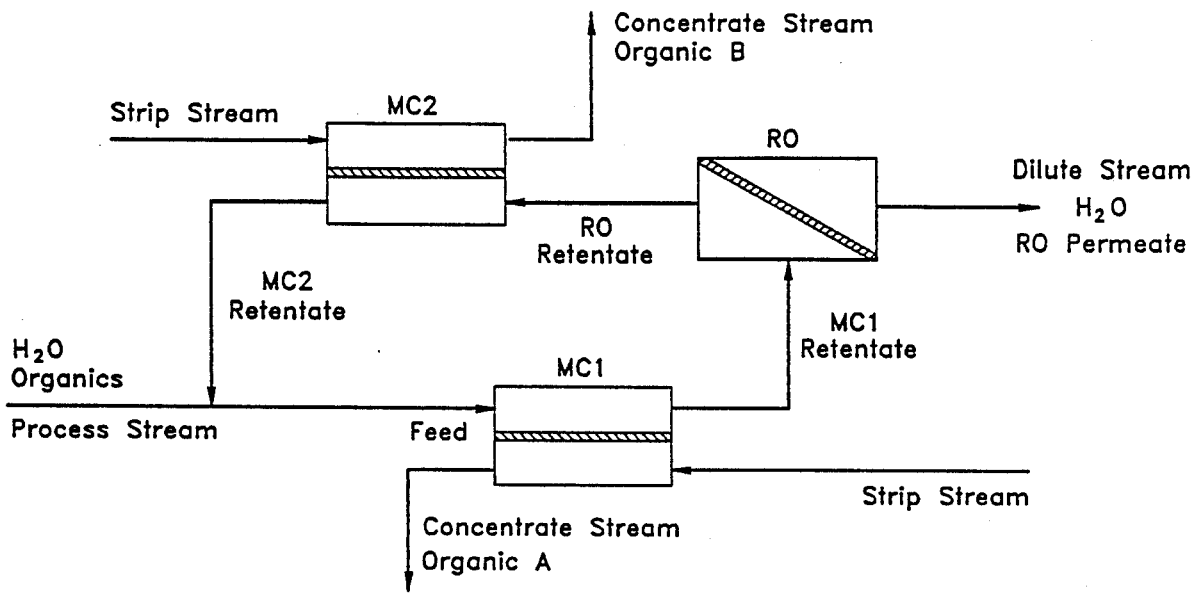
Figure 13F:
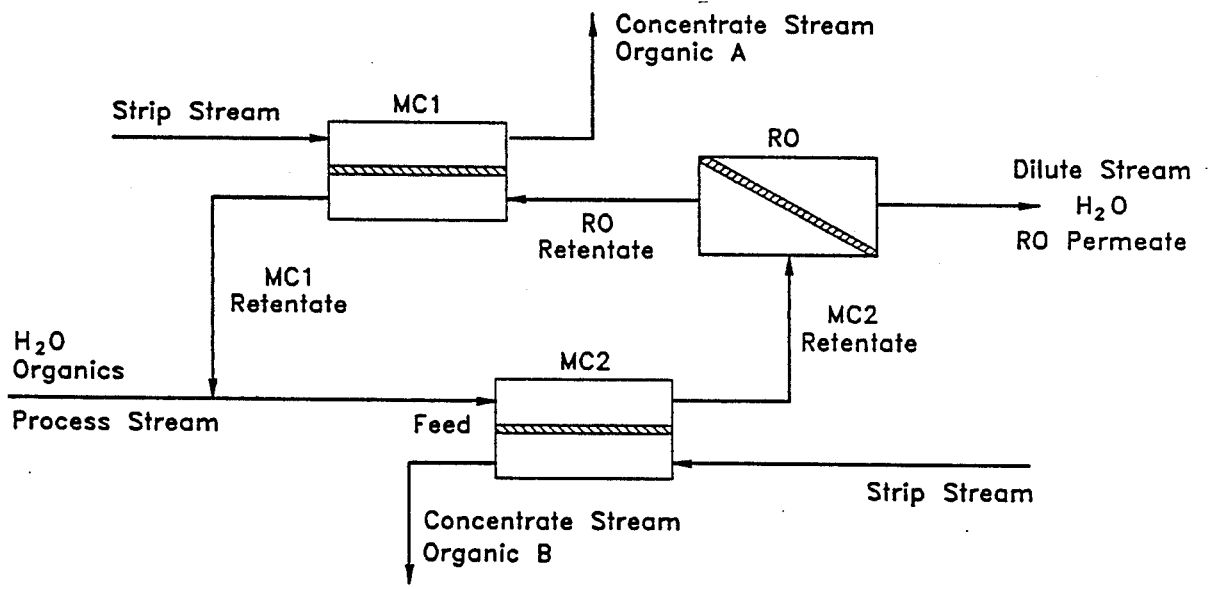

In FIG. 13a, the feed, comprising water with the organic solutes, is fed to the feed side of a first MC-type separator wherein the permeate side of the membrane is provided with a water-immiscible organic product or strip solution, to deplete the stream as to one of the organic solutes by substantially the same mechanism previously discussed in connection with an MC-type separator. The retentate from the first MC is fed to a second MC, which depletes the stream as to the other organic solute in the same fashion. The retentate from the second MC separator, now depleted as to both organic solutes, is fed to an appropriate RO membrane, which removes water and thereby concentrates the remaining organic contaminants in the RO retentate, which in turn is combined with the process stream to form the feed for another cycle.

FIGS. 13b–f comprise schematic illustrations of the other possible variants of the hybrid separation system of FIG. 13a, wherein the indicated solute- or solvent-poor retentates comprise the feeds and recycle feed makeup for the various selective membrane separations shown. The hybrid system of FIGS. 13a–f also offers the same types of advantages as those hybrid systems previously discussed.

Figure 14A:
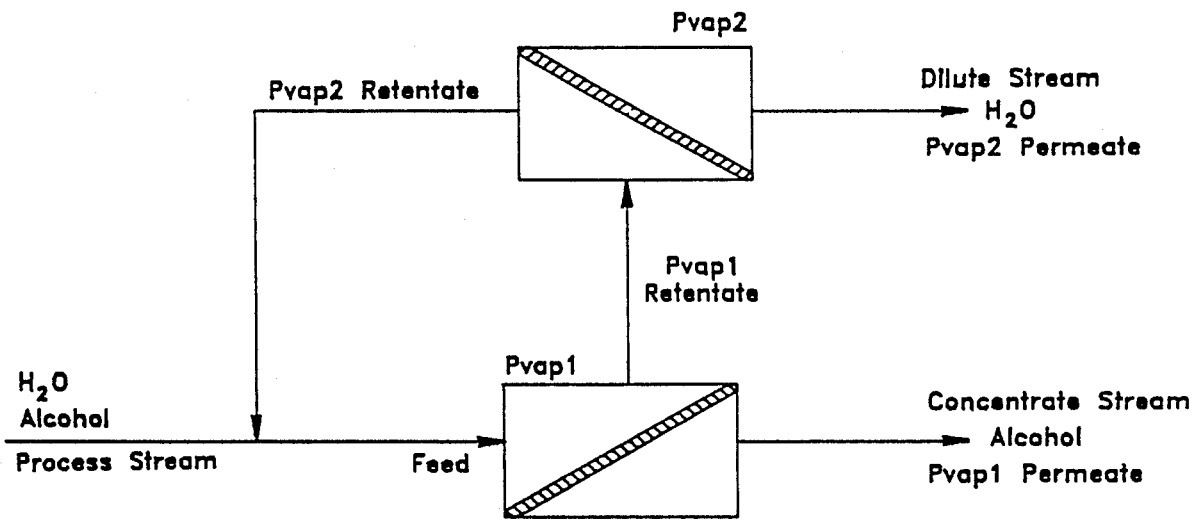
Figure 14B:
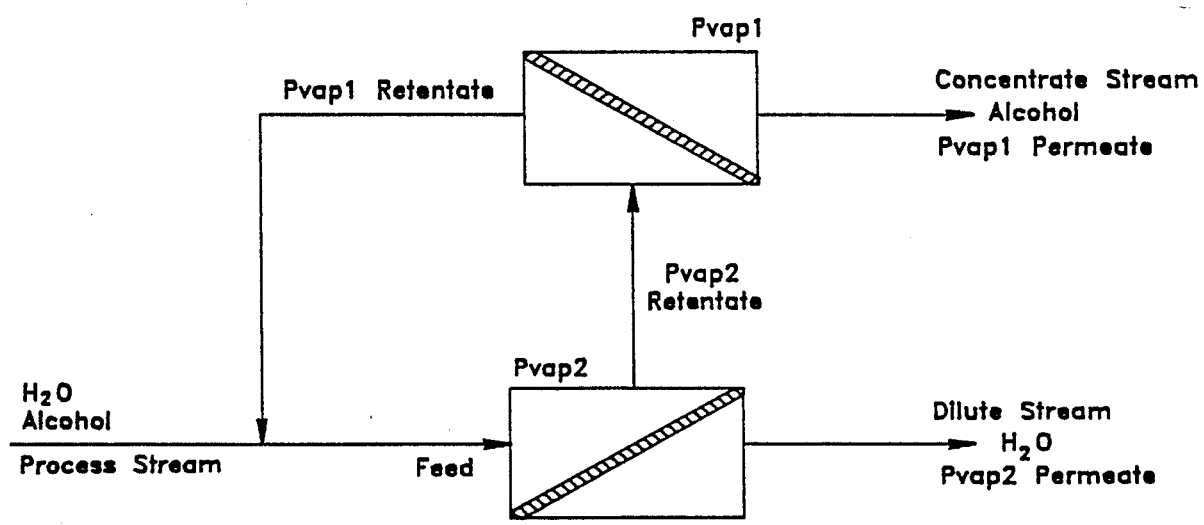

FIGS. 14a and 14b illustrate two additional embodiments of the present invention, wherein two different Pvap-type separators are used to separate solvent and solute, for example, water and alcohol, respectively. In FIG. 14a, the water/alcohol feed is first fed to a Pvap separator that is selective to the alcohol. The alcohol-depleted stream from this Pvap separator is then directed as feed to a second Pvap separator that is selective to water. The retentate from the second Pvap separator is then combined with the process stream to form feed for another separation cycle, et cetera. FIG. 14b illustrates the converse of the recycle stream shown in FIG. 14a, i.e., the water-depleted portion of the first Pvap solvent removal process comprises the feed for the second Pvap alcohol-removal process and the alcohol-poor portion of the second Pvap process is combined with the feed to the solvent-removal process. As was the case with the previously-discussed hybrid systems, this system permits the two membranes to function more efficiently by allowing higher flux with higher feed concentrations, while at the same time permitting greater adjustability given the ability to adjust two Pvap membrane surface areas rather than one.

Figure 15A:
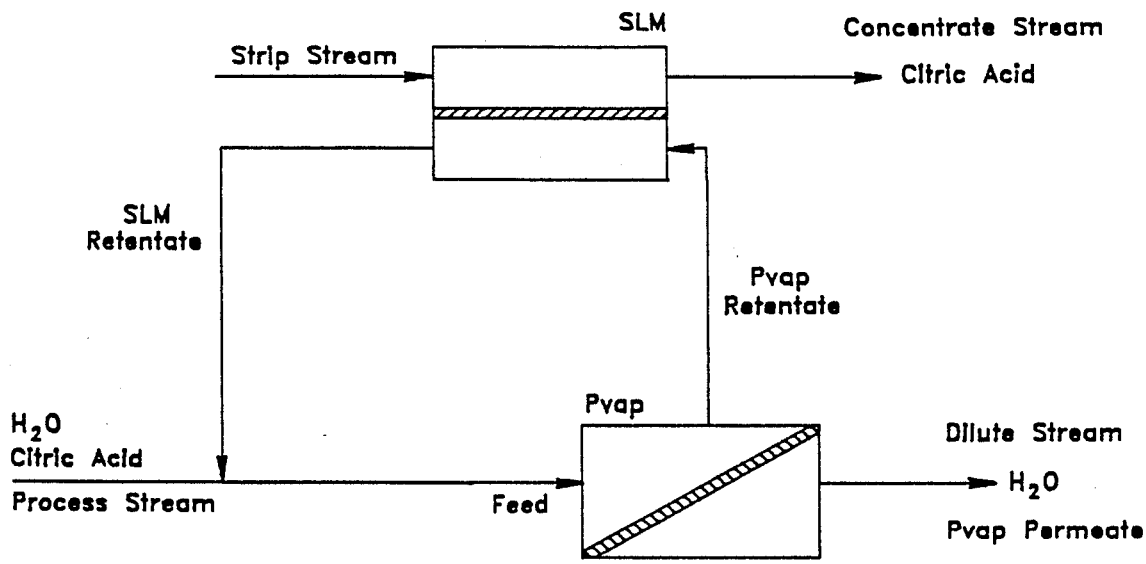
Figure 15B:
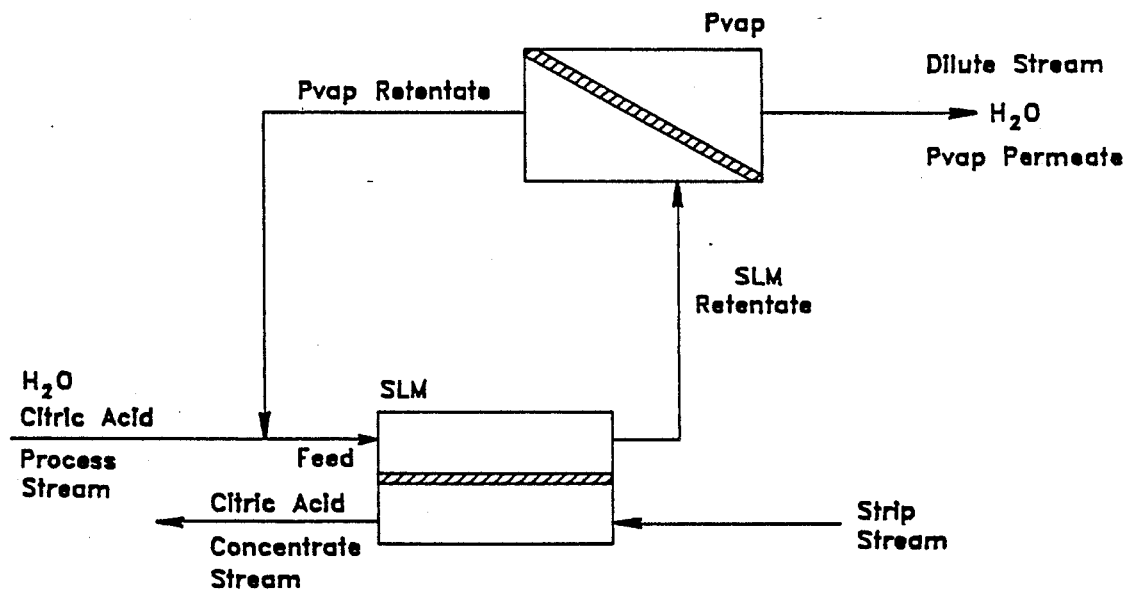

FIGS. 15a and 15b illustrate another hybrid separation system of the present invention that combines Pvap and SLM to separate water as a solvent from an organic solute, for example, citric acid. The water/citric acid feed is shown in FIG. 15a as being first fed to a Pvap membrane that is selectively permeable to water, thus depleting the feed in solvent. The Pvap retentate is then fed to an SLM-type separator provided with a solvent that selectively extracts the organic solute, and further provided with a stripping stream that liberates the solute on the permeate side of the membrane, thus depleting the stream in the solute. The solute-poor SLM retentate is then combined with the process stream to form the feed for another separation cycle, et cetera. FIG. 15b illustrates the converse of FIG. 15a, wherein the two separation processes are part of a recycle stream in which the solute-poor portion of the SLM solute-removal process comprises the feed for the solvent-removal Pvap process and the solvent-poor Pvap retentate is combined with the process stream to form the feed to the SLM solute-removal process. Similar advantages to those described above are realized from this hybrid system.

Figure 16A:
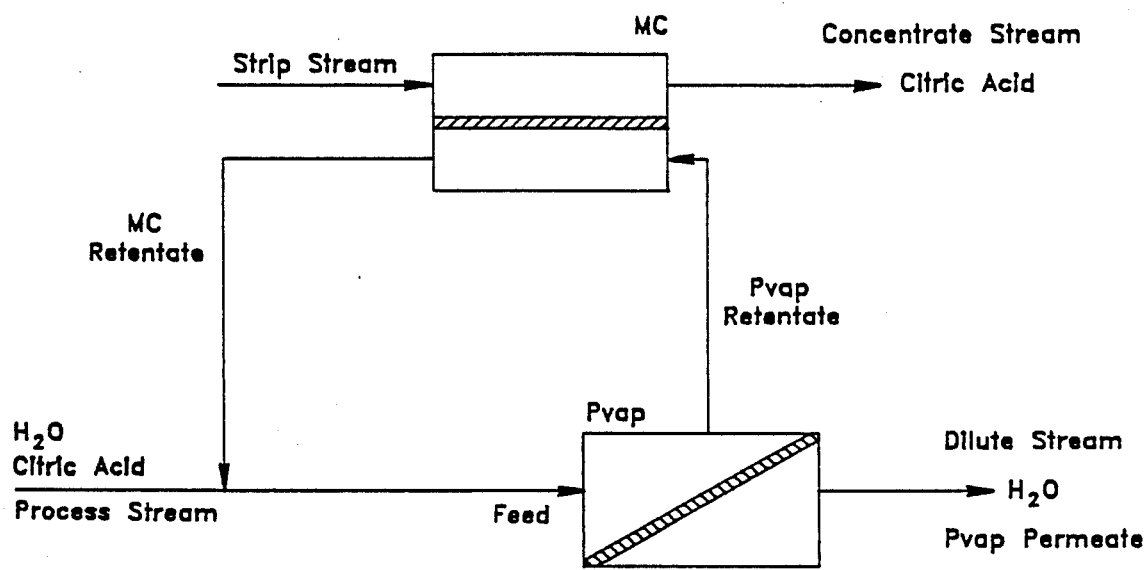
Figure 16B:
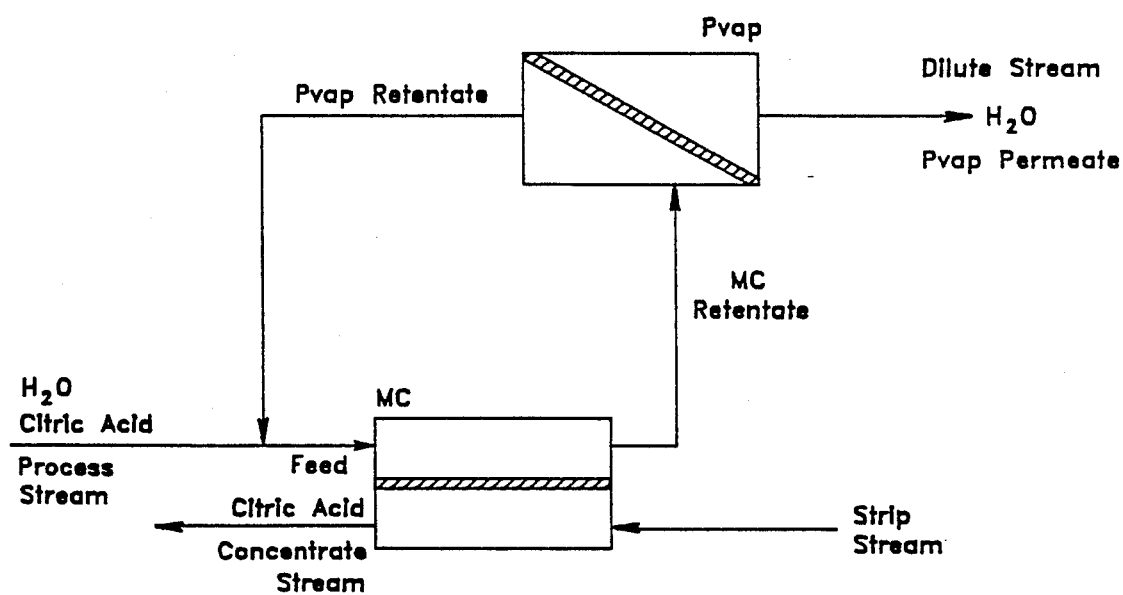

FIGS. 16a and 16b illustrate another exemplary hybrid separation process of the present invention that combines Pvap and MC separation processes to separate, for example, water as a solvent from an organic solute, for example, citric acid. As shown in FIG. 16a, the feed is first fed to a Pvap membrane which selectively removes water. The solvent-depleted Pvap retentate is then fed to the feed side of a membrane contactor provided on its permeate side with a liquid extractant capable of selectively extracting the citric acid. The citric acid MC retentate is then combined with the process stream to form the feed for another separation cycle, and so on. FIG. 16b illustrates the converse separation process from that shown in FIG. 16a. Both hybrid systems offer the same types of advantages noted above in connection with the hybrid systems previously discussed.

Figure 17A:
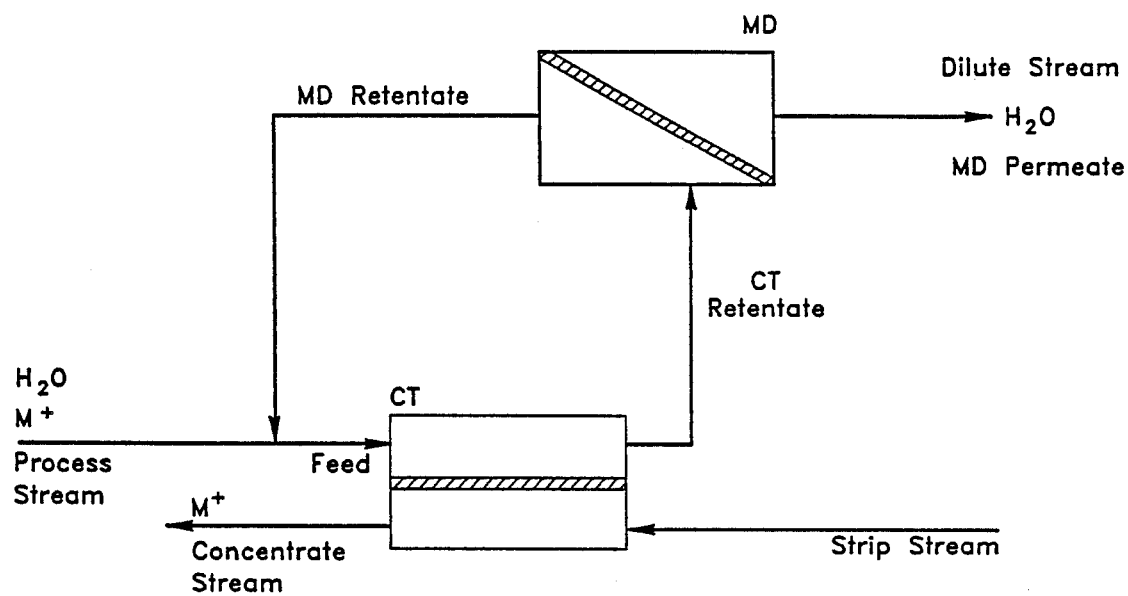
Figure 17B:
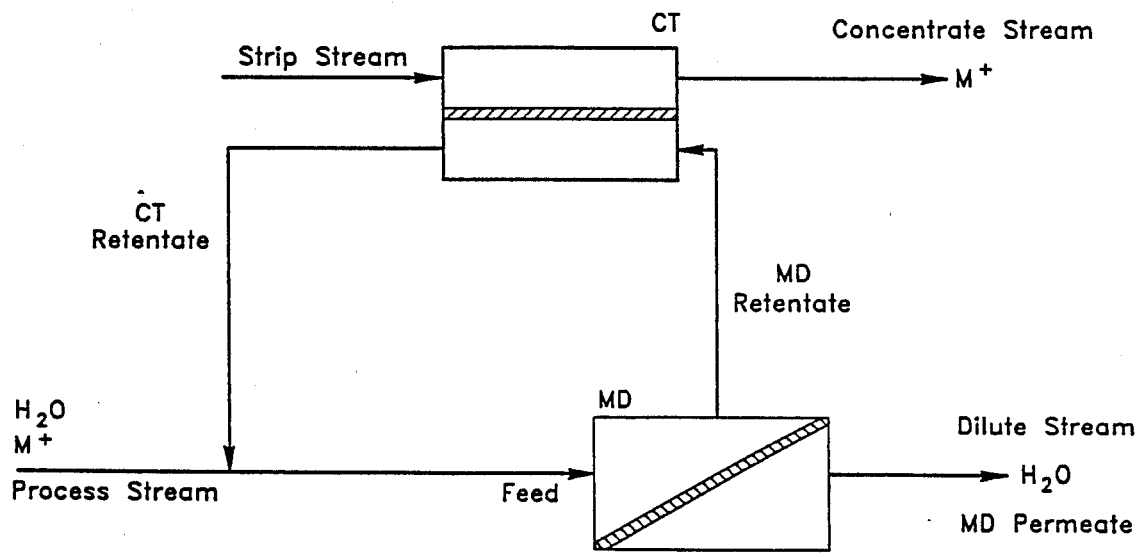

FIGS. 17a and 17b illustrate another exemplary hybrid separation system according to the present invention, that combines membrane distillation (MD) with CT to separate and recover metal ions (M+) from rinse water. The aqueous metal ion feed is shown in FIG. 17a as being first fed to a CT membrane provided with an M+-specific complexing agent and with a strip or product solution on its permeate side to liberate the metal ion complex into the product solution. The counter-ion is H+. The CT retentate, now depleted in metal ion, is fed to an MD separation unit that is selectively permeable to water vapor and thus concentrates remaining metal ion in the MD retentate; the concentrated metal ion in the retentate is then combined with the process stream to form the feed or another separation cycle, and so on.

FIG. 17b illustrates the converse of the hybrid system shown in FIG. 17a. Both systems offer the same types of advantages discussed above in connection with the other hybrid systems of the present invention.

In each of the exemplary hybrid separation systems discussed above that mention recirculating strip or product solution coupled with a bleed-off of the solute of interest, it is to be understood that this is merely a preferred method of conducting the process of the present invention and is not required. Thus, any alternate method known in the art of contacting a chemical species with a liquid, such as packed tower, spray tower, fluidized bed, etc., coupled with, for example, disposal or further treatment of the contacting strip or product solution, will work equally well in the process of the present invention.

It should also be understood that selection of the particular membranes useful in the present invention is not limited to those specifically mentioned herein, but rather may comprise any membranes known to be useful in the particular component processes, so long as they are compatible with the particular separations to which they are applied.

Table I comprises a listing of exemplary membranes suitable in the practice of the present invention. Table II comprises a summary of the hybrid separation systems described in the Examples which follow, including the separations achieved on feeds comprising common industrial waste streams, while Table III comprises a summary of the specifications of the membranes used in the Examples. In the Tables, "NA" means not applicable, while "unk" means unknown or otherwise not available.

In all of the Examples wherein pressure is specified, the units are in absolute pressure, rather than gauge pressure.

TABLE I

| Membrane Type | Name and Source | Description |
|---|---|---|
| RO | Desal 1 (Desalination Systems, Escondido, CA) | polyamide thin-film composite flat sheet |
| RO | SW-30 (Filmtec Corp., Minneapolis, MN) | spiral wound polyamide thin-film composite |
| SLM | Celgard X20/2400 (Hoechst Celanese, Charlotte, NC) | microporous polypropylene hollow fibers approx. 400 microns ID/flat sheet 25 microns thick, both with 0.02 micron pore diameter |
| CT | PSHF 20 (Bend Research, Bend, OR) | polysulfone hollow fibers approx. 20 microns ID |
| MC | Model 15-11 (Travenol Laboratories, Deerfield, IL) | hydrophilic regenerated cellulose hollow fibers |
| MC | Olin HRC (Olin, Stamford, CT) | hydrophilic regenerated cellulose film |
| Pvap | F-7 HdFDA Isahara et al., 34 J. Appl. Polym. Sci. 437 (1987) | heptadecafluorodecylacrylate 0.124 mole fraction graft polymer on crosslinked polydimethylsiloxane |
| Pvap | Pebax 3533 (Atochem, S.A., Birdsboro, PA) | polyether-polyamide block copolymer film approx. 1 mil thick |
| Pvap | g-AAm-AA-NaH Hirotsu et al., 36 J. Appl. Polym. Sci. 177 (1988) | acrylic acid copolymerized with acrylamide onto porous polypropylene film |
| Pvap | Neosepta CM-1 (Tokoyana Soda Co., Ltd, Tokyo, JAPAN) | cation exchange 2.0–2.5 meq/g |
| MD | Accurel | microporous poly- |

TABLE I-continued

| Membrane Type | Name and Source | Description |
|---|---|---|

(Enka Amerial, Asheville, NC) propylene fibers

TABLE II

| Example No. | Separation Process | Solutes of Interest | Separation Dilute Stream | Separation Concentrate Stream | Feed Composition |
|---|---|---|---|---|---|
| 1 | RO<br>Pvap | phenol | 150 ppm phenol | 28,000 ppm phenol | 500 ppm phenol in water (industrial wastewater) |
| 2 | RO<br>SLM | hops beta acids | <10 ppm beta acids | high recovery of 97% pure beta acids | hops beta & alpha acids in water (food production) |
| 3 | RO<br>CT | dichromate | 1 ppm dichromate | 50,000 ppm dichromate | 100 ppm dichromate in water (chrome plating waste) |
| 4 | RO<br>MC | zinc | 25 ppm zinc | 12,250 ppm zinc | 250 ppm zinc in water (sludge reclamation waste) |
| 5 | RO<br>SLM<br>Pvap | EtOH<br>citric acid | 0.66 wt % EtOH<br>0.01 wt % citric acid | 50 wt % EtOH<br>3 wt % citric acid (95% pure) | 1 wt % EtOH<br>1 wt % citric acid<br>1 wt % glucose in water (fermentation broth) |
| 6 | RO<br>CT<br>SLM | dichromate<br>phenol | 1 ppm dichromate<br>14 ppm phenol | 50,000 ppm dichromate<br>20,000 ppm phenol | 100 ppm dichromate<br>500 ppm phenol in water (industrial waste) |
| 7 | RO<br>CT<br>Pvap | dichromate<br>TCA | 1 ppm dichromate<br>5 ppb TCA | 50,000 ppm dichromate<br>>9,000 ppb TCA | 100 ppm dichromate<br>1000 ppb TCA in water (industrial waste) |
| 8 | RO<br>Pvap<br>MC | ACT<br>EtOH<br>NAA | — | 20.0 wt % ACT<br>80.5 wt % EtOH<br>pure NAA | 1 wt % ACT<br>1 wt % EtOH<br>1 wt % NAA in water (enzyme reaction by-products) |
| 9 | RO<br>SLM<br>MC | phenol<br>pyridine | 20 ppm phenol<br>10 ppm pyridine | 20,000 ppm phenol<br>1200 ppm pyridine | 1000 ppm phenol<br>500 ppm pyridine in water (synfuel condensate) |
| 10 | RO<br>CT<br>MC | dichromate<br>phenol | 1 ppm dichromate<br>14 ppm phenol | 50,000 ppm dichromate<br>20,000 ppm phenol | 100 ppm dichromate<br>500 ppm phenol in water (industrial waste) |
| 11 | RO<br>SLM<br>SLM | phenol<br>pyridine | 20 ppm phenol<br>10 ppm pyridine | 20,000 ppm phenol<br>1200 ppm pyridine | 1000 ppm phenol<br>500 ppm pyridine in water (synfuel condensate) |
| 12 | RO | dichromate<br>copper | 1 ppm dichromate | 50,000 ppm dichromate | 500 ppm copper |

TABLE II-continued

| Example No. | Separation Process | Solutes of Interest | Separation Dilute Stream | Separation Concentrate Stream | Feed Composition |
|---|---|---|---|---|---|
| | CT | | 1 ppm copper | 50,000 ppm copper | 300 ppm dichromate in water (sludge reclamation) |
| | CT | | | | |
| 13 | RO | phenol pyridine | 20 ppm phenol | 20,000 ppm phenol | 1000 ppm phenol |
| | MC | | 10 ppm pyridine | 1200 ppm pyridine | 500 ppm pyridine in water (synfuel condensate) |
| | MC | | | | |
| 14 | Pvap | EtOH | 20,000 ppm EtOH | 95,500 ppm EtOH | 20 wt % EtOH assorted metals and salts in water (refrigeration brine) |
| | Pvap | | | | |
| 15 | Pvap | citric acid | — | 50,000 ppm citric acid | 1 wt % citric acid |
| | SLM | | | 96% pure | 1 wt % glucose in water (fermentation broth) |
| 16 | Pvap | citric acid | — | 50,000 ppm citric acid | 1 wt % citric acid 1 wt % glucose in water (fermentation broth) |
| | MC | | | 96% pure | |
| 17 | MD | dichromate | 0.7 ppm dichromate | 50,000 ppm dichromate | 100 ppm dichromate in water (chrome plating waste) |
| | CT | | | | |

TABLE III

| Example No. | Membrane | Thickness (microns) | Porosity (%) | Pore Size (microns) | SLM or MC Solution | Strip Solution |
|---|---|---|---|---|---|---|
| 1 | RO: Desal 1 | 0.1 | unk | unk | NA | NA |
| | Pvap: Pebax 3533 | 42 | | nonporous | NA | NA |
| 2 | RO: SW-30 | 0.1 | unk | unk | NA | NA |
| | SLM: Celgard X20 | 400ID | 38 | 0.02 | $C_{14}$–$C_{18}$ branched isoparaffin (Isopar V, Exxon Co., Houston, TX) | 0.01 M KOH (pH 12) |
| 3 | RO: SW-30 | | same as Ex. No. 2 | | NA | NA |
| | CT: PSHF 20 | 80 | 50–80 | 0.01–0.05 | 30 vol % $(C_{13}H_{17})_3N$ (Adogen 383, Hankelchem Co., Minneapolis, MN) in dodecane | 0.1M NaOH (pH 13) |
| 4 | RO: SW-30 | | same as Ex. No. 2 | | NA | NA |
| | MC: Model 15-11 | unk | unk | unk | 10 vol % di-2-ethylhexyl phosphoric acid in Kermac 470B (high-boiling hydrocarbon, Kerr-McGee, Oklahoma City, OK) | 0.1 M $H_2SO_4$ (pH 1.0) |
| 5 | RO: SW-30 | | same as Ex. No. 2 | | NA | NA |
| | SLM: Celgard 2400 | 25 | 38 | 0.02 | 38 vol % trilaurylamine, 15 vol % dodecanol 47 vol % Shellsol 71 ($C_9$—$C_{12}$ branched isoparaffin, Shell Oil Co., Houston, TX) | $H_2O$ |
| | Pvap: F-7 HdFDA | 120 | | nonporous | NA | NA |
| 6 | RO: SW-30 | | same as Ex. No. 2 | | NA | NA |
| | CT: PSHF 20 | | same as Ex. No. 3 | | same as Ex. No. 3 | |
| | SLM: Ce;gard X20 | | same as Ex. No. 2 | | same as Ex. No. 2 | |

TABLE III-continued

| Example No. | Membrane | Thickness (microns) | Porosity (%) | Pore Size (microns) | SLM or MC Solution | Strip Solution |
|---|---|---|---|---|---|---|
| 7 | RO: SW-30 | | same as Ex. No. 2 | | NA | NA |
| | CT: PSHF 20 | | same as Ex. No. 3 | | | same as Ex. No. 3 |
| | Pvap: Pebax 3533 | | same as Ex. No. 1 | | NA | NA |
| 8 | RO: SW-30 | | same as Ex. No. 2 | | NA | NA |
| | Pvap: F-7 HdFDA | | same as Ex. No. 5 | | NA | NA |
| | MC: Celgard X20 | | same as Ex. No. 2 | | dioctyl sulfosuccinate in octane | NA |
| 9 | RO: SW-30 | | same as Ex. No. 2 | | NA | NA |
| | SLM: Celgard X20 | | same as Ex. No. 2 | | | same as Ex. No. 2 |
| | MC: Celgard X20 | | same as Ex. No. 2 | | chloroform | 1.0 M $H_2SO_4$ (pH <1) |
| 10 | RO: SW-30 | | same as Ex. No. 2 | | NA | NA |
| | CT: PSHF 20 | | same as Ex. No. 3 | | | same as Ex. No. 3 |
| | MC: Celgard X20 | | same as Ex. No. 2 | | | same as Ex. No. 2 |
| 11 | RO: SW-30 | | same as Ex. No. 2 | | NA | NA |
| | SLM: Celgard X20 | | same as Ex. No. 2 | | | same as Ex. No. 2 |
| | SLM: Celgard X20 | | same as Ex. No. 2 | | | same as Ex. No. 9 |
| 12 | RO: SW-30 | | same as Ex. No. 2 | | NA | NA |
| | CT: Celgard X20 | | same as Ex. No. 2 | | 30 vol % 5-dodecylsalicylaldoxime (LIX 860, Henkel Corp., Minneapolis, MN) | 2.5M $H_2SO_4$ (pH <1) |
| | CT: PSHF 20 | | same as Ex. No. 3 | | | same as Ex. No. 3 |
| 13 | RO: SW-30 | | same as Ex. No. 2 | | NA | NA |
| | MC: Celgard X20 | | same as Ex. No. 2 | | | same as Ex. No. 2 |
| | MC: Celgard X20 | | same as Ex. No. 2 | | | same as Ex. No. 11 |
| 14 | Pvap: F-7 HdFDA | | same as Ex. No. 5 | | NA | NA |
| | Pvap: g-AAm-AA-NaH | unk | nonporous | | NA | NA |
| 15 | Pvap: Neosepta CM-1 | 146 | nonporous | | NA | NA |
| | SLM: Celgard X20 | | same as Ex. No. 2 | | | same as Ex. No. 5 |
| 16 | Pvap: Neosepta CM-1 | | nonporous | | NA | NA |
| | MC: Olin HRC | 1.1 | unk | unk | | same as Ex. No. 5 |
| 17 | MD: Accurel | 1000 | 80 | 0.85 | NA | NA |
| | CT: PSHF 20 | | same as Ex. No. 3 | | | same as Ex. No. 3 |

EXAMPLE 1

Figure 18A:
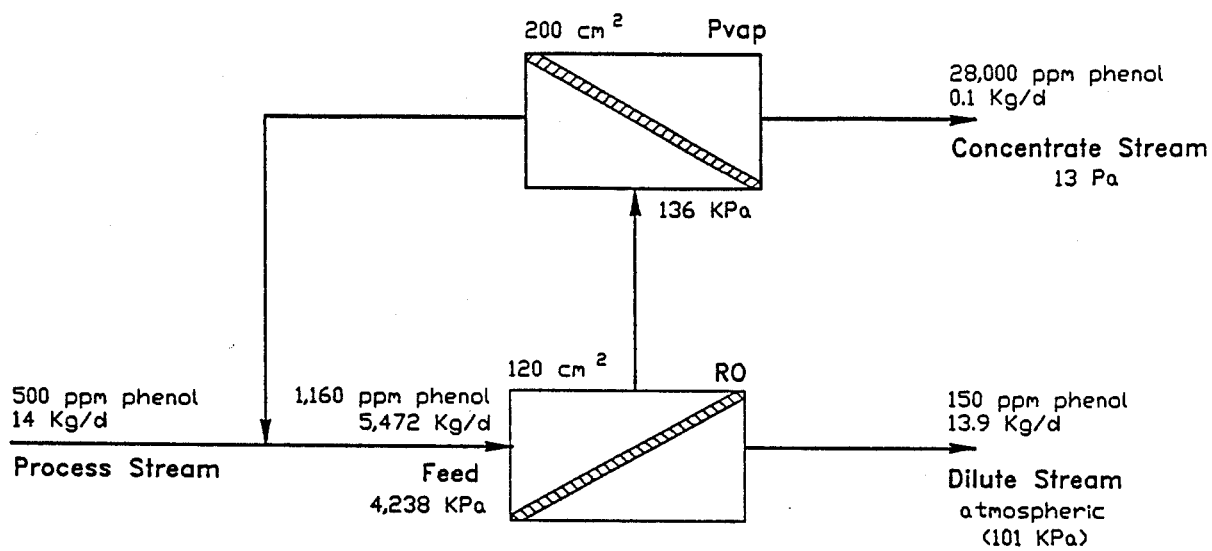

A hybrid RO/Pvap separation system of the present invention is shown schematically in FIG. 18a, using approximately 120 cm² of Desal 1 for the RO membrane and approximately 200 cm² of Pebax 3533 for the Pvap membrane. The aqueous phenol feed stream had an initial phenol concentration of 500 ppm, a pH of 9, and was at 45° C. The phenol concentration, flow rate and feed and permeate pressures of various streams of the system, measured at the points indicated at steady state, are also shown in FIG. 18a. As is apparent from FIG. 18a, the hybrid system produced a concentrate stream having a phenol concentration of 28,000 ppm, and a dilute stream having a phenol concentration of 150 ppm.

Figure 18B:
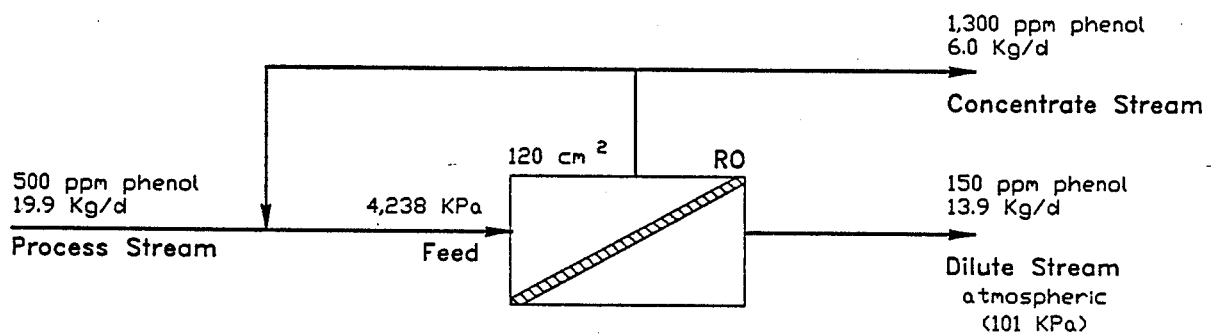
Figure 18C:
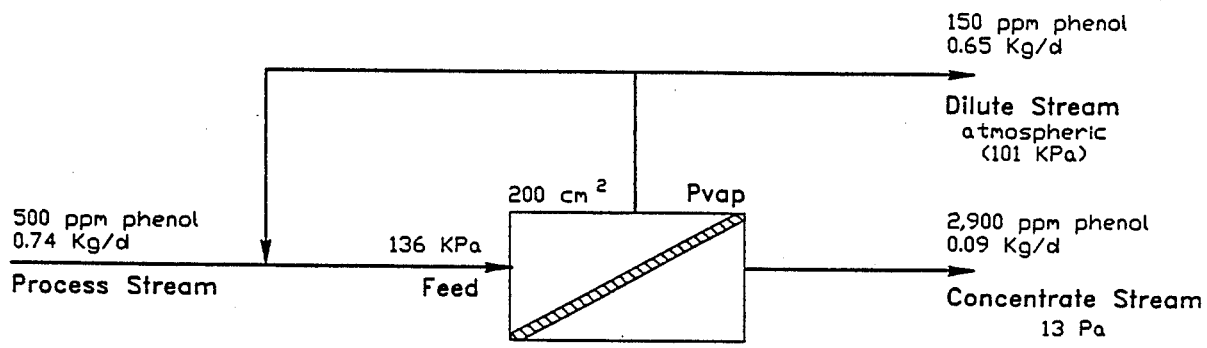

To compare the performance of the hybrid system with its component processes, first, the same RO membrane was operated under the same conditions in a feed-and-bleed mode, as shown in FIG. 18b. The bleed rate of the clean stream (the RO permeate) was adjusted to a phenol concentration in the dilute stream (the RO permeate) that matched that of the hybrid system RO permeate. The data shown in FIG. 18b demonstrate that the RO process alone produces a concentrated phenol stream containing only 1300 ppm phenol, compared to a 28,000 ppm concentrated stream produced by the hybrid process. Thus, the hybrid process of the present invention concentrates phenol an entire order of magnitude more efficiently than the RO process alone. Next, the Pvap separation component process was operated on the same feed under the same conditions in a feed-and-bleed mode, as illustrated in FIG. 18c. The bleed rate of the dilute stream was adjusted to a phenol concentration of 150 ppm, or the same as that of the dilute stream in the hybrid system. The data show in FIG. 18c demonstrate that the Pvap process alone cannot produce a concentrate stream having a phenol concentration greater than 2900 ppm, again, a full order of magnitude less than that of the hybrid system of the present invention.

EXAMPLE 2

Figure 19A:
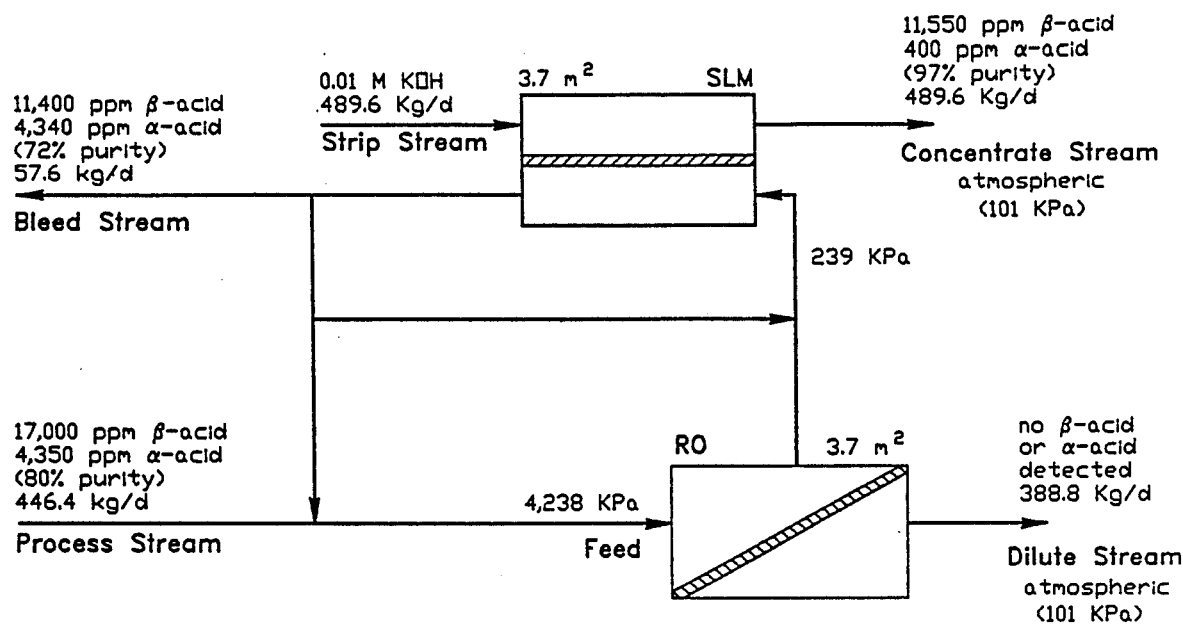

A hybrid separation system of the present invention combining RO and SLM was used to recover beta-acids from a hops extract containing both alpha- and beta-acids. The system is shown schematically in FIG. 19a, along with concentrations, flow rates and pressures at various points during steady-state operation. The RO membranes consisted of four SW-30-2521 modules, for a combined membrane area of 3.7 m². The supported liquid membrane was a Celgard X20 module having a surface area of 3.7 m², loaded with Isopar V (a $C_{14}$–$C_{18}$ branched chain isoparrafin manufactured and sold by Exxon of Houston, Texas). The pH and temperature of the hops extract feed were 9 and 55° C., respectively. The data in FIG. 19a show that the flux through the supported liquid membrane was 3.6 kg/m²-d under these conditions, and that the hybrid system produced a concentrate stream containing 11,550 ppm beta acid that was 97% pure, and a dilute stream with no beta- or alpha-acids detected.

Figure 19B:
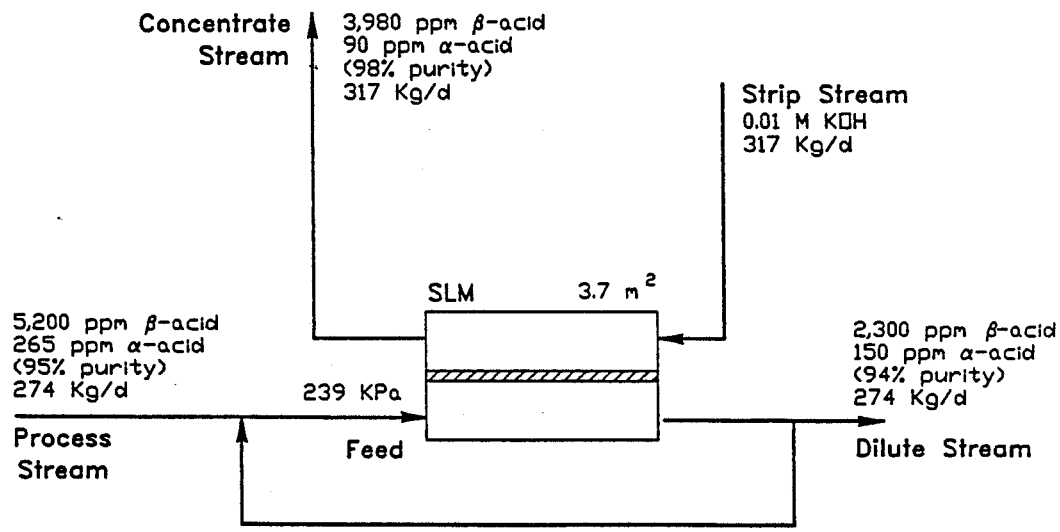

For comparison, the same SLM was operated under the same conditions on a similar feed stream, shown schematically in FIG. 19b. As is apparent from the data shown in FIG. 19b, a flux of only 0.3 kg/m²-d was obtained, a full order of magnitude lower than that of the hybrid system, while producing a concentrate stream having a beta-acid concentration of only 3980 ppm, and a dilute stream containing 2300 ppm beta-acid. RO alone may not be used to perform the desired separation since RO membranes are not selective for beta acids relative to alpha acids.

EXAMPLE 3

Figure 20A:
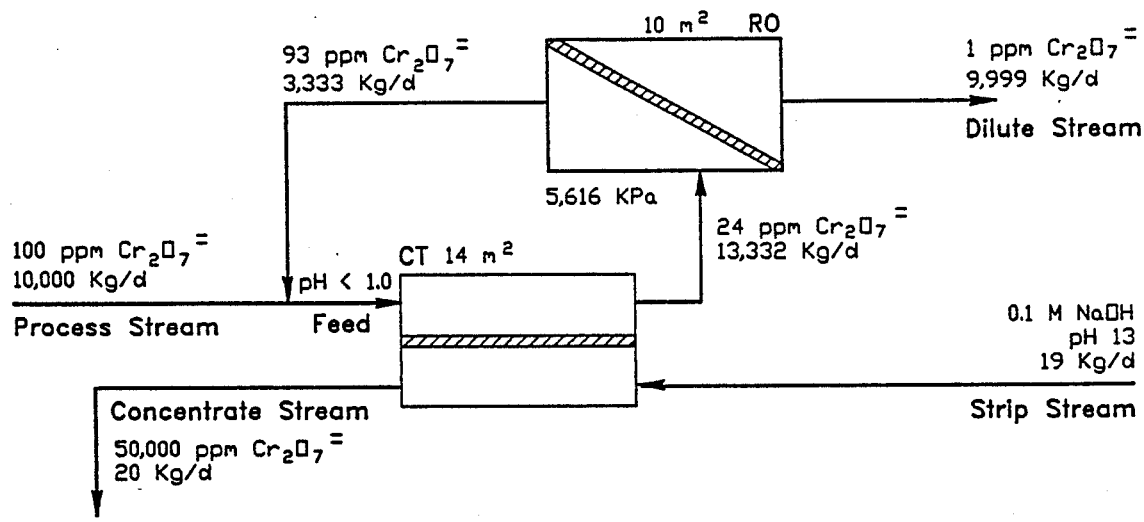

A hybrid separation system of the present invention combining RO and CT is used to recover chromium in the form of dichromate from a chromium plating rinse stream. This system is shown schematically in FIG. 20a, along with concentrations, flow rates, RO feed pressure and pH at various points of the system during steady-state operation. The RO membrane comprises 10 $m^2$ of an SW-30 spiral wound membrane module, and the CT membrane comprises 14 $m^2$ of polysulfone hollow fibers having the specifications and being loaded with the liquid extractant set forth in Table III. The CT co-ion is $H^+$. The permeate side of the CT membrane is in contact with a product or strip solution comprising 0.1M NaOH at pH 13. The RO membrane has a water flux of 1018 $kg/m^2$-day and a dichromate rejection of 98% at a feed pressure of 5616 KPa. The CT membrane has a flux of 1.34 $g/m^2$-day-ppm. As is apparent from FIG. 20a, a separation of 50,000 ppm dichromate ion in the concentrate stream and 1 ppm dichromate in the dilute stream is achieved by the hybrid system of the present invention.

Figure 20B:
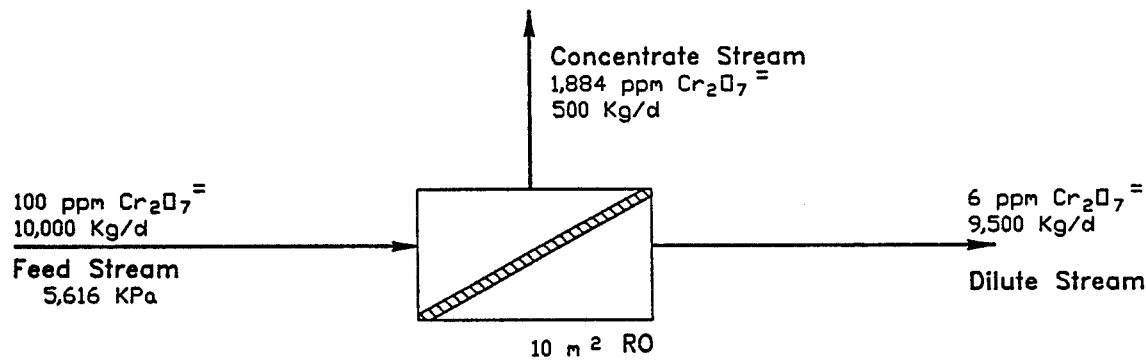
Figure 20C:
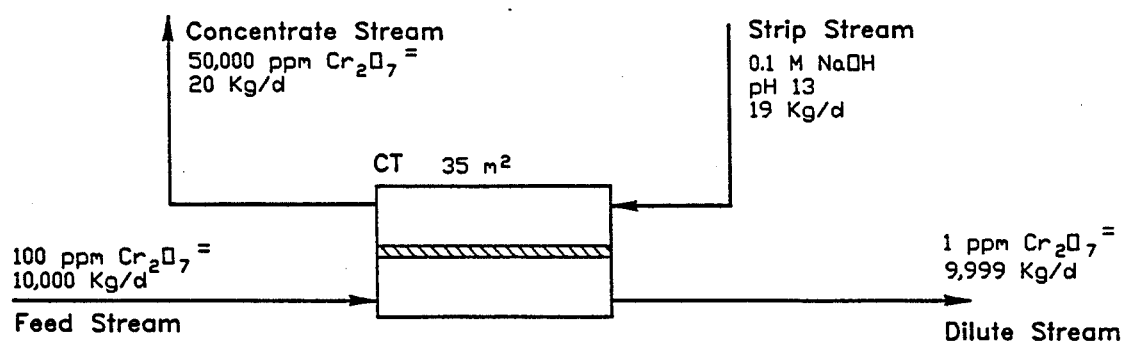

For comparison, the same feed stream is subjected to RO treatment alone under the same conditions, as illustrated in FIG. 20b, which shows that the same degree of separation may not be achieved by RO treatment alone. FIG. 20c illustrates treatment of the same feed by CT alone under the same conditions except with a CT membrane surface area of 35 $m^2$. Although the same degree of separation is met, nearly 70% more membrane surface area is required in comparison to that required by the hybrid system. Using CT alone and the same membrane surface area (14 $m^2$) (not shown), although a concentration of 50,000 ppm dichromate may be achieved in the concentrate stream, a dilute stream concentration of only 15 ppm is possible.

EXAMPLE 4

Figure 21A:
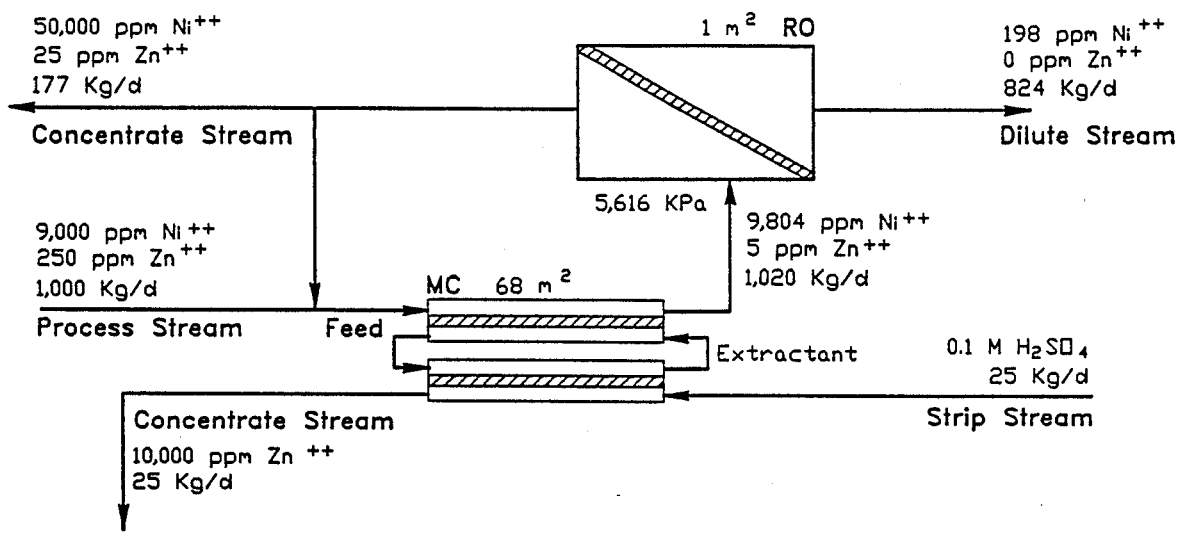

A hybrid separation system of the present invention combining RO and a membrane contactor is used to separate zinc(II) ions from a dissolved sludge containing 9000 ppm nickel(II) as nickel sulfate and 250 ppm zinc(II) as zinc sulfate. Since nickel(II) has commercial value in admixture with zinc(II) only when the concentration of the latter is $\leq 25$ ppm, the separation goal is to achieve nickel(II) separation as high as possible with $\leq 25$ ppm zinc(II). The system is shown schematically in FIG. 21a, along with concentrations, flow rates and RO feed pressure at various points during steady-state operation. The RO membrane comprises 1 $m^2$ of an SW-30 membrane, while the membrane contactor comprises 68 $m^2$ of Model 15-11 hydrophilic regenerated cellulose hollow fibers containing the water-immiscible liquid extractant specified in Table III. In this Example, it is desirable to reuse the extractant, and so it is preferred to transfer zinc(II) to an aqueous solution for disposal. However, extraction from one aqueous solution to another is impossible since aqueous solutions are miscible. Therefore, zinc(II) is first extracted into the water-immiscible extracting solution specified in Table III, and then back into an aqueous solution, the water-immiscible-to-aqueous extraction being driven by the difference in hydrogen ion concentration between the aqueous strip solution and the extractant solution. The combined total of the two membrane contactors mentioned is 68 $m^2$. The low pH aqueous strip solution is specified in Table III. The RO membrane has the same water flux and feed pressure specified in Example 3, with a zinc(II) and nickel(II) rejection of 99%, while the zinc(II) flux through the membrane contactor is 7.2 $g/m^2$-d for the range of concentration. The hybrid system achieves a separation of 50,000 ppm nickel(II) with 25 ppm zinc(II) in the RO bleed-off concentrate stream, $<1$ ppm zinc(II) and 198 ppm nickel(II) in the dilute stream, and 10,000 ppm zinc(II) in the MC concentrate stream.

Figure 21B:
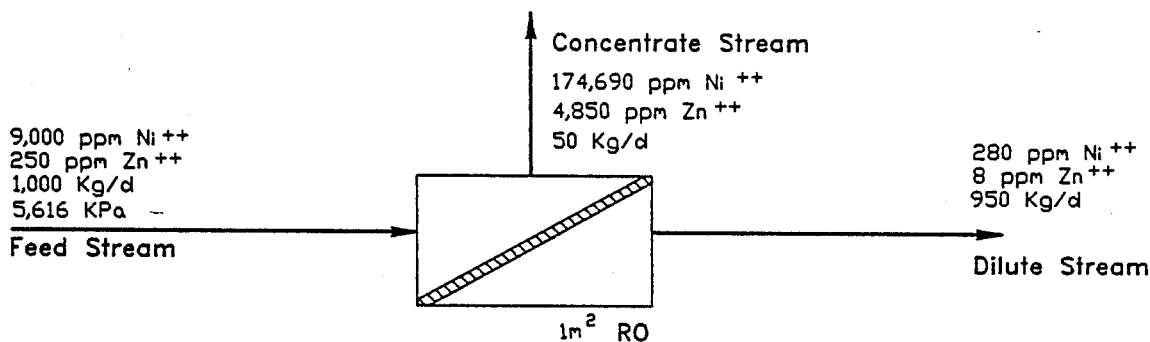
Figure 21C:
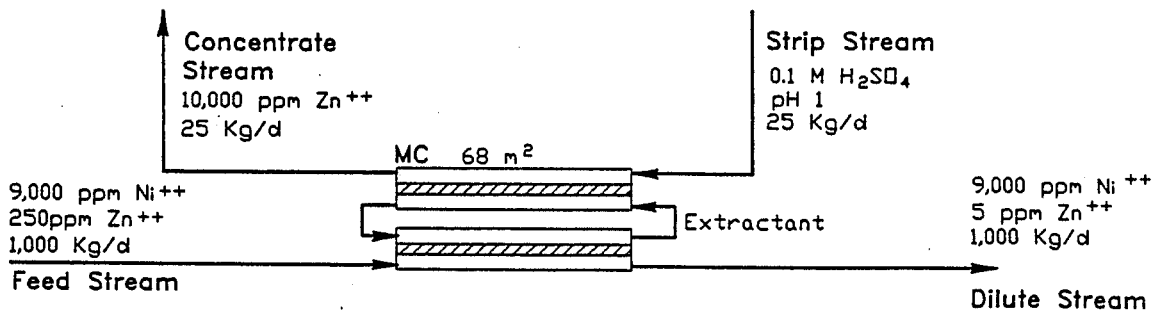

For comparison, the same feed stream is treated with RO only and, as shown in FIG. 21b, is incapable of achieving a useful nickel(II) concentrate since the zinc(II) concentration in the concentrated stream is so high (4850 ppm). FIG. 21c illustrates treatment of the same feed stream under the same conditions with MC alone having the same membrane surface area (68 $m^2$); no nickel(II) concentration is obtainable, making the separation unsatisfactory.

EXAMPLE 5

Figure 22A:
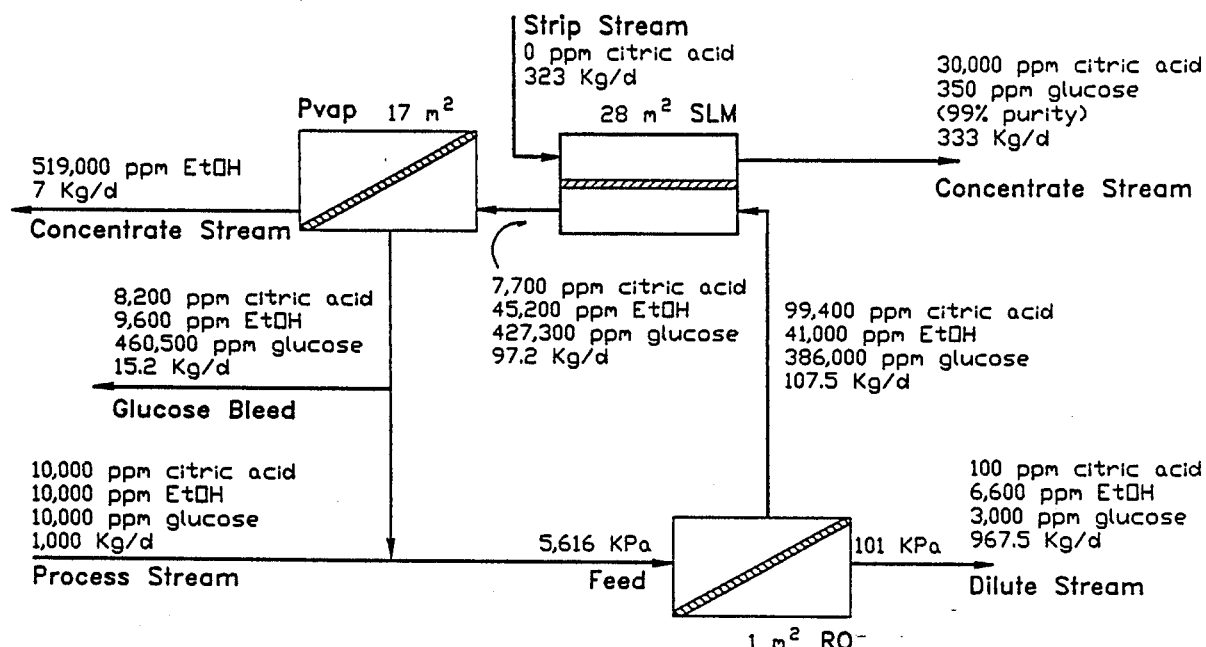

A hybrid separation system of the present invention combining RO, SLM and pervaporation is used to separate ethanol and citric acid from an aqueous fermentation broth containing those two constituents, along with glucose. The system is shown schematically in FIG. 22a, along with concentrations in ppm, flow rates and RO feed pressure at various points, measured on a steady-state basis. The RO membrane comprises 1 $m^2$ of an SW-30 membrane having the same water flux and feed pressure specified in Example 3, a citric acid rejection of 99.74%, a glucose rejection of 98% and an ethanol rejection of 70%. The supported liquid membrane comprises 28 $m^2$ of a Celgard 2400 membrane loaded with the liquid extractant composition specified in Table III, being provided with a pure water strip solution on its permeate side, and having a citric acid flux which is dependent on the citric acid concentration of both the feed and the strip solutions, with a selectivity of citric acid in preference to glucose of 100. The pervaporation membrane comprises 17 $m^2$ of the F-7 HdFDA graft polymer membrane having an ethanol permeability of .009 $g/m^2$-d-ppm and a separation factor of ethanol in preference to water of 45.9. As indicated in FIG. 22a, 519,000 ppm ethanol and 30,000 ppm citric acid that is 99% pure is separated by the hybrid system.

Figure 22B:
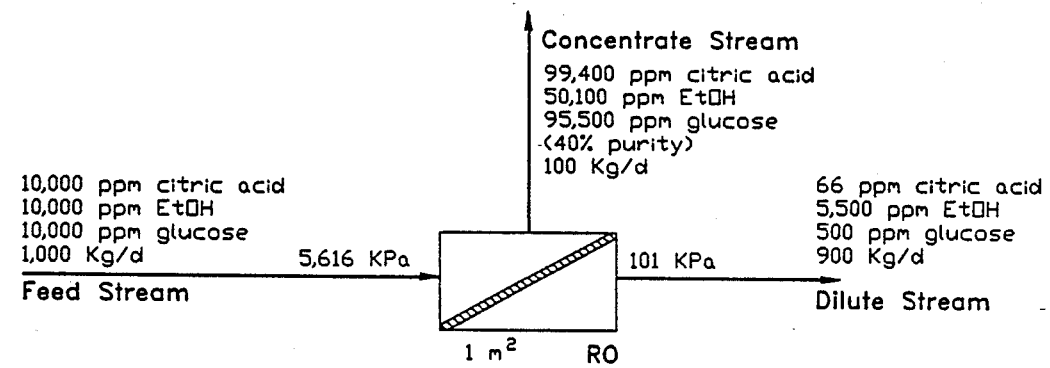
Figure 22C:
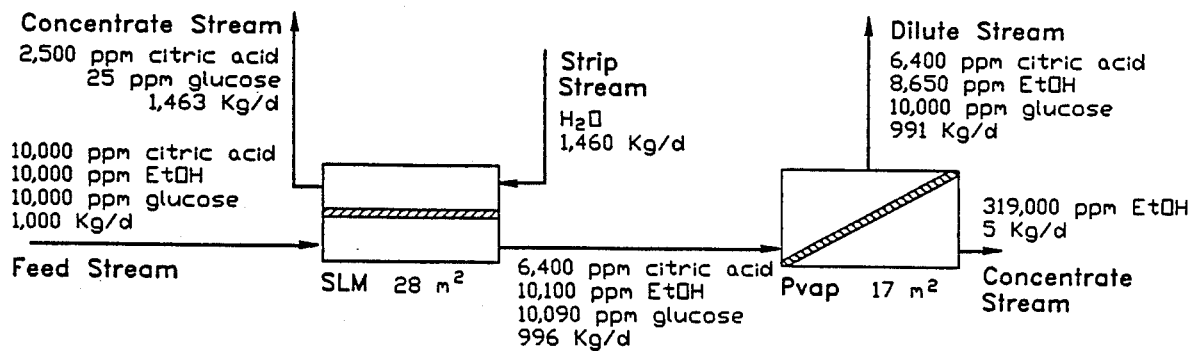

For comparison, the same feed stream is treated with RO only and with a combination of SLM and Pvap only, the former being illustrated in FIG. 22b and the latter in FIG. 22c. As shown in FIG. 22b, although the citric acid separation of the hybrid system is exceeded from the standpoint of amount recovered, such a recovery by RO treatment alone comes at the expense of a substantial reduction in purity (to 20%), due largely to the inability of the RO membrane to separate glucose from citric acid. As is also apparent from FIG. 22b, RO treatment alone cannot achieve even one-tenth of the ethanol separation that is achieved by the hybrid system. As shown in FIG. 22c, wherein the SLM and Pvap membranes areas are the same as used in the hybrid system depicted in FIG. 22a, the system is capable of producing concentrate streams having relatively low concentrations of citric acid and ethanol.

EXAMPLE 6

Figure 23A:
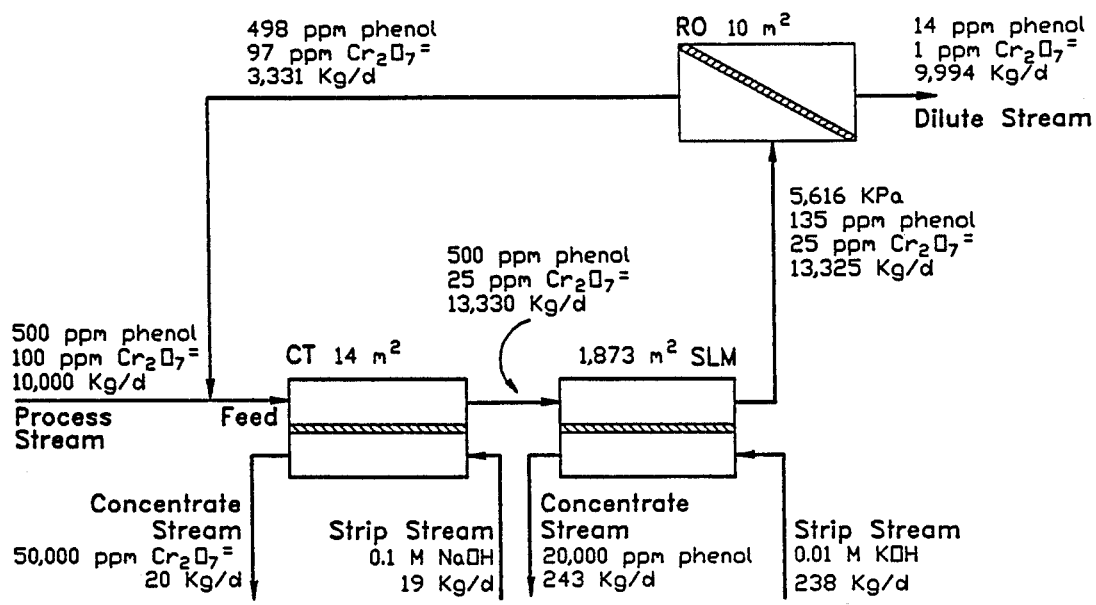

A hybrid separation system of the present invention combining RO, CT and SLM is used to recover phenol and dichromate ion from an aqueous industrial waste stream, shown schematically in FIG. 23a, along with concentrations, flow rates and RO pressure feed at various points in the system measured at steady-state. The RO membrane comprises 10 m$^2$ of an SW-30 membrane having the same water flux and feed pressure specified in Example 3, a dichromate rejection of 98% and a phenol rejection of 95%. The CT membrane comprises 14 m$^2$ of polysulfone hollow fibers having the specifications and loaded with the liquid extractant noted in Table III, a permeability of 1.34 g/m$^2$-day-ppm Cr$_2$O$_7$ = and provided with a strip solution comprising 0.1 M NaOH at pH 13 on its permeate side. The co-ion is H$^+$. The SLM-type membrane comprises 183 m$^2$ of that specified in Table III, having a phenol permeability of 0.0093 g/m$^2$-day-ppm and being provided with a strip solution comprising 0.01 M KOH at pH 12 on its permeate side. As seen in FIG. 23a the hybrid system achieves a separation of 50,000 ppm dichromate and 20,000 ppm phenol in its concentrated streams, and 1 ppm dichromate and 14 ppm phenol in its dilute stream.

Figure 23B:
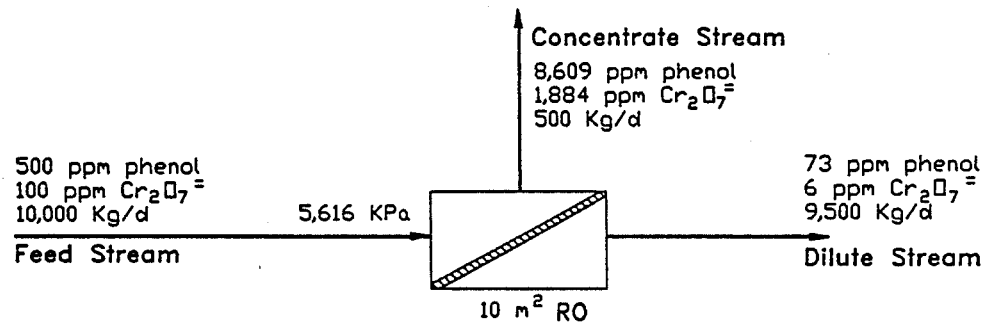
Figure 23C:
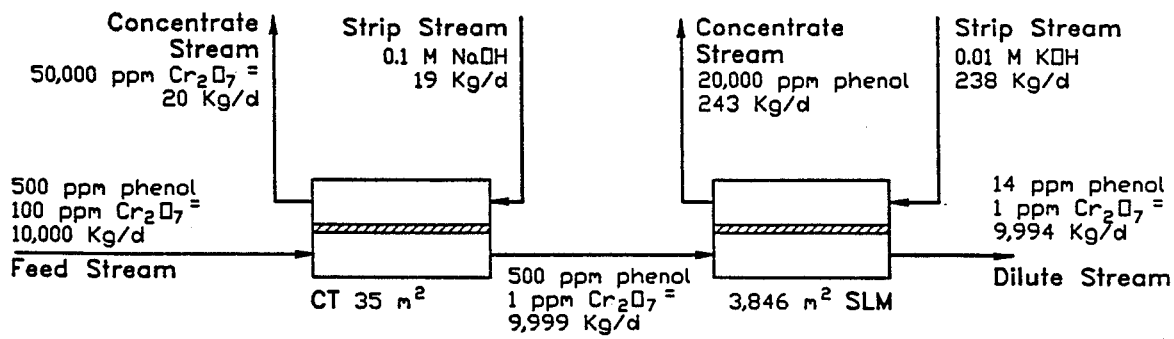

The hybrid system was compared with systems comprising RO only and a combination of CT and SLM only, shown in FIGS. 23b and 23c, respectively. As is apparent from FIG. 23b, RO treatment alone is not capable of achieving phenol separation from dichromate. As shown in FIG. 23c, which uses a CT membrane area of 35 m$^2$ and an SLM membrane area of 3846 m$^2$, although the desired separation is achievable with such a system, approximately twice the membrane area for both membranes is required. Using the same amount of CT and SLM membrane as used in the hybrid system of FIG. 23a (not shown), the combination of CT and SLM is only capable of achieving unacceptably high dilute stream concentrations of 90 ppm phenol and 15 ppm dichromate, with fluxes through both membranes reduced by about 15%.

EXAMPLE 7

Figure 24A:
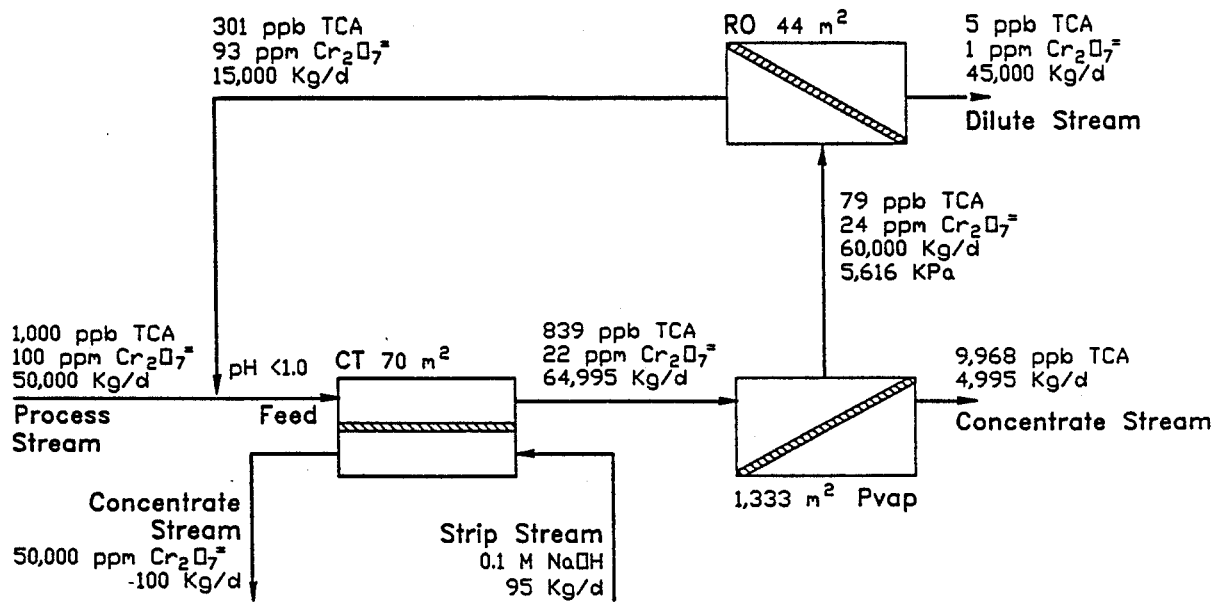

A hybrid separation system of the present invention combining RO, CT and Pvap to recover trichloroethane (TCA) and dichromate from industrial waste water, is illustrated schematically in FIG. 24a, with the various steady-state operating parameters specified therein. The RO membrane comprises 44 m$^2$ of an SW-30 membrane as specified in Table III that has the same water flux and feed pressure specified in Example 3, a TCA rejection of 97%, and a dichromate rejection of 98%. The CT membrane comprises 70 m$^2$ of the membrane specified in Table III provided with a recirculating product solution of 0.1 M NaOH at pH 13 on its permeate side and having a dichromate permeability of 1.34 g/m$^2$-day-ppm. The co-ion is H$^+$. The Pvap membrane comprises 1333 m$^2$ of the membrane specified in Table III having a TCA permeability of 0.116 g/m$^2$-day-ppm TCA and an enrichment factor of TCA in preference to water of 30. As shown in FIG. 24a, the hybrid system is capable of separating 50,000 ppm dichromate and 9968 ppb TCA in its concentrate streams, and 1 ppm dichromate and 5 ppb TCA in its dilute stream.

Figure 24B:
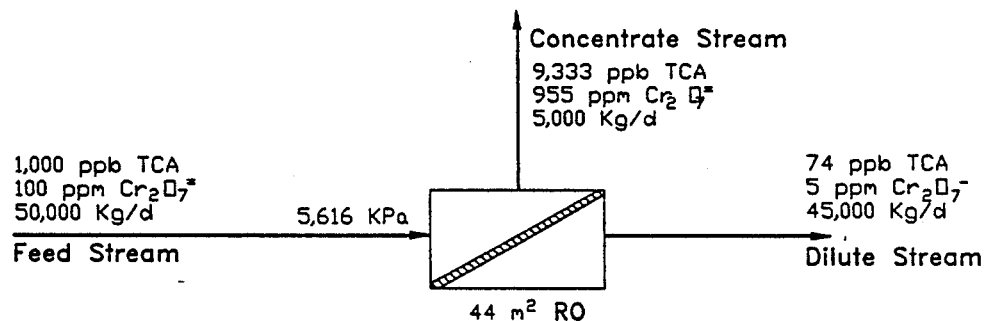
Figure 24C:
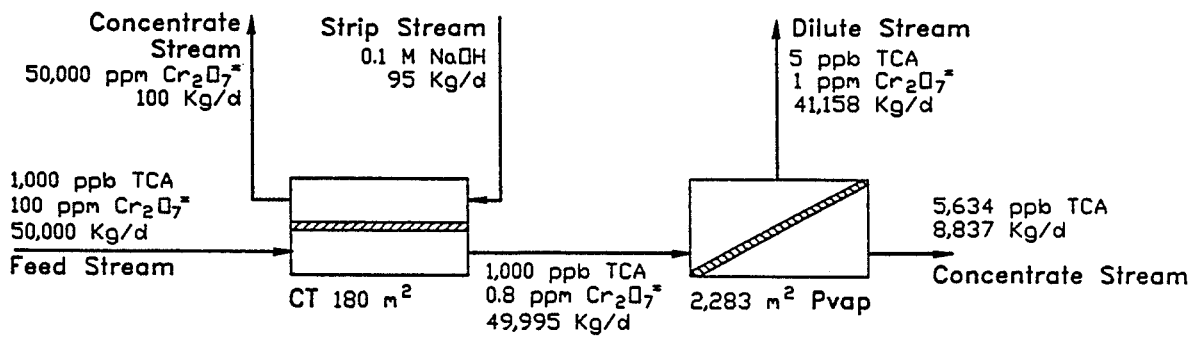

For comparison, systems comprising RO treatment only and a combination of CT and Pvap only are illustrated in FIGS. 24b and 24c, respectively. As is apparent from FIG. 24b, RO treatment alone results in a concentrate stream having a dichromate concentration of only 955 ppm and a dilute stream having concentrations of 5 ppm dichromate and 74 ppb TCA, and so is incapable of achieving the same degree of separation as the hybrid system. As seen in FIG. 24c, which is operated with membrane areas of 180 m$^2$ and 2283 m$^2$ for CT and Pvap, respectively, although the system shows the same separation capability as the hybrid system for three of the four desired separations, nearly twice the membrane surface area is required. Using the same amount of CT and Pvap membrane as the hybrid system of FIG. 24a without RO treatment (not shown), although nearly the same concentration of TCA is achievable in the concentrate stream (9090 ppb), the solute concentrations in the dilute stream are unacceptably high (60 ppb TCA and 17 ppm dichromate).

EXAMPLE 8

Figure 25A:
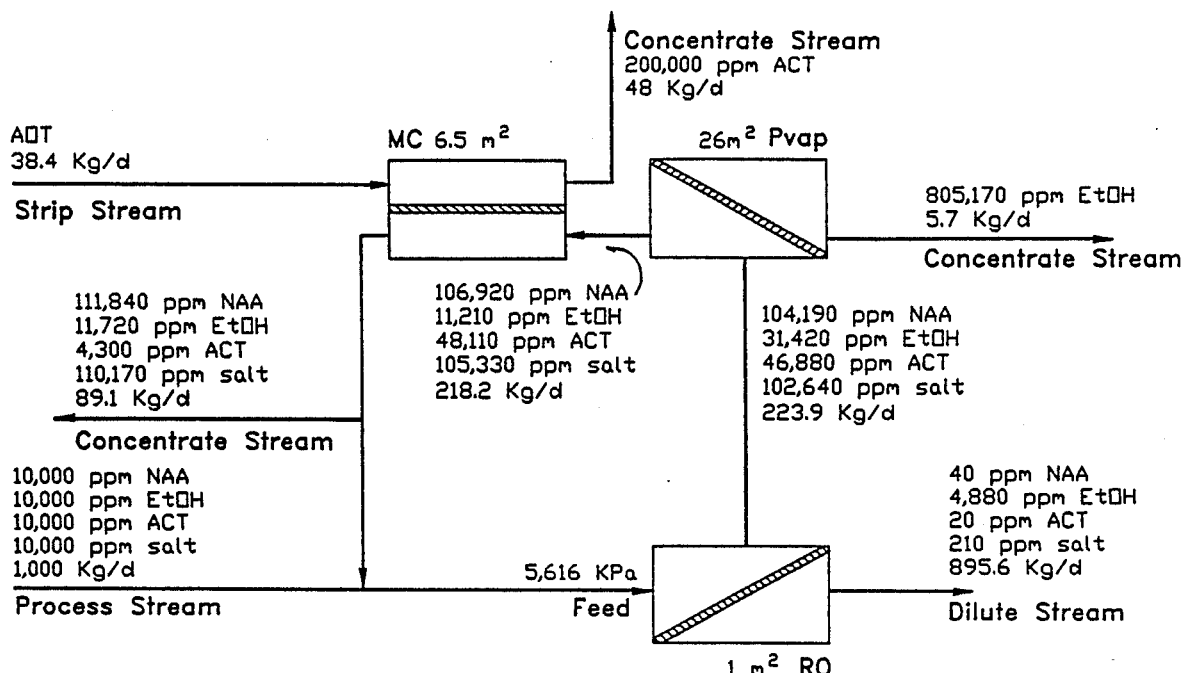

A hybrid separation system of the present invention combining RO, pervaporation and a membrane contactor to separate alpha-chymotrypsin (ACT), ethanol (EtOH), and N-acetylamine (NAA) from an aqueous byproduct solution forced by the hydrolysis of N-acetylphenylalanine ethyl ester, the byproduct solution containing 10,000 ppm each of ACT, NAA, EtOH, and potassium phosphate buffer salt. The hybrid system is shown schematically in FIG. 25a, together with the steady-state operating parameters of the system. The RO membrane comprises 1 m$^2$ of the SW-30 membrane of Example 2, having rejection rates of 99.9%, 70%, 99.9% and 99.5% for NAA, EtOH, ACT, and the buffer salt, respectively. The pervaporation membrane comprises 26 m$^2$ of F-7 HdFDA grafted membrane that is selective to EtOH, and having an EtOH permeability of 0.009 g/m$^2$-d-ppm and a separation factor of 45.9 for EtOH over water. The membrane contactor comprises 6.5 m2 of a Celgard X20 membrane provided on its permeate side with a product or strip solution comprising a mixture of the water-immiscible liquid dioctyl-disulfosuccinate (AOT) and octane, the membrane contactor having an ACT permeability of 0.147 g/m$^2$-d-ppm. As seen from FIG. 25a, the hybrid system produces concentrate streams containing 805,170 ppm EtOH, 200,000 ppm ACT and 111,840 ppm NAA, as well as a dilute stream containing 210 ppm of the salt. The ACT is usable in the product or strip solution, without the need for further extraction. Because the hybrid system permits removal of the ACT upstream of the NAA separation, the NAA may be precipitated out of its concentrate stream in pure form by adjusting the pH of that stream to 2 without concern for denaturing any significant amount of ACT by such acid treatment (the NAA concentrate stream contains only 4300 ppm ACT).

Figure 25B:
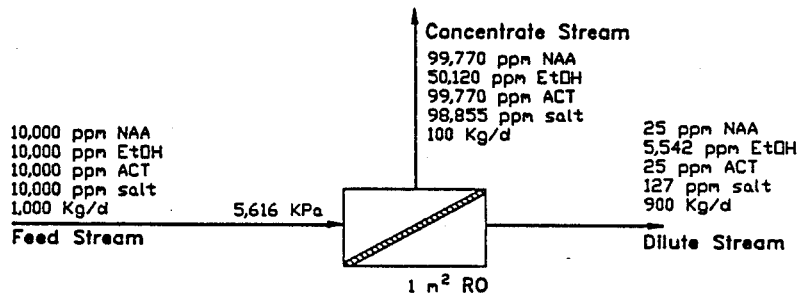
Figure 25C:
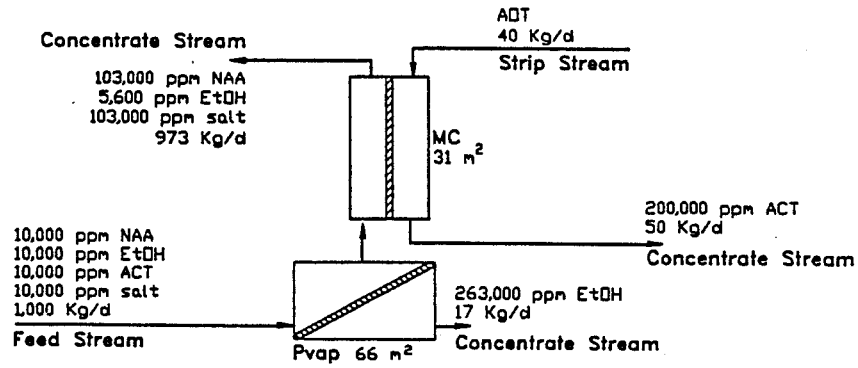

For comparison, the same feed is treated by RO only and by a combination of pervaporation and membrane contactor only, illustrated in FIGS. 25b and 25c, respectively. As is apparent from FIG. 25b, the RO treatment alone is incapable of producing the three concentrate streams the hybrid system produced. Although the combination system of FIG. 25c uses substantially increased membrane area (66 m$^2$ for Pvap and 31 m$^2$ for MC), a separation of concentrate stream containing only 263,000 ppm EtOH and 10,300 ppm NAA is achieved. Using the same amount of Pvap and MC membrane area as used in the hybrid system shown in FIG. 25a, but without RO treatment (not shown), concentrations of 200,000 ppm ACT, 294,000 ppm EtOH, and 10,100 ppm NAA are achievable.

EXAMPLE 9

Figure 26A:
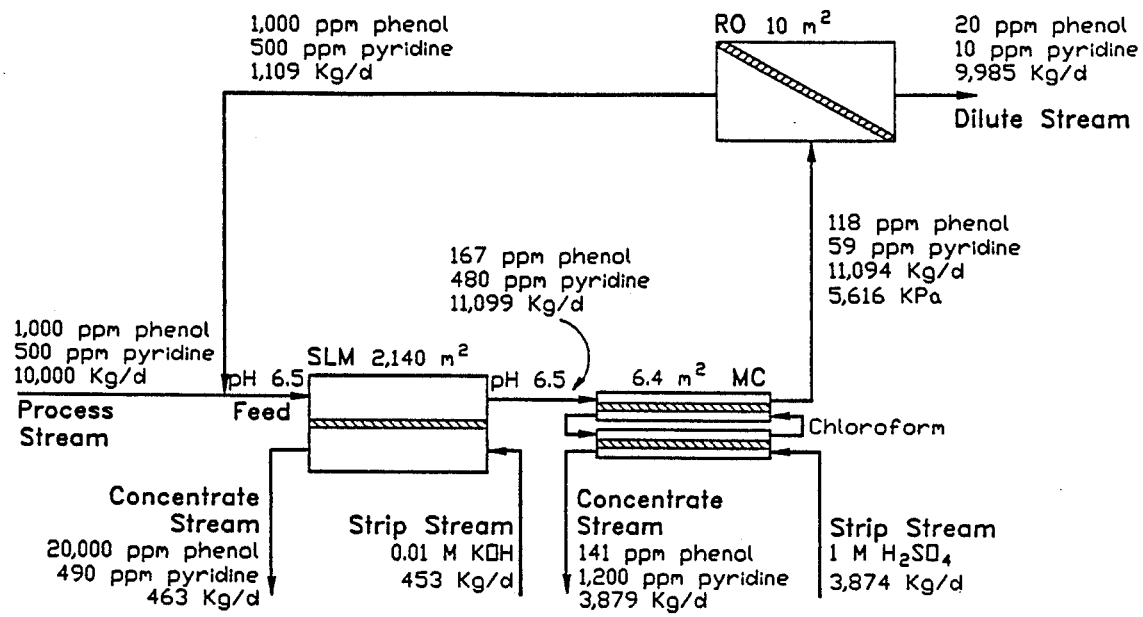

A hybrid separation system of the present invention combining RO, SLM and MC processes to separate phenol and pyridine from a feed comprising an aqeuous synfuel condensate stream is shown schematically in FIG. 26a, along with steady-state operating parameters of the system. The RO membrane comprises 10 $m^2$ of the SW-30 membrane having a water flux of 1018 kg/$m^2$-day at 5616 KPa and a rejection rate of 95% for both phenol and pyridine. The membrane for the SLM separator comprises 2140 $m^2$ of the same Celgard X-20 membrane of Example 2 and having a phenol permeability of 0.0093 g/$m^2$-day-ppm. The membrane material for the membrane contactor separation unit comprises a total of 6.4 $m^2$ of the same Celgard membrane used for SLM, but provided on its permeate side with a product or strip solution comprising chloroform, and having a pyridine permeability of 3.4 g/$m^2$-day-ppm. The desired product for this example is pyridine in an aqueous solution so the pyridine must be removed from the chloroform using another MC with low pH (1) as the driving force for extracting pyridine from chloroform into the aqueous concentrate stream. The hybrid system produces concentrate streams containing 20,000 ppm phenol and 1,200 ppm pyridine, while producing a dilute stream having concentrations of 20 ppm phenol and 10 ppm pyridine.

Figure 26B:
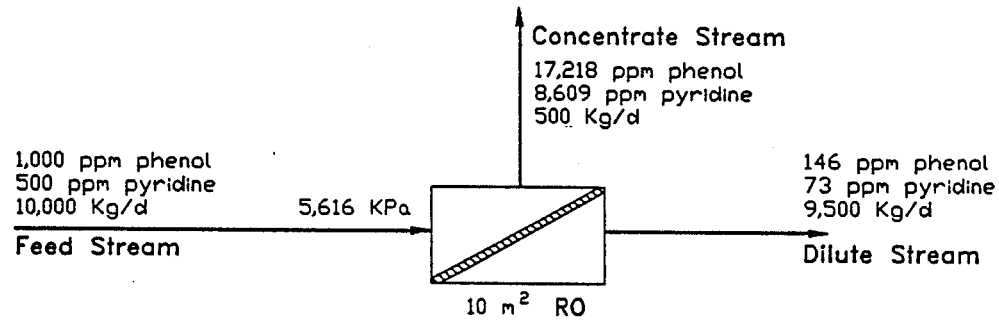
Figure 26C:
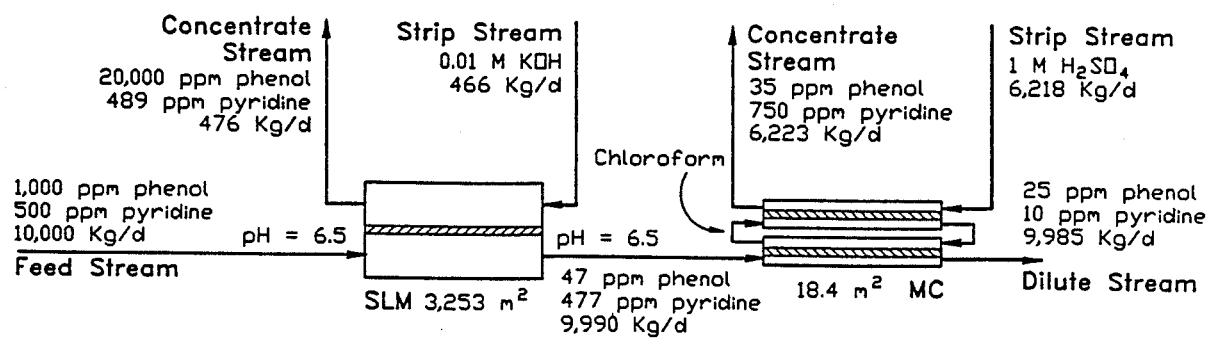

For comparison, the same feed stream is treated with only the RO component of the hybrid system and only the combination of SLM and MC of the hybrid system, illustrated schematically in FIGS. 26b and 26c, respectively. As seen in FIG. 26b, RO treatment alone is incapable of matching the separation of the hybrid system, especially with respect to solute concentrations in the dilute stream. Similarly, as seen from FIG. 26c, even though greatly increased membrane surface areas are used, the system is incapable of achieving the same degree of separation with respect to pyridine as that of the hybrid system. Using the same amount of SLM and MC membrane as used in the threecomponent hybrid system shown in FIG. 26a (not shown), a two-component SLM and MC system, although matching the separation as to phenol, produces a pyridine concentration of only 750 ppm in the concentrate stream.

Example 10

Figure 27A:
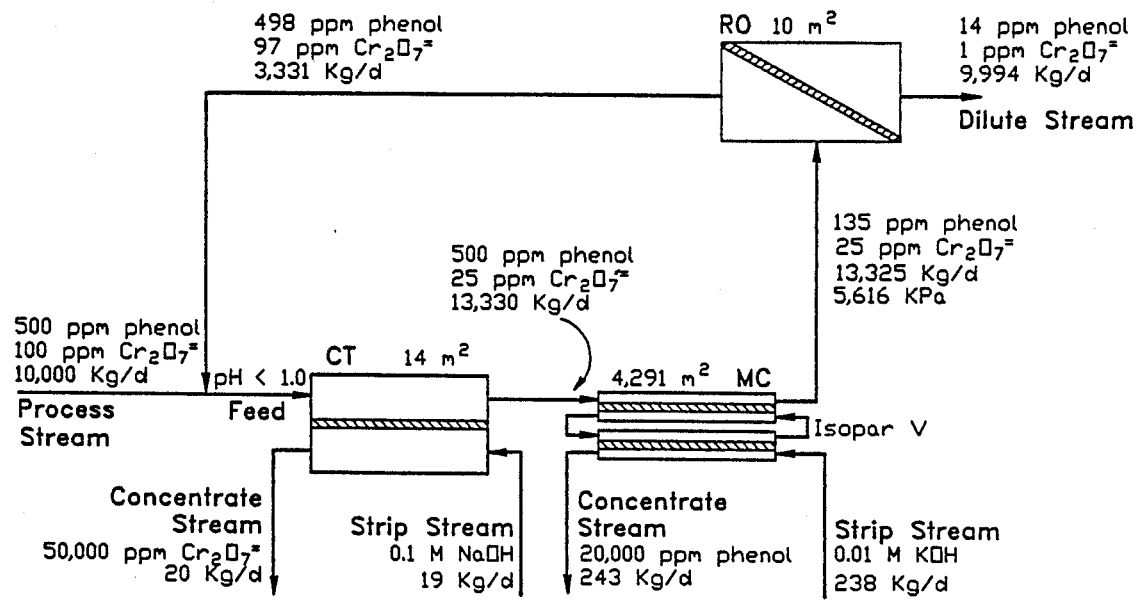

A hybrid separation system of the present invention combining RO, CT and MC is used to recover phenol and dichromate ion from an aqueous industrial waste stream, shown schematically in FIG. 27a. The RO and CT membranes comprise the same ones used in Example 6, while the membrane of the membrane contactor comprises the same membrane material as used for the SLM in Example 6. The desired product for this example is phenol in an aqueous solution, so the phenol must be removed from the Isopar V extracting liquid using another MC with high pH (12) as the driving force for the transfer of phenol from the Isopar V into the aqueous phenol concentrate stream. The RO membrane area is 10 $m^2$, the CT membrane area is 14 $m^2$ and the combined membrane area of the two membrane contactors is 4291 $m^2$. The feed side of the CT membrane is maintained at a pH of less than 1, while the permeate side is maintained at a pH of 13 by being in contact with a product or strip solution of 0.1 M NaOH. The feed side of the membrane contactor is maintained at a pH of 6.5, while its permeate side is maintained at a pH of 12 by being in contact with a strip solution of 0.01 M KOH. As seen in FIG. 27a, the hybrid system produces concentrate streams containing concentrations of 50,000 ppm dichromate and 20,000 ppm phenol, while producing a dilute stream containing concentrations of 1 ppm dichromate and 14 ppm phenol.

Figure 27B:
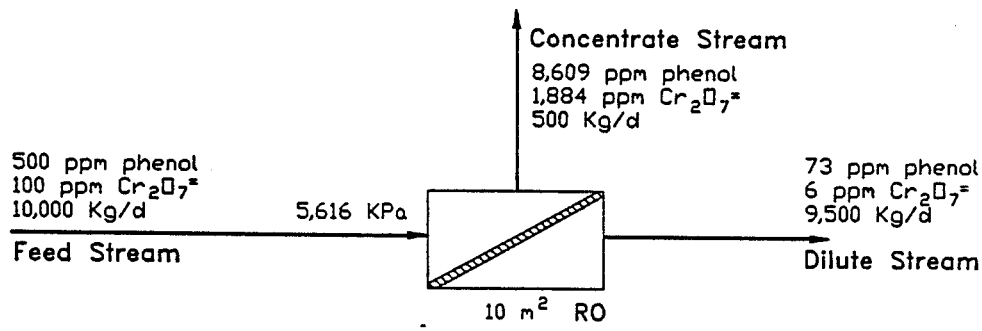
Figure 27C:
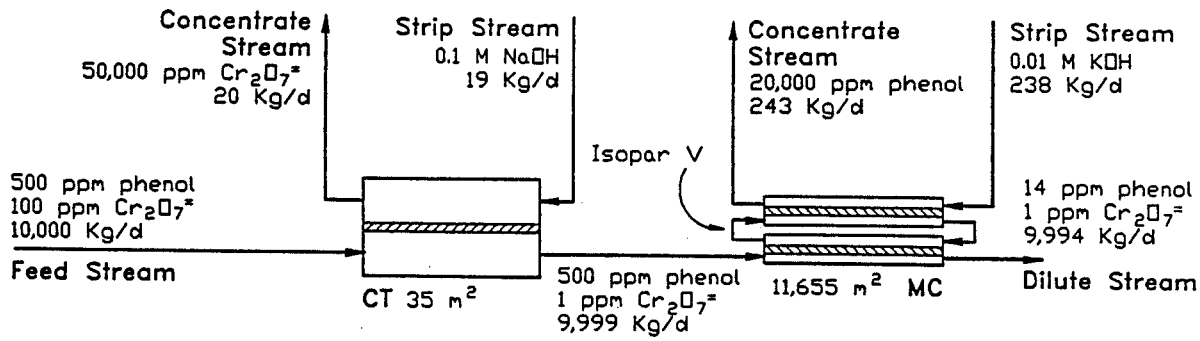

For comparison, treatment of the same feed stream by RO only and by a combination of CT and MC only are shown schematically in FIGS. 27b and 27c, respectively. As seen from FIG. 27b, treatment by RO alone is incapable of producing the same degree of separation as the hybrid system of FIG. 27a, since the lowest possible concentrations of phenol and dichromate in the dilute stream achievable by RO using the same membrane surface area are 73 ppm and 6 ppm, respectively. FIG. 27c demonstrates that, in order to achieve the same degree of separation as the hybrid system, more than twice the CT membrane area and nearly three times the MC membrane area are required. Using the same CT and MC membrane area as used in the hybrid system of FIG. 27a, but without RO treatment (not shown), a dilute stream having unacceptably high phenol and dichromate concentrations of 90 ppm and 15 ppm is obtainable, along with fluxes reduced by about 15%.

EXAMPLE 11

Figure 28A:
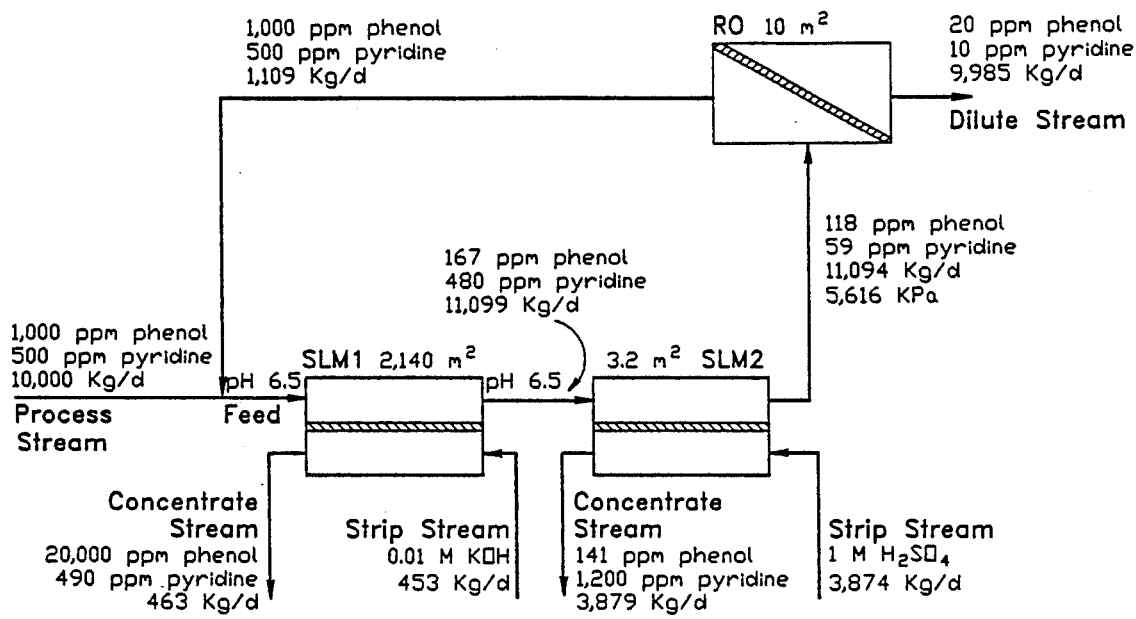

A hybrid separation system of the present invention combining RO and two SLM processes to separate phenol and pyridine from an aqueous synfuel condensate stream is illustrated schematically in FIG. 28a, with the various steady-state operating parameters specified therein. The RO membrane comprises 10 $m^2$ of the same membrane specified in Example 3, and having a pyridine and phenol rejection rate of 95%. Both supported liquid membranes are of the type specified in Example 2, the first having an area of 2140 $m^2$ and the second having an area of 3.2 $m^2$. The first supported liquid membrane is loaded as in Example 2, while the second is loaded with chloroform. The first has a phenol permeability of 0.0093 g/$m^2$-day-ppm phenol, while the second has a pyridine permeability of 3.4 g/$m^2$-day-ppm. The product or strip solution for the first SLM is 0.01 M KOH, maintained at pH 12, while that for the second SLM is 1.0 M $H_2SO_4$, maintained at pH <1. The hybrid system achieves a separation of 20,000 ppm phenol and 1200 ppm pyridine in its concentrate streams, and 20 ppm phenol and 10 ppm pyridine in its dilute stream.

Figure 28B:
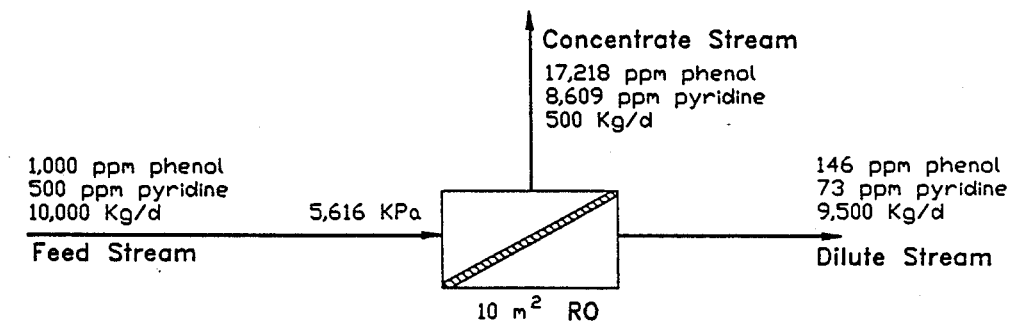
Figure 28C:
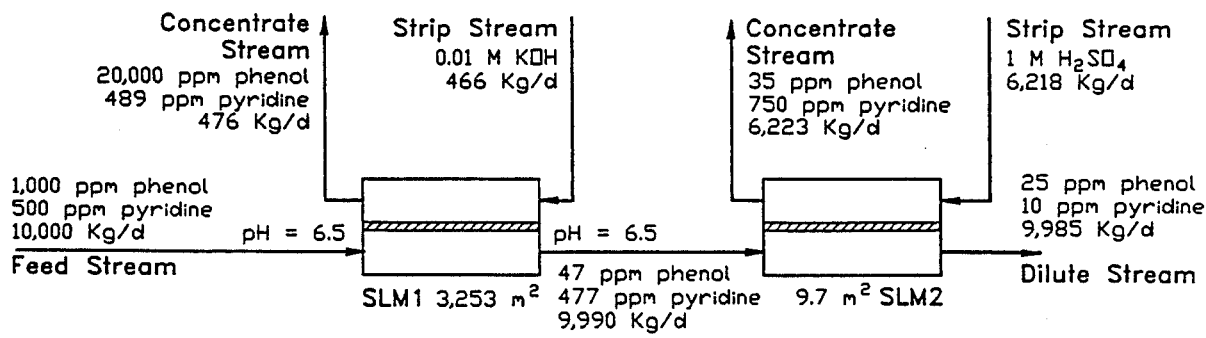

For comparison, systems treating the same feed stream with the same RO membrane and same combination of two SLM-type membranes are shown in FIGS. 28b and 28c, respectively. As seen from FIG. 28b, the RO treatment alone with the same amount of membrane area as the hybrid system of FIG. 28a is capable of taking the concentrations of phenol and pyridine in the dilute stream only down to 146 ppm and 73 ppm, respectively. As seen in FIG. 28c, to achieve the same degree of phenol separation in the concentrate stream, it is necessary to use substantially more of both SLM membrane areas; even with such increased surface areas, a separation of only 750 ppm pyridine is achieved in the concentrate stream. Using the same amount of the same two SLM membranes as used in the hybrid system of FIG. 28a but without RO treatment (not shown), although 20,000 ppm phenol concentration is achieved, the total amount of phenol separated is only 9% of that separated by the hybrid system, the highest pyridine concentration obtainable in the concentrate is only 750 ppm, while the dilute stream concentrations are undesirably high (116 ppm phenol and 56 ppm pyridine).

EXAMPLE 12

Figure 29A:
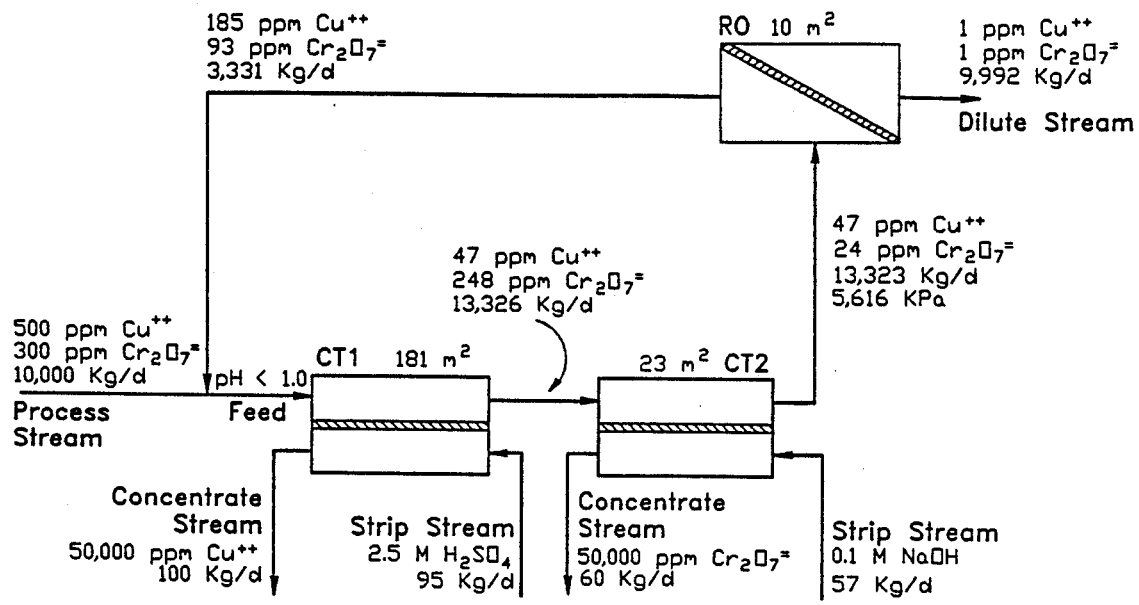

A hybrid separation system of the present invention combining RO and two CT processes to recover copper(II) and dichromate ions from an aqueous plating sludge, as shown schematically in FIG. 29a, with the various steady-state operating parameters specified therein. The RO membrane comprises 10 m$^2$ of the same membrane specified in Example 3, and having a copper(II) ion rejection of 99%. The first CT membrane comprises 181 m$^2$ of the Celgard X20 membrane, having a copper(II) permeability of 0.16 g/m$^2$-day-ppm. The second CT membrane comprises 23 m$^2$ of the membrane specified in Table III and having a dichromate permeability of 1.34 g/m$^2$-day-ppm. The hybrid system achieves a recovery of 50,000 ppm of both dichromate and copper(II) ions in its concentrate streams, while leaving only 1 ppm of both ions in its dilute stream.

Figure 29B:
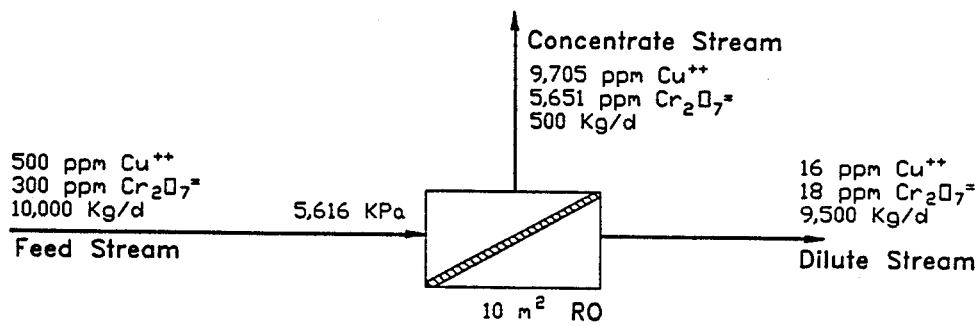
Figure 29C:
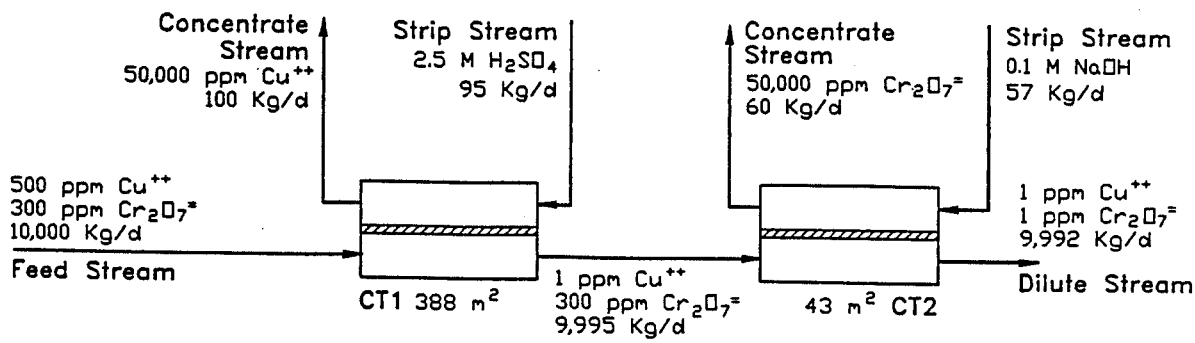

For comparison, treatment of the same feed by the hybrid system components of RO and the two CT membrane processes are illustrated in FIGS. 29b and 29c, respectively. As shown in FIG. 29b, RO alone will not achieve the same degree of separation, being capable of separating but a fraction of the two solutes in the concentrate stream, and of lowering the dilute stream concentration to only 18 ppm dichromate and 16 ppm copper(II). As seen in FIG. 29c, in order to achieve the same degree of separation as the hybrid system, approximately twice the surface area of the two CT membranes is required. Using the same two CT membranes alone with the same membrane surface area as used in the hybrid system of FIG. 29a (not shown), a dilute stream containing unacceptably high concentrations of dichromate (14 ppm) and copper(II) (27 ppm) is obtained.

EXAMPLE 13

Figure 30A:
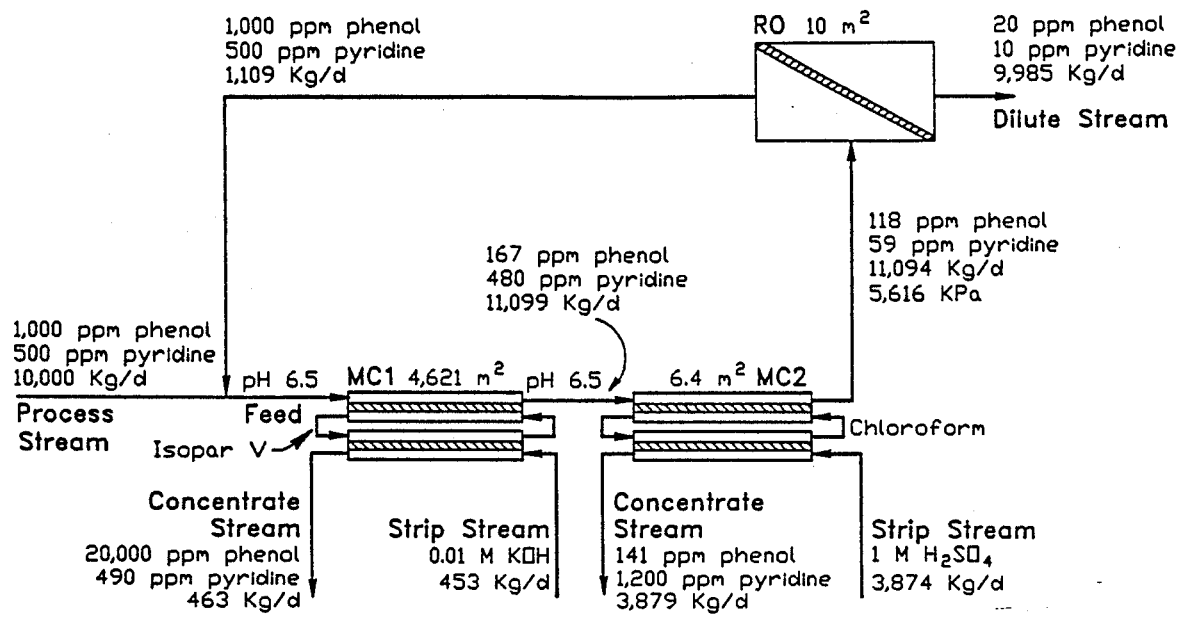

A hybrid separation system of the present invention combining RO and two membrane contactors to separate phenol and pyridine from an aqueous synfuel condensate stream is illustrated in FIG. 30a, with the various operating parameters shown thereon, as measured at steady-state. The RO membrane is the same one specified in Example 11, having the same flux and rejection rates specified therein. The two MC-type separators utilize the same membranes of Examples 9 and 10, with the liquid extractant in contact with the permeate side of each of the first membranes of the two pairs of membrane contactors, while the product or strip solutions are in contact with the permeate side of each of the second membranes of the two pairs of membrane contactors. The total membrane area for aqueous product for the first membrane contactor is 4621 m$^2$, while that for the second membrane contactor is 6.4 m$^2$ The hybrid system achieves a separation of 20,000 ppm phenol and 1200 ppm pyridine in the concentrate streams, with 20 ppm phenol and 10 ppm pyridine in the dilute stream.

Figure 30B:
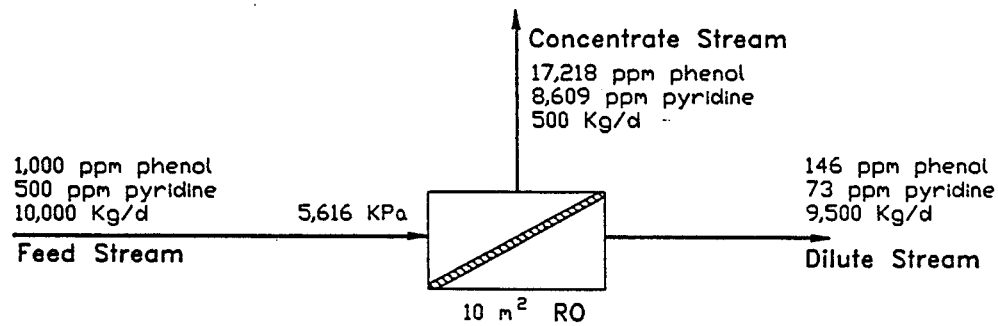
Figure 30C:
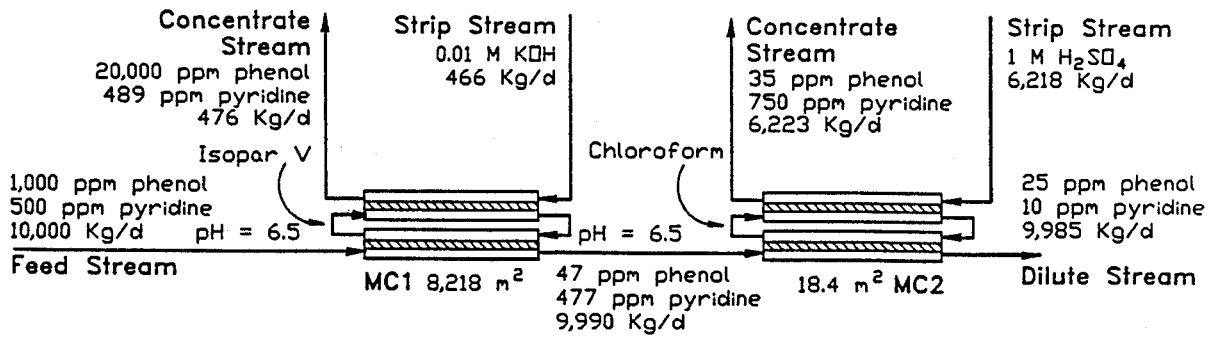

For comparison, systems treating of the same feed stream by the same RO treatment alone and by a combination of the same membrane contactors alone are illustrated in FIGS. 30b and 30c, respectively. As seen from FIG. 30b, the lowest concentrations of phenol and pyridine achievable with the same membrane area as in the hybrid system of FIG. 30a in the dilute stream are 146 ppm and 73 ppm, respectively. Referring to FIG. 30c, although substantially the same separation is achievable by the two membrane contactors alone, approximately twice the membrane surface area is required for the first pair of membrane contactors, and approximately three times the membrane surface area is required for the second pair of membrane contactors. Using the same two membrane contactors alone with the same membrane surface area as used in the hybrid system of FIG. 30a (not shown), a dilute stream containing unacceptably high concentrations of phenol (116 ppm) and pyridine (56 ppm) is obtained.

EXAMPLE 14

Figure 31A:
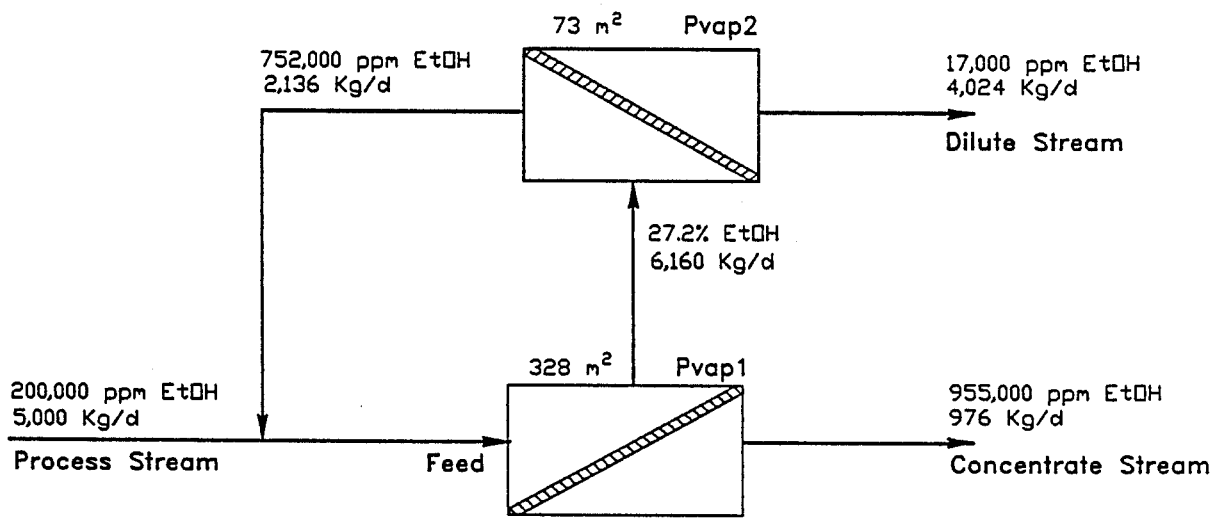

A hybrid separation system of the present invention combining two pervaporation separations to recover ethanol (EtOH) from a refrigeration brine containing an aqueous solution of various metals and salts along with approximately 200,000 ppm is shown schematically in FIG. 31a, with the steady-state operating parameters specified therein. The first pervaporation membrane comprises 328 m$^2$ of the F-7 HdFDA membrane, having an EtOH permeability of 0.009 g/m$^2$-day-ppm, and a separation factor of EtOH in preference to water of 45.9. The second pervaporation membrane, specific to water removal, comprises 73 m$^2$ of the g-AAm-AA-NaH membrane having a water permeability of 0.103 g/m$^2$-day-ppm, and a separation factor of water in preference to EtOH of 52. The hybrid system achieves an EtOH concentration of 955,000 ppm in the concentrate stream, and 17,000 ppm in the dilute stream.

Figure 31B:
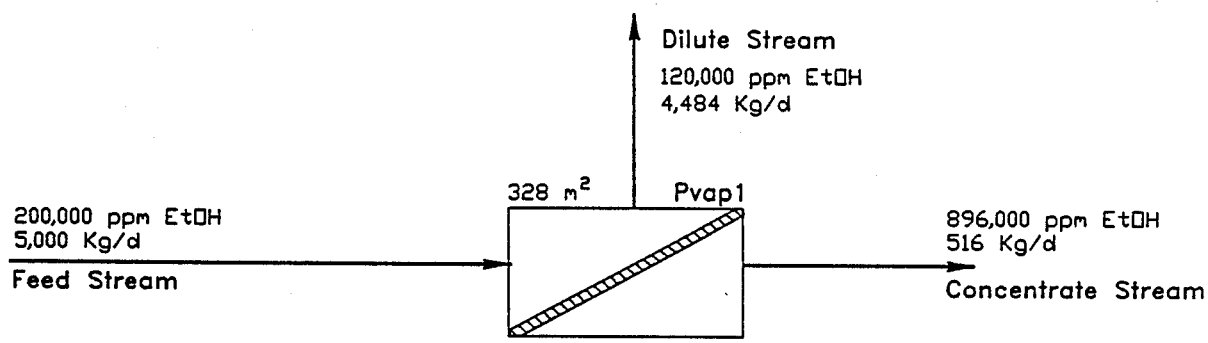
Figure 31C:
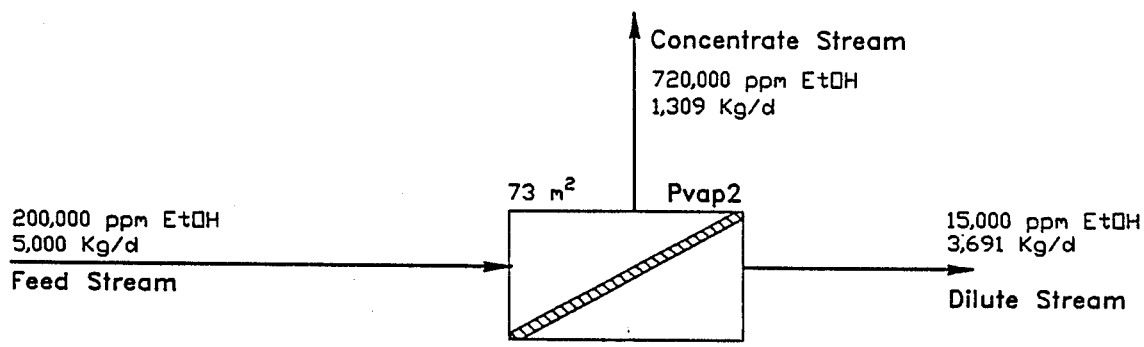

For comparison, the same feed is treated with the same membrane surface area of each of the two pervaporation membranes alone, with the results shown in FIGS. 31b and 31c. As is apparent from those schematics, the same degree of separation is not achievable by either of the two component separation membranes.

EXAMPLE 15

Figure 32A:
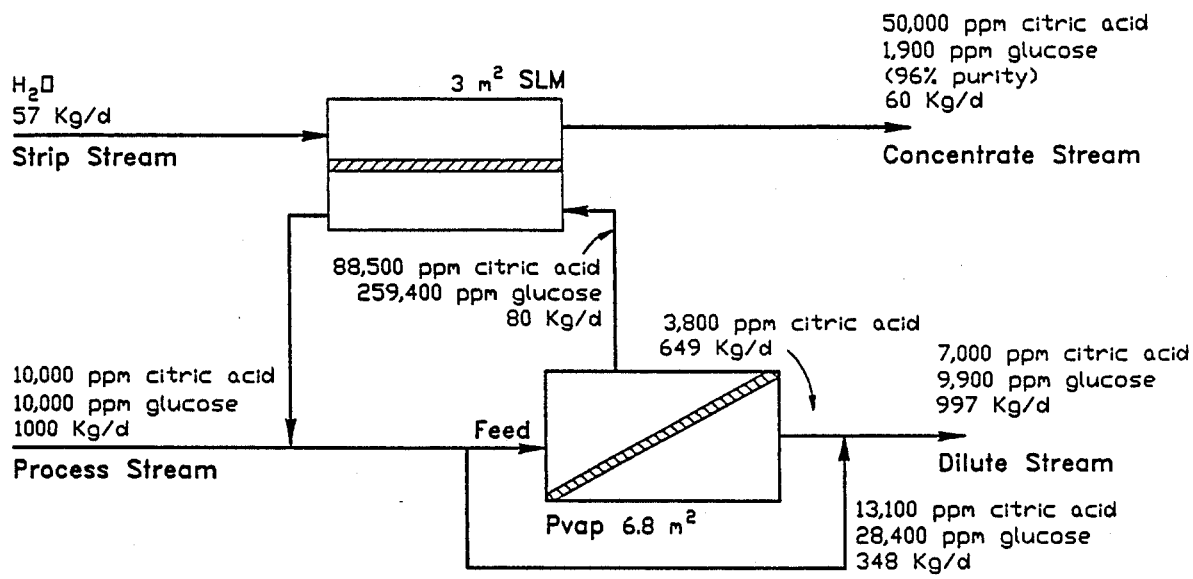

A hybrid separation system of the present invention combining SLM and Pvap to recover high purity citric acid from an aqueous fermentation broth containing 10,000 ppm each of citric acid and glucose is shown schematically in FIG. 32a, with the steady-state operating parameters specified therein. The pervaporation membrane comprises 6.8 m$^2$ of the cation exchange membrane Neosepta CM-1, specific to water in preference to citric acid, having a water flux of 96 kg/m$^2$-day and a separation factor of 10. The supported liquid membrane comprises 3 m$^2$ of the type of membrane specified in Table III, specific to citric acid in preference to glucose, having a citric acid flux dependent on citric acid concentration in feed and strip solutions, and having a separation factor of 100. The hybrid system produces a concentrate stream having 50,000 ppm citric acid that is 96% pure.

Figure 32B:
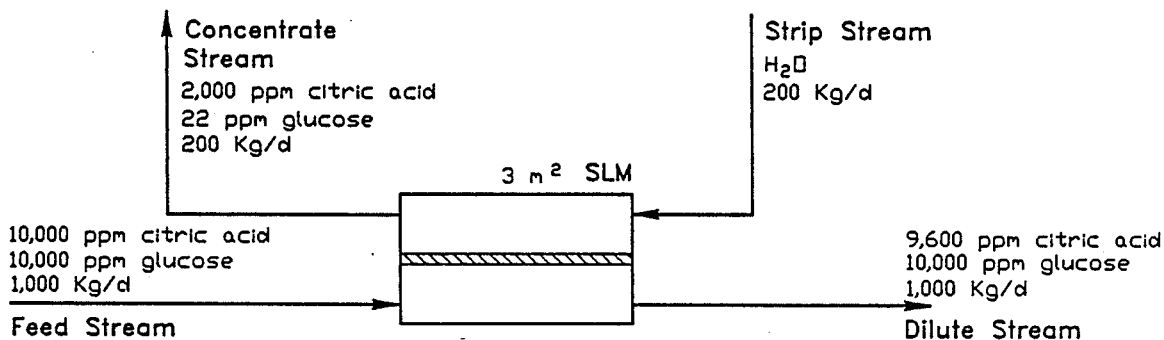
Figure 32C:
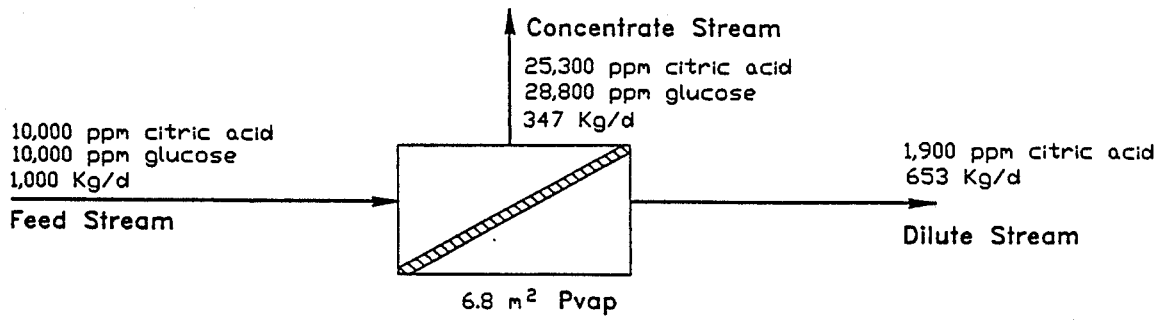

For comparison, the same feed is treated with the same membrane surface area of each of the component separation systems of SLM and Pvap, with the results shown in FIGS. 32b and 32c. As is apparent, neither of the two components separately is capable of achieving the degree of separation of the hybrid system.

EXAMPLE 16

Figure 33A:
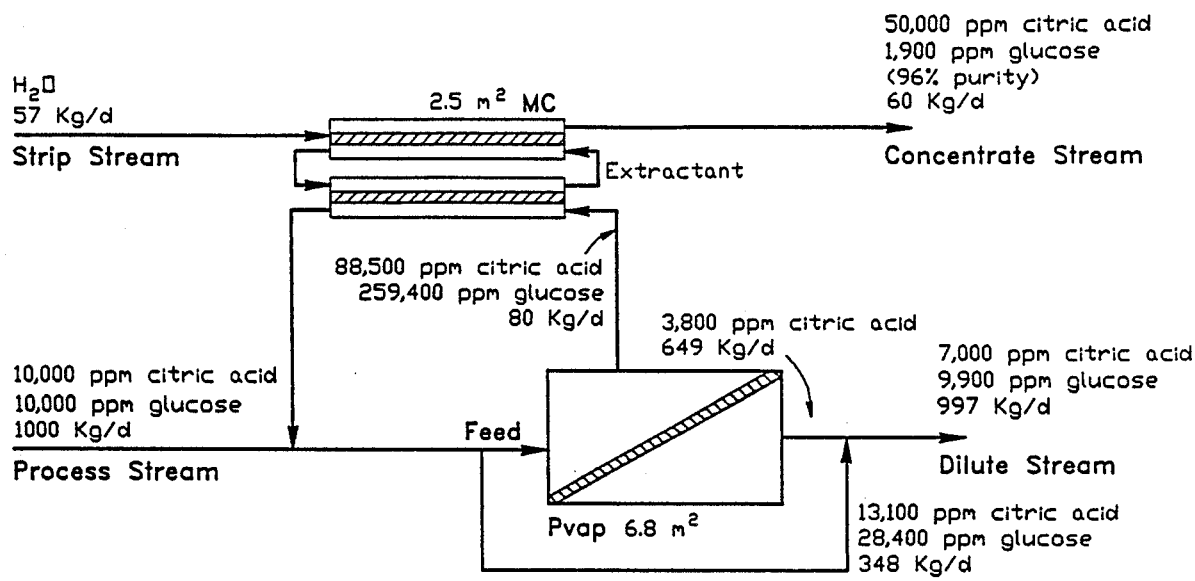

A hybrid separation system of the present invention combining pervaporation and a membrane contactor to effect the same separation as that of Example 15 is shown schematically in FIG. 33a, along with the steady-state operating parameters. The pervaporation membrane comprises the same one specified in Example 15, while the membrane of the membrane contactor comprises a total of 2.5 m² of the Olin hydrophilic regenerated cellulose film, the first of the pair of membrane contactors having its permeate side in contact with the citric acid liquid extractant specified in Table III, and the second of the pair having its permeate side in contact with a strip solution of water. The membrane of the membrane contactors has a variable citric acid flux, depending upon the concentration of citric acid in the feed and strip solutions, and a separation factor of 100 for citric acid in preference to glucose. The hybrid system produces a concentrate stream having 50,000 ppm citric acid that is 96% pure.

Figure 33B:
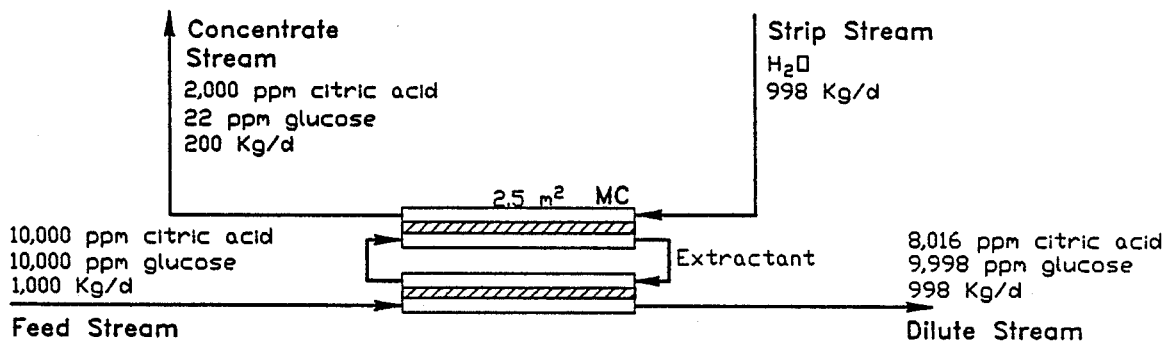
Figure 33C:
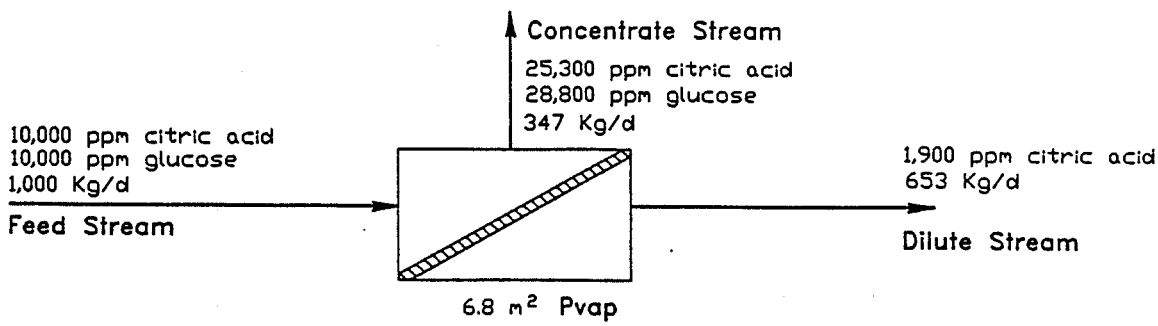

For comparison, the same component separation systems of the hybrid system are used to treat the same feed, with the results shown in FIGS. 33b and 33c. Again, the component systems are not capable of achieving the same degree of separation as the hybrid system.

EXAMPLE 17

Figure 34A:
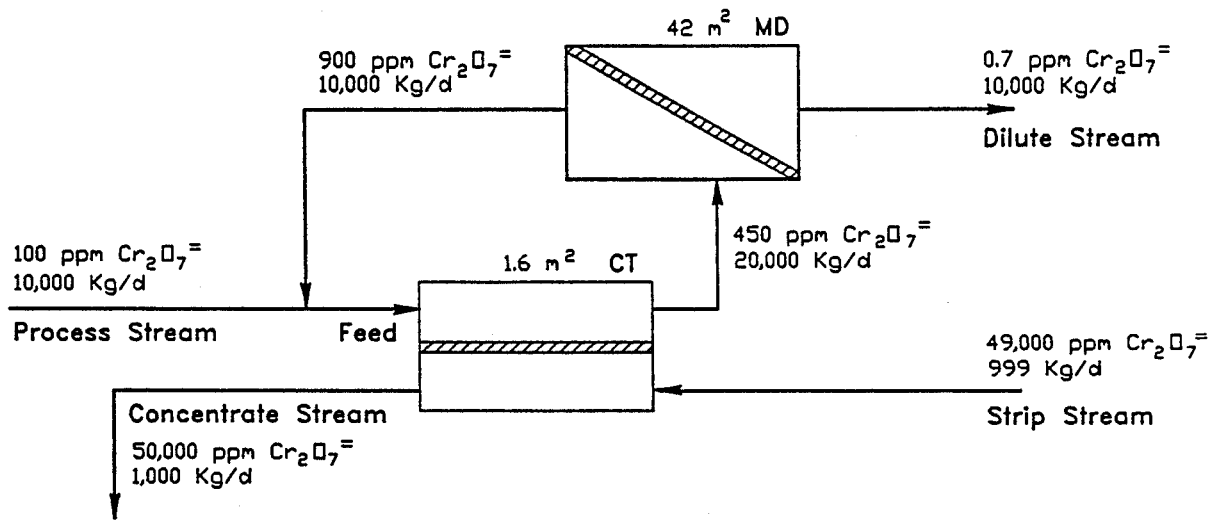

A hybrid separation system of the present invention combining membrane distillation and coupled transport to recover dichromate ion from an aqueous chrome plating waste stream is shown schematically in FIG. 34a, along with the steady-state operating parameters. The CT membrane comprises 1.6 m² of the polysulfone hollow fiber membrane specified in Table III having a dichromate permeability 1.34 g/m²-d-ppm. The membrane for the membrane distillation separator comprises 42 m² of the Accurel membrane specified in Table III, having a water flux 240 kg/m²-day at a 900 ppm dichromate feed and a dichromate rejection rate of 99.9%. The hybrid system effects a separation of 50,000 ppm dichromate in the concentrate stream and 0.7 ppm in the dilute stream.

Figure 34B:
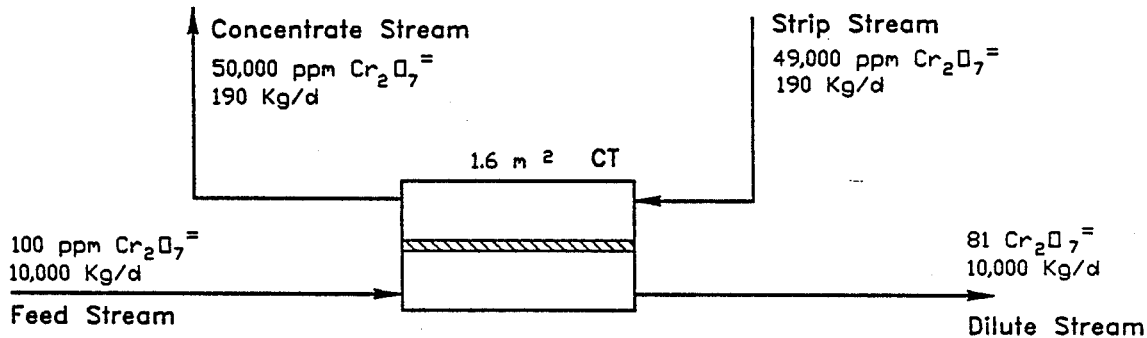
Figure 34C:
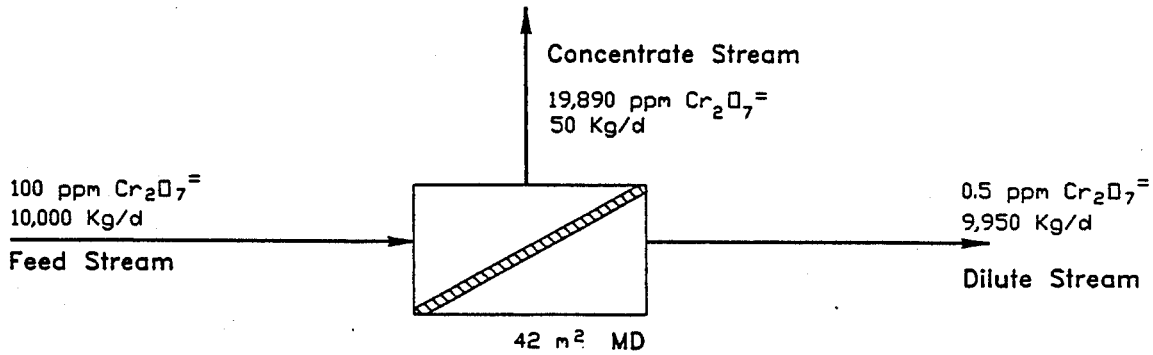

For comparison, the same component CT and MD systems are used to treat the same feed separately in FIGS. 34b and 34c. As is apparent, neither is capable of the same degree of separation as the hybrid system.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method including a combination of membrane separations for the removal of solvent and solute from a process stream containing a solvent and at least one solute with less membrane surface area than would be required for the component membrane separations of said combination or with greater separation than that obtainable with the component membrane separations having the same membrane surface area, said method including a combination consisting essentially of the component membrane separations of
   (a) providing a solvent removal process for selectively removing solvent from said process stream, said solvent removal process forming a solvent-rich portion and a solvent-poor portion and being selected from the membrane processes of reverse osmosis, nanofiltration, membrane distillation and pervaporation,
   (b) providing at least one selective solute removal process for selectively removing solute from said process stream, said selective solute removal process forming a solute-rich portion and a solute-poor portion and being selected from the membrane processes of pervaporation, supported-liquid membranes, coupled transport, and membrane contactors, and
   (c) providing said solvent removal process and said selective solute removal process as a part of a recycle stream having either of the following relationships:
      (1) the solute-poor portion of the selective solute removal process comprises the feed for the solvent removal process and the solvent-poor portion of the solvent removal process is combined with the process stream to form the feed to the selective solute removal process; or
      (2) the solvent-poor portion of the solvent removal process comprises the feed for the selective solute removal process and the solute-poor portion of the selective solute removal process is combined with the process stream to form the feed to the solvent removal process.

2. The method of claim 1 wherein said solvent removal process is selected from the processes of reverse osmosis and nanofiltration.

3. The method of claim 2 wherein said selective solute removal processes is pervaporation.

4. The method of claim 2 wherein said selective solute removal process is supported-liquid membrane.

5. The method of claim 2 wherein said selective solute removal process is coupled transport.

6. The method of claim 2 wherein said selective solute removal process is membrane contactor.

7. The method of claim 2 wherein said selective solute removal process comprises supported-liquid membrane and pervaporation.

8. The method of claim 2 wherein said selective solute removal process comprises coupled transport and supported-liquid membrane.

9. The method of claim 2 wherein said selective solute removal process comprises coupled transport and pervaporation.

10. The method of claim 2 wherein said selective solute removal process comprises membrane contactor and pervaporation.

11. The method of claim 2 wherein said selective solute removal process comprises membrane contactor and supported-liquid membrane.

12. The method of claim 2 wherein said selective solute removal process comprises membrane contactor and coupled transport.

13. The method of claim 2 wherein said selective solute removal process comprises two supported-liquid membrane processes.

14. The method of claim 2 wherein said selective solute removal process comprises two coupled transport processes.

15. The method of claim 2 wherein said selective solute removal process comprises two membrane contactor processes.

16. The method of claim 1 wherein said solvent removal process is pervaporation.

17. The method of claim 16 wherein said selective solute removal process is pervaporation.

18. The method of claim 16 wherein said selective solute removal process is supported-liquid membrane.

19. The method of claim 16 wherein said selective solute removal process is membrane contactor.

20. The method of claim 1 wherein said solvent removal process is membrane distillation and said selective solute removal process is coupled transport.

21. The method of claim 1 wherein said solvent is water and said solvent removal process is reverse osmosis.

22. The method of claim 21 wherein said solute is phenol and said selective solute removal process is pervaporation.

23. The method of claim 21 wherein said solute comprises hops beta-acids and said selective solute removal process is supported-liquid membrane.

24. The method of claim 21 wherein said solute is chromium ion and said selective solute removal process is coupled transport.

25. The method of claim 21 wherein said solute is zinc ion and said selective solute removal process is membrane contactor.

26. The method of claim 21 wherein said solutes are citric acid and ethanol and said selective solute removal process comprises supported-liquid membrane and pervaporation.

27. The method of claim 21 wherein said solutes are dichromate ions and phenol and said selective solute removal process comprises coupled transport and supported-liquid membrane.

28. The method of claim 21 wherein said solutes are trichloroethane and chormium ion and said selective solute removal process comprises coupled transport and pervaporation.

29. The method of claim 21 wherein said solutes are ethanol and alpha-chymotripsin and said selective solute removal process comprises pervaporation and membrane contactor.

30. The method of claim 21 wherein said solutes are phenol and pyridine and said selective solute removal process comprises supported-liquid membrane and membrane contactor.

31. The method of claim 21 wherein said solutes are dichromate ions and phenol and said selective solute removal process comprises coupled transport and membrane contactor.

32. The method of claim 21 wherein said solutes are phenol and pyridine and said selective solute removal process comprises two supported-liquid membrane processes.

33. The method of claim 21 wherein said solutes are copper ion and chromium ion and said selective solute removal process comprises two coupled transport processes.

34. The method of claim 21 wherein said solutes are phenol and pyridine and said selective solute removal process comprises two membrane contactor processes.

35. The method of claim 1 wherein said solvent is water, said solvent removal process is pervaporation, said solute is ethanol, and said selective solute removal process is pervaporation.

36. The method of claim 1 wherein said solvent is water, said solvent removal process is pervaporation, said solute is citriic acid, and said selective solute removal process is supported-liquid membrane.

37. The method of claim 1 wherein said solvent is water, said solvent removal process is pervaporation, said solute is citric acid, and said selective solute removal process is membrane contactor.

38. The method of claim 1 wherein said solvent is water, said solvent removal process is membrane distillation, said solute is dichromate ion, and said selective solute removal process is coupled transport.

* * * * *

UNITED STATES PATENT AND TRADEMARK OFFICE
CERTIFICATE OF CORRECTION

PATENT NO. : 4,944,882
DATED : July 31, 1990
INVENTOR(S) : Roderick J. Ray, et al It is certified that error appears in the above-identified patent and that said Letters Patent is hereby corrected as shown below:

| | | |
|---|---|---|
| Col. 8, | Line 43: | Delete period after "acid,". |
| Col. 10, | Line 47: | Change "FIG$" to --FIGS--. |
| Col. 10, | Line 47: | Italicize "8a-f". |
| Col. 17, | Table III, Example No. 6: | Change "Ce;gard" to --Celgard--. |
| Col. 20, | Line 52: | Lower the comma after "$m^2$". |
| Col. 23, | Line 16: | Change "$Cr_2O_7$." to --$Cr_2O_7^=$--. |
| Col. 23, | Line 17: | Delete the equal sign (=). |
| Col. 23, | Line 33: | Change "$M^2$" to --$M^2$,--. |
| Col. 23, | Line 58: | Change "M2" to --$M^2$--. |
| Col. 24, | Line 38: | Change "M2" to --$M^2$--. |
| Col. 25, | Line 43: | Change "threecomponent" to --three-component--. |
| Col. 25, | Line 63: | Change "$M^2$" to --$M^2$,--. |

UNITED STATES PATENT AND TRADEMARK OFFICE
CERTIFICATE OF CORRECTION

PATENT NO. : 4,944,882

DATED : July 31, 1990

INVENTOR(S) : Roderick J. Ray, et al

It is certified that error appears in the above-identified patent and that said Letters Patent is hereby corrected as shown below:

Col. 25, Line 65: Insert a period (.) between "$M^2$" and "The".

Col. 26, Line 39: Change "$M^{2\cdot}$" to --$M^2$.--.

Col. 27, Line 57: Change "$M^{2\cdot}$" to --$M^2$.--.

Col. 27, Line 58: Insert a period (.) between "$M^2$" and "The".

Col. 31, Line 30: Change "chormuim" to --chromium--.

Signed and Sealed this

Ninth Day of November, 1993

Attest:

BRUCE LEHMAN

*Attesting Officer*     Commissioner of Patents and Trademarks